United States Patent
Bruderlin et al.

(10) Patent No.: US 8,810,582 B2
(45) Date of Patent: Aug. 19, 2014

(54) HAIR CACHING OPTIMIZATION TECHNIQUES FOR USE IN A HAIR/FUR PIPELINE

(75) Inventors: Armin Walter Bruderlin, Culver City, CA (US); Francois Chardavoine, Los Angeles, CA (US); Clint Chua, Alhambra, CA (US); Gustav Melich, Playa del Rey, CA (US)

(73) Assignees: Sony Corporation, Tokyo (JP); Sony Pictures Entertainment Inc, Culver City, CA (US)

( * ) Notice: Subject to any disclaimer, the term of this patent is extended or adjusted under 35 U.S.C. 154(b) by 0 days.

(21) Appl. No.: 11/801,913

(22) Filed: May 11, 2007

(65) Prior Publication Data
US 2007/0273704 A1    Nov. 29, 2007

Related U.S. Application Data

(63) Continuation-in-part of application No. 11/345,355, filed on Feb. 1, 2006, which is a continuation of application No. 10/052,068, filed on Jan. 16, 2002, now Pat. No. 7,050,062, which is a continuation of application No. 09/370,104, filed on Aug. 6, 1999, now Pat. No. 6,952,218.

(60) Provisional application No. 60/833,113, filed on Jul. 24, 2006, provisional application No. 60/886,286, filed on Jan. 23, 2007.

(51) Int. Cl.
| G09G 5/00 | (2006.01) |
| G06T 13/00 | (2011.01) |
| G06T 13/40 | (2011.01) |
| G06T 17/00 | (2006.01) |
| G06T 13/20 | (2011.01) |

(52) U.S. Cl.
CPC .................. *G06T 13/40* (2013.01); *G06T 17/00* (2013.01); *G06T 13/20* (2013.01)
USPC ........... 345/473; 345/418; 345/419; 345/420; 345/421; 345/422; 345/423; 345/424; 345/426; 345/427; 345/474; 345/475; 345/441; 345/442; 345/581; 345/582; 345/594; 345/606; 345/619; 345/621; 345/639; 382/190; 382/195; 382/199; 382/203

(58) Field of Classification Search
CPC ......... G06T 13/40; G06T 17/00; G06T 13/20; G06T 17/20; G06T 15/30
USPC .................. 345/582–583, 419–420, 473–474
See application file for complete search history.

(56) References Cited

U.S. PATENT DOCUMENTS

| 4,519,037 A | 5/1985 | Brodeur et al. |
| 4,731,743 A | 3/1988 | Blancato |

(Continued)

FOREIGN PATENT DOCUMENTS

| JP | 09-326042 | 12/1997 |
| JP | 2001-297331 | 10/2001 |

(Continued)

OTHER PUBLICATIONS

Joe Alter, "Shave and a Haircut, Real Hair Real Fast", www.joealter.com/docs/shavedoc.html, 2000, pp. 1-37.*

(Continued)

*Primary Examiner* — Jin-Cheng Wang
(74) *Attorney, Agent, or Firm* — Procopio, Cory, Hargreaves & Savitch, LLP

(57) ABSTRACT

A lighting module of a hair/fur pipeline may be used to produce lighting effects in a lighting phase for a shot and an optimization module may be used to: determine if a cache hair state file including hair parameters exists; and determine if the cache hair state file includes matching hair parameters to be used in the shot, and if so, the hair parameter values from the cache hair state file are used in the lighting phase.

15 Claims, 45 Drawing Sheets

(56) References Cited

U.S. PATENT DOCUMENTS

| | | | |
|---|---|---|---|
| 4,872,056 A | | 10/1989 | Hicks et al. |
| 5,319,705 A | * | 6/1994 | Halter et al. .................... 705/54 |
| 5,404,426 A | | 4/1995 | Usami et al. |
| 5,437,600 A | | 8/1995 | Liboff et al. |
| 5,758,046 A | | 5/1998 | Rouet et al. |
| 5,764,233 A | | 6/1998 | Brinsmead et al. |
| 5,777,619 A | | 7/1998 | Brinsmead |
| 6,097,396 A | * | 8/2000 | Rouet et al. .................... 345/582 |
| 6,300,960 B1 | | 10/2001 | DeRose et al. |
| 6,333,985 B1 | | 12/2001 | Ueda et al. |
| 6,348,924 B1 | | 2/2002 | Brinsmead |
| 6,559,849 B1 | | 5/2003 | Anderson et al. |
| 6,720,962 B1 | | 4/2004 | Alter |
| 6,952,218 B1 | | 10/2005 | Bruderlin |
| 7,050,062 B2 | | 5/2006 | Bruderlin |
| 7,348,973 B1 | * | 3/2008 | Gibbs et al. .................... 345/419 |
| 7,609,261 B2 | | 10/2009 | Gibbs et al. |
| 8,624,888 B2 | | 1/2014 | Bruderlin et al. |
| 8,624,889 B2 | | 1/2014 | Bruderlin et al. |
| 2002/0021302 A1 | * | 2/2002 | Lengyel ........................ 345/583 |
| 2004/0227757 A1 | | 11/2004 | Petrovic et al. |
| 2005/0253842 A1 | * | 11/2005 | Petrovic et al. .............. 345/419 |

FOREIGN PATENT DOCUMENTS

| | | |
|---|---|---|
| WO | 01/11562 A2 | 2/2001 |
| WO | WO 01/11562 A2 | 2/2001 |

OTHER PUBLICATIONS

Office Action from U.S. Appl. No. 11/345,355 mailed Apr. 17, 2008, 18 pages.
Office Action from U.S. Appl. No. 11/801,829 mailed Apr. 17, 2008 13 pgs.
Magnenat-Thalmann, Nadia, et al., "Virtual Clothes, Hair and Skin for Beautiful Models", *Proc. Computer Graphics International*, (Jun. 24, 1996), pp. 132-141.
Ward, Kelly, et al., "A Survey on Hair Modeling: Styling, Simulation, and Rendering", *IEEE Transactions on Visualization and Computer Graphics*, vol. 13, No. 2 (Mar./Apr. 2007).
U.S. Appl. No. 11/801,914 1st Named Inventor: Armin Walter Bruderlin, Mailed Sep. 18, 2008, 13 pages.
U.S. Appl. No. 11/345,355, 1st Named Inventor Armin Walter Bruderlin, Mailed Oct. 1, 2008, 22 pages.
U.S. Appl. No. 11/801,829 Office Action, mailed Nov. 6, 2008.
Bertails, F., et al., "Adaptive Wisp Tree—a multiresolution control structure for simulating dynamic clustering in hair motion", *Eurographics, SIGGRAPH Symposium on Computer Animation*, (2000).
U.S. Appl. No. 11/880,588, mailed Jan. 8, 2009.
U.S. Appl. No. 11/880,594 mailed Jan. 26, 2009.
U.S. Appl. No. 11/801,924, mailed Feb. 6, 2009.
U.S. Appl. No. 11/801,923 Final Office Action mailed Feb. 24, 2009.
U.S. Appl. No. 11/345,355 Office Action mailed Feb. 24, 2009.
U.S. Appl. No. 11/801,914 Office Action mailed Mar. 11, 2009.
U.S. Appl. No. 11/345,355 Non-Final Office Action mailed Jan. 11, 2010.
U.S. Appl. No. 11/801,829, Final Office Action mailed Jan. 7, 2010.
U.S. Appl. No. 11/801,924, Final Rejection Action mailed Feb. 16, 2010.
U.S. Appl. No. 11/880,588, Final Rejection mailed Feb. 5, 2010.
U.S. Appl. No. 11/880,594, Final Rejection Action mailed Feb. 16, 2010.
U.S. Appl. No. 11/801,923 Final Rejection Action mailed Feb. 16, 2010.
U.S. Appl. No. 11/801,829 Office Action, mailed May 14, 2009.
U.S. Appl. No. 11/801,913, Office Action mailed Jun. 30, 2009.
U.S. Appl. No. 11/880,594, Office Action mailed Jun. 26, 2009.
U.S. Appl. No. 11/880,588 Office Action mailed Jun. 4, 2009.
U.S. Appl. No. 11/345,355 Final Office Action mailed Jul. 8, 2009.
U.S. Appl. No. 11/801,924 Office Action mailed Jul. 15, 2009.
Ward, Kelly, et al., "Adaptive Grouping and Subdivision for Simulating Hair Dynamics", *Proc. Pacific Graphics Conf. Computer Graphics and Applications,*, (Oct. 2003), pp. 234-243.
U.S. Appl. No. 11/801,914 Office Action mailed Oct. 29, 2009.
U.S. Appl. No. 11/801,914, Final Rejection mailed Jun. 25, 2010.
U.S. Appl. No. 11/345,355, Final Office Action, mailed Jul. 7, 2010.
U.S. Appl. No. 11/801,925 Office Action mailed Mar. 19, 2010.
EPO Extended Search Report, Application No. 12189025.5 dated Jan. 2, 2013.
Official Decision of Grant for Registration issued in related application JP Application No. 2009-521798 dated May 29, 2012.
Alia Systems, "Hair and Dynamic Curves", Version 6, 2004.
U.S. Appl. No. 11/345,355, Non Final Office Action, mailed Jun. 12, 2013.
U.S. Appl. No. 11/801,829, Non Final Office Action mailed May 6, 2013.
Japanese Patent Application No. 2012-143262, Official Action dated Apr. 22, 2013.
Notice of Allowance from U.S. Appl. No. 11/345,355, mailed Dec. 2, 2013.
Advisory Action from U.S. Appl. No. 11/345,355, mailed Nov. 22, 2010.
Notice of Allowance from U.S. Appl. No. 11/801,924, mailed Sep. 3, 2013.
Notice of Allowance from U.S. Appl. No. 11/801,924, mailed Apr. 24, 2013.
Notice of Allowance from U.S. Appl. No. 11/801,925, mailed Sep. 24, 2010.
Notice of Allowance from U.S. Appl. No. 11/801,923, mailed Dec. 19, 2013.
Non-Final Office Action from U.S. Appl. No. 11/801,923, mailed Sep. 4, 2013.
Advisory Action from U.S. Appl. No. 11/801,923, mailed May 8, 2009.
Notice of Allowance from U.S. Appl. No. 11/801,914, mailed Dec. 9, 2013.
Non-Final Office Action U.S. Appl. No. 11/801,914, mailed Jul. 30, 2013.
Final Office Action from U.S. Appl. No. 11/801,829, mailed Dec. 23, 2013.
Final Office Action from U.S. Appl. No. 11/801,829, mailed Sep. 4, 2012.
Non-Final Office Action from U.S. Appl. No. 11/801,829, mailed Feb. 22, 2012.
Advisory Action from U.S. Appl. No. 11/801,829, mailed Mar. 16, 2010.
Advisory Action from U.S. Appl. No. 11/801,829, mailed Mar. 18, 2009.
Notice of Allowance from U.S. Appl. No. 11/880,594 mailed Sep. 3, 2013.
Final Office Action from U.S. Appl. No. 11/880,588 mailed Nov. 26, 2013.
Non-Final Office Action from U.S. Appl. No. 11/880,588 mailed Jul. 18, 2013.
PCT Notification of Transmittal of the International search Report and the Written Opinion of the Intenrational Searching Authority, of the Declaration, Aug. 1, 2008.
Office Action from U.S. Appl. No. 11/801,924 mailed Aug. 7, 2008, 13 pages.
Office Action for U.S. Appl. No. 11/880,588, 1st Named Inventor Armin Walter Bruderlin, Mailed Aug. 20, 2008, 11 pages.
Office Action for U.S. Appl. No. 11/880,594, filed Jul. 23, 2007, 1st Named Inventor: Armin Walter Bruderlin, Mailed Aug. 20, 2008, 13 pages.
Office Action for U.S. Appl. No. 11/801,923, filed May 11, 2007, 1st Named Inventor: Armin Walter Bruderlin, mailed Aug. 27, 2008, 9 pages.
Alter, Joseph, "Shave and a Haircut Version 4.5", manual 4.5, (2007), pp. 1-56.
Bertails, Florence, et al., "A Practical Self-Shadowing Algorithm for interactive Hair Animation", *ACM International Conference Proceeding Series; vol. 112 Proc. of Graphics Interface 2005*, Victoria, British Columbia, (2005), pp. 71-78.

(56) References Cited

OTHER PUBLICATIONS

Iones, A., et al., "Fur and Hair: Practical Modeling and Rendering Techniques", *Proc. IEEE International Conference on Information Visualization*, (Jul. 2000), pp. 145-151.

Ward, Kelly, et al., "Modeling Hair Using Level-of-Detail Representations", *Proc. of the 16th International Conf. on Computer Animation and Social Agents*, CASA '03, (2003).

Ando, Makoto et al., "Expression and Motion Control of Hair Using Fast Collision Detection Methods", *Faculty of Engineering*, Seikei University, Tokyo, Japan, p. 463-470, Spring Verlag, Dec. 1995.

Anjyo, Ken-Ichi et al., "A Simple Method for Extracting the Natural Beauty of Hair", *Computer Graphics*, vol. 26, No. 2, (Jul. 1992), pp. 111-120.

Bruderlin, Armin W., "A Basic Hair/Fur Pipeline", *Paper in course # 9: Photorealistic Hair Mode Animation, and Rendering. ACM SIGGRAPH Course*, (2004).

Bruderlin, Armin W., "A Method to Generate Wet and Broken-Up Animal Fur", *Computer Graphics and Applications 1999 Proc., 7th Pac. Conf.* Oct. 5-7, 1999, pp. 242-249.

Bruderlin, Armin W., "Production Hair/Fur Pipeline at Imageworks", *Presentation in Course # 9: Photorealistic Hair Modeling, Anmiation and Rendering. ACM SIGGRAPH Course*, (2004).

Daldegan, Agnes et al., "An Integrated System for Modeling, Animating, and Rendering Hair", *Eurographics 1993 vol. 12 No. 3*, (1993), pp. 211-221.

Dave, J. et al., "The Chronicles of Narnia: The Lioin, The Crowds and Rhythm and Hues", *ACM SIGGRAPH Course # 34* (2006).

Goldman, Dan B., "Fake Fur Rendering", *Computer Graphics Proceedings, Annual Conference Series*, Aug. 3-8, 1997, (Aug. 1997).

Kajiya, James T., et al., "Rendering Fur with Three Dimensional Textures", *Computer Graphics*, vol. 23, No. 3, (Jul. 1989), pp. 271-281.

Kong, Waiming et al., "Visible Volume Buffer for Efficient Hair Expression and Shadow Generation", *IEEE*, (1999), p. 58-64.

Magnenat-Thalmann, Nadia "Photorealistic Hair Modeling, Animation, and Rendering", *SIGGRAPH 2004 Course # 9*, MIRALab—University of Geneva, (2004).

Magnenat-Thalmann, Nadia "The Simulation of Ancient Hairstyle in Real-Timer", *ACM SIGGRAPH 2004*, (2004).

Marschner, Stephen R., et al., "Light Scattering from Human Hair Fibers", *ACM Transactions on Graphics 2003 Cornell University*, (2003).

Miller, Gavin S., "From Wire-Frames to Furry Animals", *Graphics Interface*, (1988), pp. 138-145.

Moon, J. T., et al., "Simulating Multiple Scattering in Hair Using a Photon Mapping Approach", *ACM Transactions on Graphics*, 25, 3, 1067-1074, (2006).

Paris, S. et al., "Capture of Hair Geometry from Multiple Images", *ACM Transactions on Graphics*, 23, 3,, (2004), 712-719.

Preston, Martin et al., "Grooming, Animating, & Rendering Fur for "King Kong"", *ACM SIGGRAPH Sketch*, (2006).

Rankin, John et al., "A Simple Naturalistic Hair Model", *Computer Graphics*, (Feb. 1996), p. 5-9.

Van Gelder, Allen et al., "An Interactive Fur Modeling Technique", University of California, Santa Cruz, p. 1-6, 1997.

Watanabe, Yasuhiko et al., "A Triagonal Prism-Based Method for Hair Image Generation", *IEEE*, (Jan. 1992), p. 47-53.

\* cited by examiner

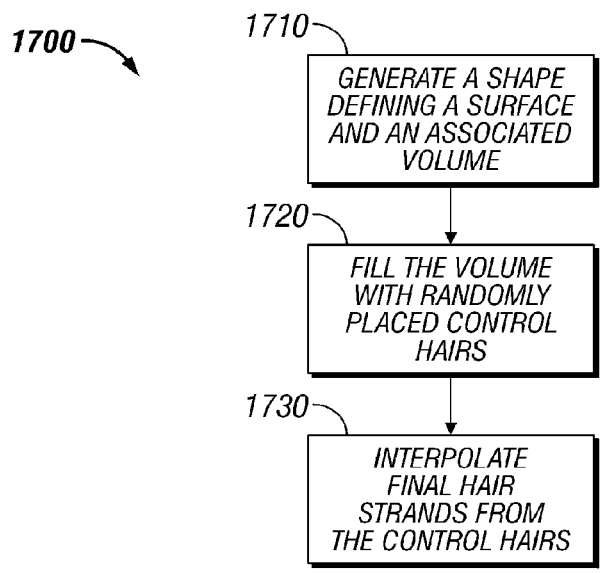
FIG. 17
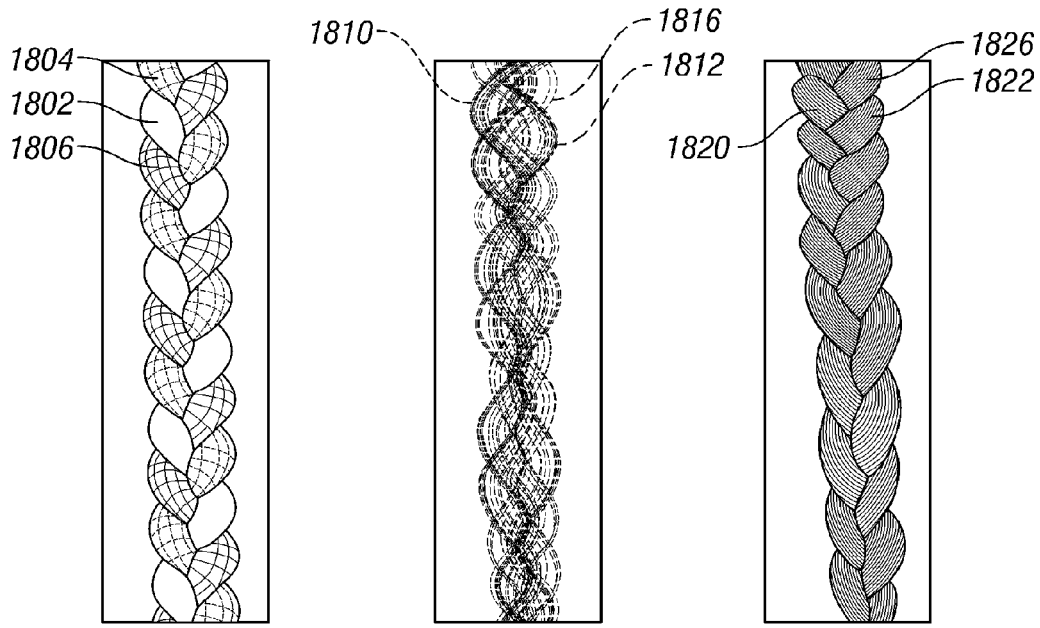
FIG. 18a  FIG. 18b  FIG. 18c

3600

| FRAME | NON-OPTIMIZED | | | OPTIMIZED | | |
|---|---|---|---|---|---|---|
| | HAIR COUNT | TIME | MEM | HAIR COUNT | TIME | MEM |
| 10 | 1078840 | 48:32 | 404.45 | 849857 | 31:40 | 261.00 |
| 20 | 1078840 | 18:30 | 320.51 | 456127 | 13:37 | 186.12 |
| 30 | 1078840 | 11:32 | 281.59 | 295580 | 8:07 | 144.75 |
| 40 | 1078840 | 8:45 | 262.28 | 196611 | 5:37 | 122.99 |
| 50 | 1078840 | 6:57 | 249.22 | 136812 | 4:19 | 110.12 |
| 60 | 1078840 | 6:05 | 235.59 | 92056 | 3:25 | 98.82 |
| 70 | 1078840 | 5:24 | 232.04 | 66924 | 2:47 | 92.13 |
| 80 | 1078840 | 5:03 | 227.65 | 45238 | 2:24 | 88.82 |
| 90 | 1078840 | 4:45 | 229.66 | 30177 | 2:17 | 93.25 |
| 100 | 1078840 | 4:32 | 228.35 | 19349 | 2:04 | 87.71 |

| FRAME | NON-OPTIMIZED | | | OPTIMIZED | | |
|---|---|---|---|---|---|---|
| | HAIR COUNT | TIME | MEM | HAIR COUNT | TIME | MEM |
| 118 | 1373458 | 23:44 | 804.04 | 274052 | 7:59 | 605.11 |
| 119 | 1373458 | 23:26 | 735.26 | 274052 | 7:49 | 586.01 |
| 134 | 1373458 | 26:51 | 983.90 | 274052 | 7:36 | 640.61 |
| 135 | 1373458 | 23:20 | 989.70 | 274052 | 7:38 | 644.00 |

| FRAME | NON-OPTIMIZED | | | OPTIMIZED | | |
|---|---|---|---|---|---|---|
| | HAIR COUNT | TIME | MEM | HAIR COUNT | TIME | MEM |
| 101 | 1503428 | 21:21 | 904.08 | 95750 | 2:47 | 453.68 |
| 270 | 1503428 | 48:40 | 944.02 | 150076 | 7:59 | 548.64 |

*FIG. 38*

| NO CACHE | CACHE GENERATION AND USE | CACHE REUSE |
|---|---|---|
| 36:48 | 11:05 | 8:42 |

HAIR CACHING OPTIMIZATION TECHNIQUES FOR USE IN A HAIR/FUR PIPELINE

This application is a continuation-in-part of application Ser. No. 11/345,355 filed on Feb. 1, 2006, which is a continuation of application Ser. No. 10/052,068 filed on Jan. 16, 2002, now issued as U.S. Pat. No. 7,050,062 which is a continuation of application Ser. No. 09/370,104 filed on Aug. 6, 1999, now issued as U.S. Pat. No. 6,952,218. This application also claims priority to provisional patent application 60/833,113 filed Jul. 24, 2006 and provisional patent application 60/886,286 filed Jan. 23, 2007.

BACKGROUND OF THE INVENTION

1. Field of the Invention

The invention relates to the digital creation of fur. More particularly, the present invention relates to the digital creation of realistic close-up and distant looks of fur coats on animal models.

2. Related Art

One of the many challenges in modeling, animating and rendering believable mammals in computer graphics has been to produce realistic-looking fur. A real fur coat is made up of hundreds of thousands of individual, cylindrical hairs covering the skin, and fulfills vital functions such as protection against cold and predators. Between animals as well as across the body of individual animals, the look and structure of these hairs vary greatly with respect to length, thickness, shape, color, orientation and under/overcoat composition. In addition, fur is not static, but moves and breaks up as a result of the motion of the underlying skin and muscles, and also due to external influences, such as wind and water.

Some prior computer graphics techniques used for fur creation have achieved convincing looks of smooth fur; however, these techniques do not take into account that real fur often breaks up at certain areas of the body, such as around the neck. In addition, the prior methods do not account for hairs of wet fur clump together resulting in a significantly different appearance compared to dry fur. Also, the process of simulating hair as it is getting increasingly wet when sprinkled on by water has not yet been addressed.

SUMMARY OF THE INVENTION

The system and method of the present invention provides a flexible technique for the digital representation and generation of realistic fur coats on geometric models of surfaces, such as animals. In one embodiment, an innovative technique for placement, adjustment and combing of fur on surfaces is provided. In one embodiment, the continuity of fur across surface patch boundaries is maintained. In addition, in one embodiment, an innovative method to simulate wet fur is provided. In this method static clumping and animated clumping may be applied to regions on the surfaces. In one embodiment, a method for the symmetric and one-sided breaking of hairs along fur-tracks on surfaces is provided. The above processes can be iteratively applied in order to generate layers of fur, such as an undercoat and an overcoat.

BRIEF DESCRIPTION OF THE DRAWINGS

The objects, features and advantages of the present invention will be apparent from the following detailed description in which:

FIG. 17 is a flow diagram illustrating a process 1700 to implement a fill-volume function, according to one embodiment of the invention.

FIG. 18a-c are diagrams illustrating the generation of braid shapes defining surfaces and associated volumes (FIG. 18a), the filling of these volumes with randomly placed control hairs (FIG. 18b), and the interpolation of final hair strands from the control hairs (FIG. 18c).

FIG. 36 is a table illustrating a side-by-side comparison of non-optimized values versus optimized values in terms of hair count, time, and memory using the screen-space size metric.

FIG. 37 is a table illustrating another comparison utilizing the screen-space speed method.

FIG. 38 is a table illustrating non-optimized and optimized hair count, time, and memory values.

DETAILED DESCRIPTION

Figure 1A:
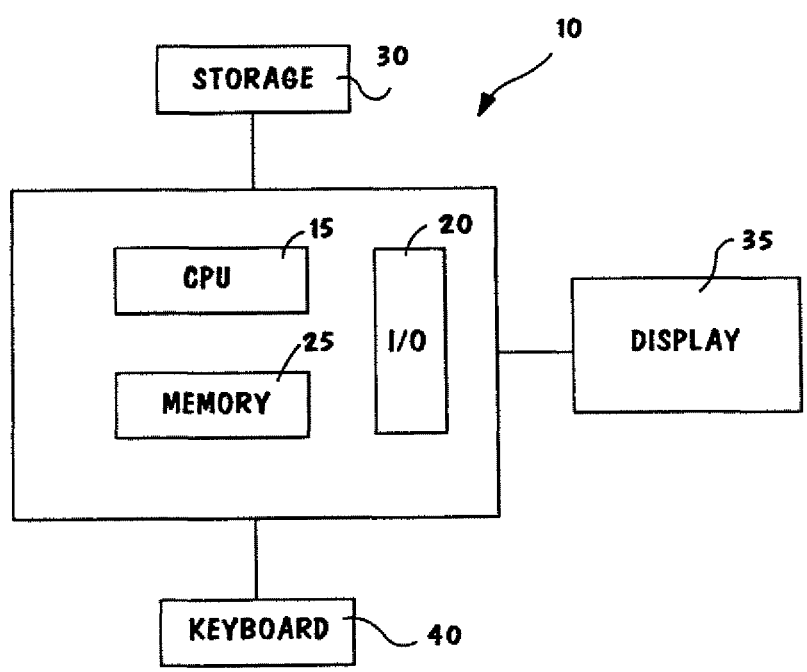
FIGS. 1a and 1b are simplified block diagrams of embodiments of systems that operate in accordance with the teachings of the present invention.

The method and apparatus provides an innovative technique for the digital generation of fur on surfaces, such as on a computer generated animal. FIG. 1a is a simplified block diagram of one embodiment that operates in accordance with the teachings of the present invention. Computer system 10 includes central processing unit (CPU) 15, memory 25, Input/Output 20, which may be coupled to a storage device such as a disk drive or other device. The system may also include a keyboard 40 or other user input device as well as a display 35 that may be used to display user interface and the final rendering of the fur in accordance with the teachings of the present invention.

In one embodiment, memory 25 stores instructions which when executed by the CPU 15 performs the processes described herein. Alternately, the instructions may be received via storage 30 or other input such a user input 40. The processes described herein may be executed via software by a system such as system 10 or hardware, or a combination of both hardware and software.

Figure 1B:
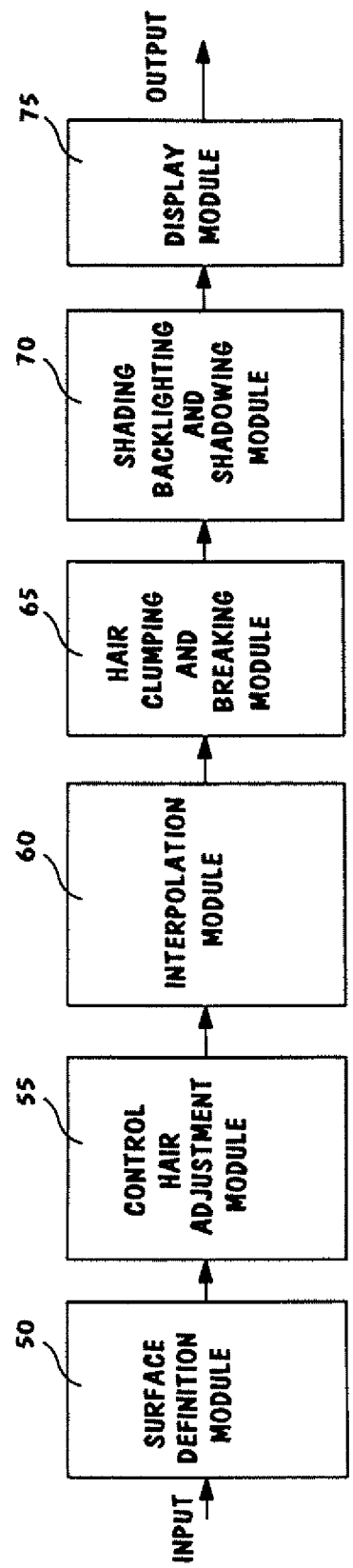
Figure 2:
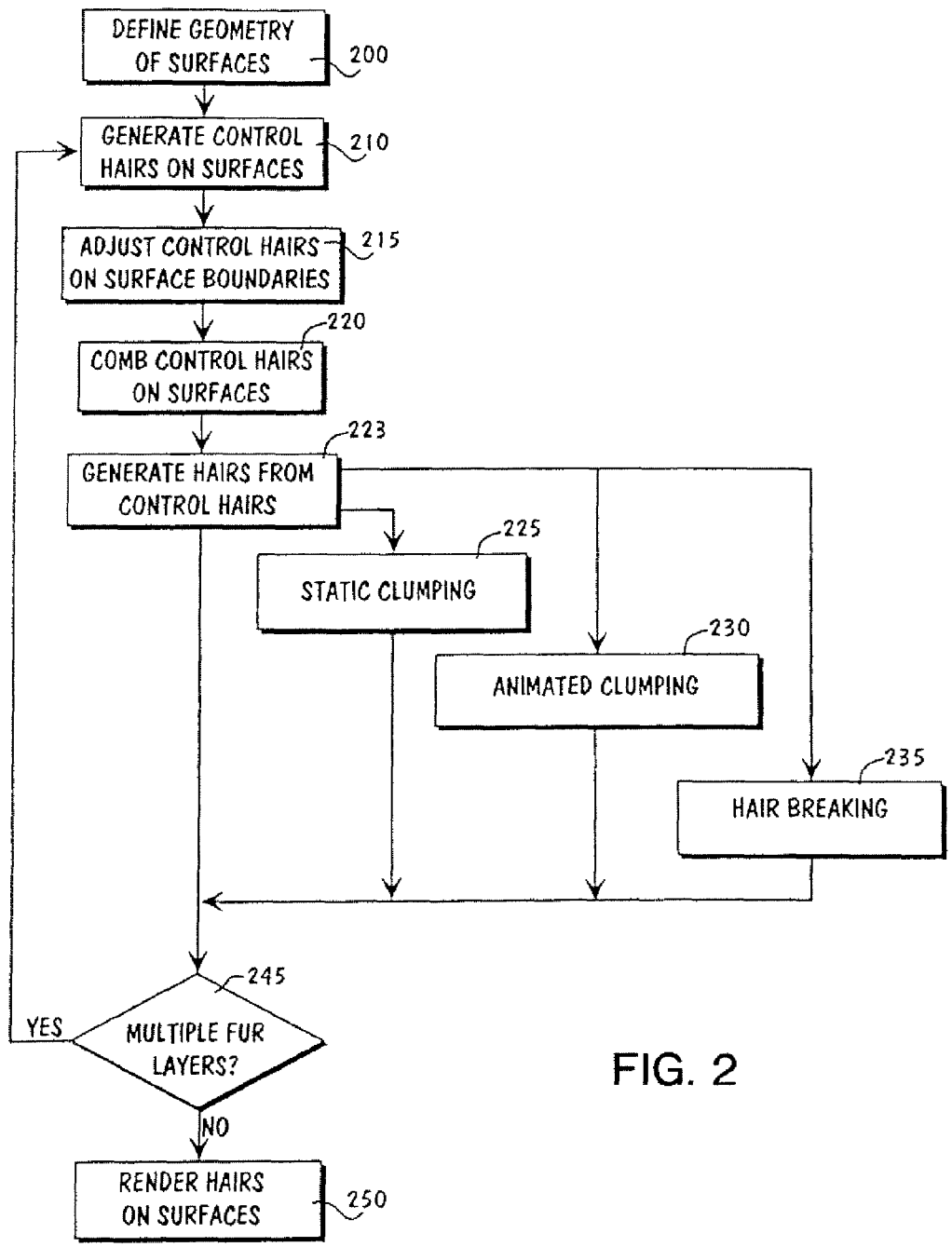
FIG. 2 is a flow diagram of one embodiment of a process for the generation of fur in accordance with the teachings of the present invention.
Figure 3A:
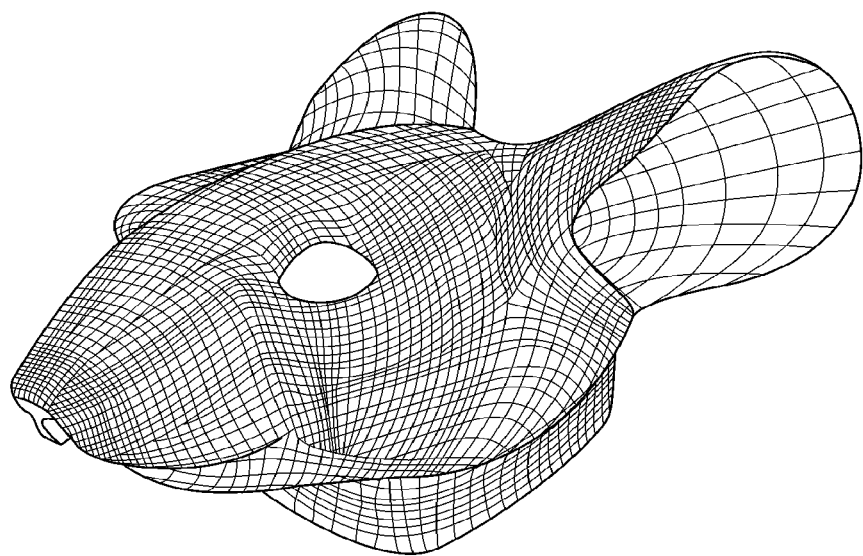
FIG. 3a is an illustration of a set of parametric surfaces defining the skin of a three-dimensional animal model.

An alternate embodiment is illustrated in FIG. 1b. Input is received by surface definition module 50 that defines a surface which, as will be explained below, defines surfaces and control hairs of the object to be rendered. Module 55 adjusts the control hairs to provide such functionality as combing and seamless hairs across surface boundaries. The interpolation module 60 interpolates across the surfaces using the control hairs. Hair clumping and breaking module 65 enhances the realistic visualization of the object by providing for clumping and breaking of hairs. Rendering module 70 renders the hairs and provides shading, black lighting and shadowing effects to the hairs, and module 75 displays the final output of the object with the hair surfaces FIG. 2 is a flow diagram of the steps involved in generating fur coat in accordance with the teachings of the present invention. At step 200, the geometry of the surfaces that contain the hair is defined. In one embodiment, a three-dimensional geometry may be used to model the skin, for example an animal skin, on which the fur coat is later generated. As illustrated in FIG. 3a, the geometry is usually defined as a connected set of parametric surfaces often referred to as surface patches. The patches can be generated a number of ways known to one skilled in the art. In one embodiment, NURBS surface patches are used.

Referring back to FIG. 2, at step 210, control hairs are placed onto these surface patches, whereby each control hair is modeled as a parametric curve, e.g., a NURBS curve, defined by a user-specified number of control vertices. As will be discussed below, a global density value for the hair is given by the user to determine the number of actual hairs and their positions on the surface patches. Each hair also has a number of attributes such as length, width, waviness, opacity, and by default points in the direction of the surface normal at its position on the surface.

In the present embodiment, a number of operations are performed on control hairs and the final hairs are generated based upon the control hairs and other information. However, it should be realized that these steps, such as combing and the like described herein may be performed on the final hairs instead of the control hairs.

A number of different approaches may be taken to generate the control hairs. One simple algorithm places equally spaced x hairs in the u direction and y hairs in the v direction (where x and y are specified by the user) of each NURBS patch. Alternately, the x and y hairs are placed equally by arc-length. This will result in a more uniform distribution across the patch. However, it does not achieve a balanced distribution of control hairs across patches of different sizes; x and y hairs are placed on all selected patches, whether large or small. Therefore, in an alternate embodiment, the generation of control hairs takes into account the area of a NURBS patch to determine x and y for each patch. In one embodiment, the user specifies z hairs per unit area. In addition in one embodiment, control hairs can also be placed individually or along curves-on surfaces for finer control. For example, extra control hairs along the sharp rim of the ears of an animal can be generated to ensure proper alignment of the fur eventually generated.

Figure 4:
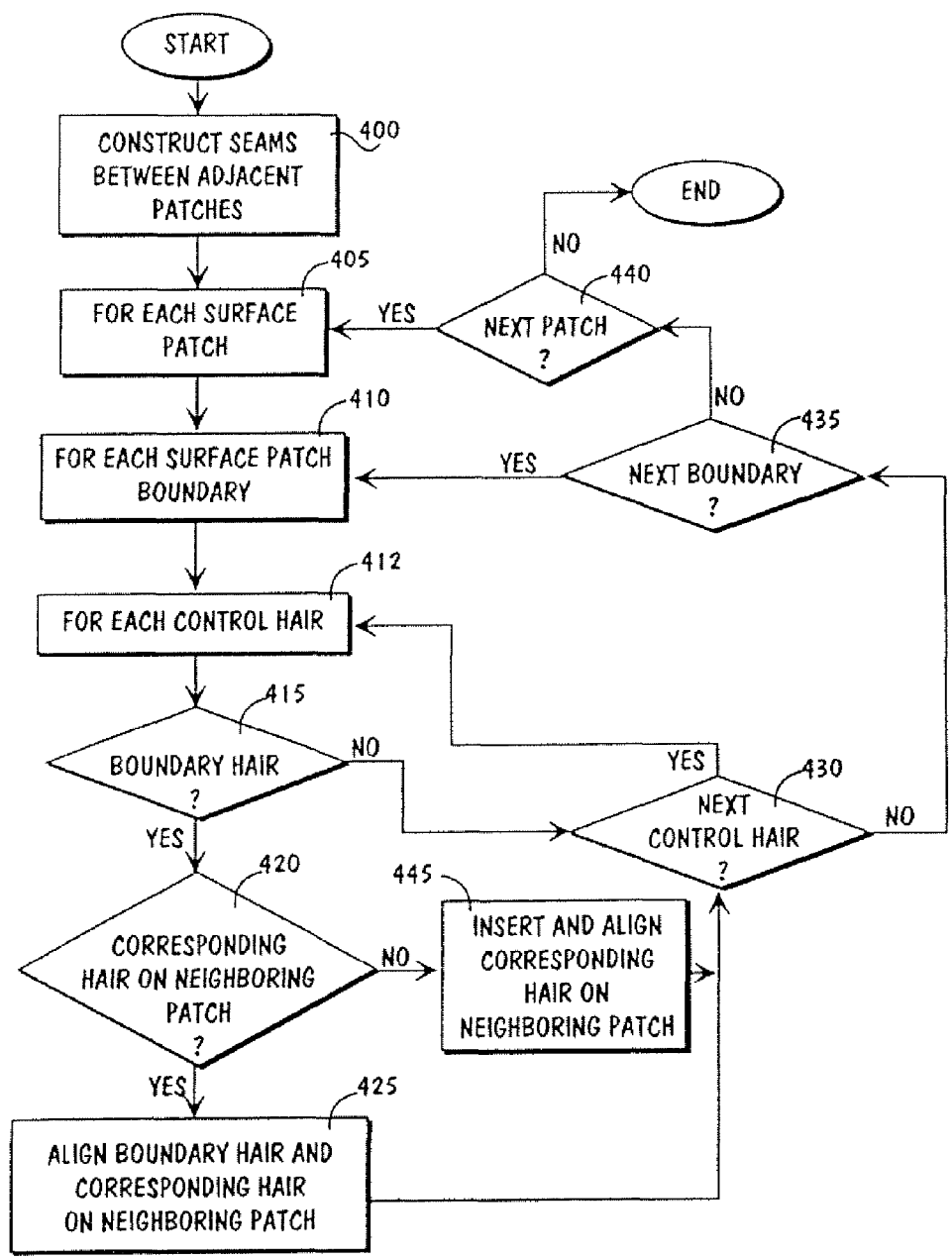
FIG. 4 is a flow chart illustrating one embodiment of a process for adjusting control hairs for removing visual discontinuities at surface boundaries.

Referring back to FIG. 2, once the control hairs are generated, step 210, the control hairs are adjusted at the surface boundaries. Since control hairs are placed in each surface patch, control hairs that lie on the boundary of a surface patch might not line up with control hairs on a neighboring surface patch; this can lead to visible discontinuities of the hairs along the surface boundaries. To address the potential problem, the control hairs on surface boundaries are adjusted. One embodiment of the process for adjusting the control hairs is illustrated by the flow chart of FIG. 4.

At step 400, seams are constructed between adjacent surfaces. Each seam identifies adjacent surfaces along a corresponding boundary (for example, an entire edge, T-junctions, or corners) of a surface patch. At step 405, for each surface patch, the boundaries are traversed, step 410. Each control hair is examined, step 412. At step 415, if a boundary hair is found, at step 420, the neighboring patches, as identified by a corresponding seam, are checked to see if there is a corresponding hair on the neighboring patch. In one embodiment, a hair is corresponding if it is within a small predetermined distance from the boundary hair. The distance may be specified in parametric u, v, or absolute space. In one embodiment, the predetermined distance may be a relatively small distance such that the hairs visually appear co-located.

If there is a corresponding control hair, the boundary hair and the corresponding hair are aligned, step 425, by modifying the location and orientation of one or both of the control hairs to a common location and orientation, respectively. In one embodiment, the corresponding hair of an adjacent surface patch is snapped to the location of the boundary hair along the boundary. In one embodiment, if the neighboring surface patch does not have a corresponding hair, then one is inserted and aligned on the neighboring patch, step 445. The process continues for each boundary hair along each boundary in each surface patch, steps 430, 435 and 440 until all boundary hairs are aligned.

Referring back to FIG. 2, after step 215, in one embodiment, the control hairs have been placed on the surfaces defining an animal or other object model and the control hairs point along a surface normal at their positions on the surface.

At step 220, the hairs are combed to achieve desired, groomed, dry fur looks. A number of different combing processes may be used. In the present embodiment, however, static and animated combing processes are applied to the control hairs. The combination of static and animated combing provides a low computation cost but effective visual effect. In alternate embodiments, static or animated combing alone may be used and generate beneficial visual results. The combing process may be used on the same control hairs for different shots, to provide, for example, a groomed look versus a slightly messy look of the fur.

Figure 3B:
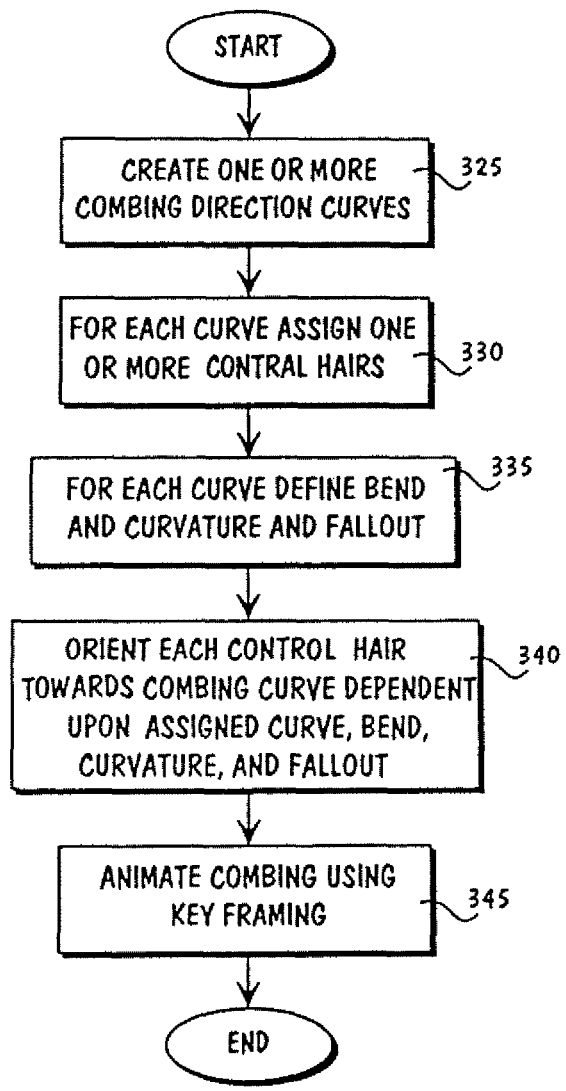
FIG. 3b is a simplified flow diagram illustrating one embodiment of static and animated combing processes.

One embodiment will be described with reference to FIG. 3b. In one embodiment, static combing is applied if the hairs do not "actively" move during an animation of the object, e.g., the animal. It should be noted that since each hair is expressed in a local coordinate system defined by the surface normal, du and dv at the root of the hair, statically combed hairs will "passively" move as the underlying surface is deformed or animated. Combing is achieved by specification of combing direction curves, degree of bending and curvature of the hair, as well as with a fall-off for each combing direction curve.

Figure 3C:
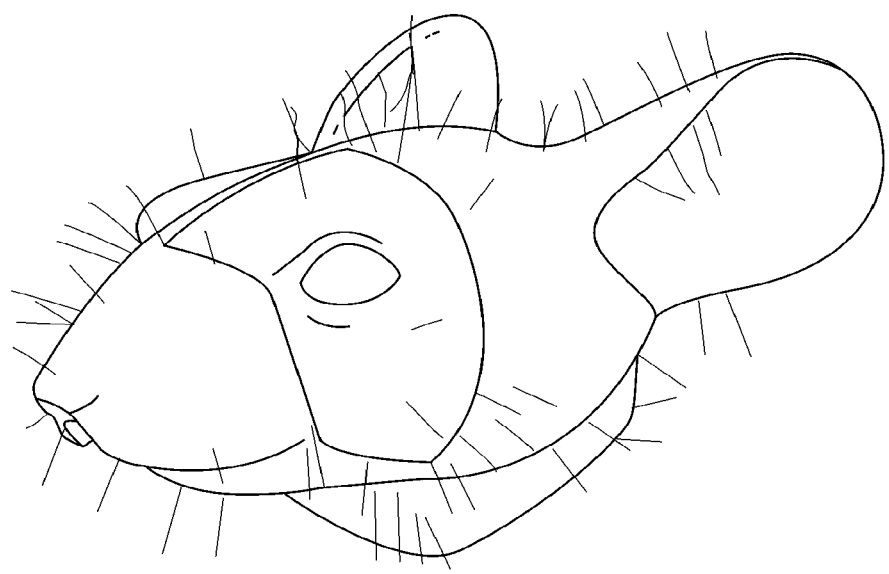
FIGS. 3c and 3d are examples that illustrate one embodiment of the combing processes.
Figure 3D:

At step 325, one or more combing direction curves are created. These curves indicate the direction applicable control hairs are to be combed. An example is illustrated by FIGS. 3c and 3d. FIG. 3c shows a number of uncombed control hairs. FIG. 3d illustrates an exemplary combing direction curve 365 and its direction. The combed hairs as also illustrated in FIG. 3d.

FIG. 3d illustrates one combing direction curve. However, it is common to implement a number of different curves, each curve corresponding to a different area of the surface. Thus, at step 330, for each curve, one or more control hairs are assigned such that the assigned hairs are combed in accordance with the corresponding combing direction curve.

In addition, at step 335, for each curve, bend, curvature and fallout parameters are defined. The bend parameter defines how close the control hair is to the surface. The curvature parameter indicates the shape of the hair. For example, a curvature value of zero may indicate the hair is to be straight up and a maximum value (e.g., 1) may indicate the hair is bent on a tight arc from root to tip.

The fallout value indicates a region beyond which the combing direction curve decreases its influence the further away the control hair is from the curve. In some embodiments, the fallout region is specified to cover relatively large areas so all control hairs are equally affected and fallout does not occur. In other embodiments it is desirable to decrease the combing effect, the further the distance between the control hair and the combing direction curve.

At step 340, each control hair is processed according to the combing direction curve it is assigned to, and the bend, curvature and fallout parameters. The result of the process is illustrated by FIG. 3d in which the hairs are combed in the direction of the combing direction curve 365. In addition, the hairs are curved according to the bend and curvature parameters defined. In the present example the fallout parameter defines the entire surface such all hairs are equally affected and fallout is not present.

As noted above, animated combing may also be applied, step 345. Key framing, known in the art, is used to interpolate between combing changes specified at certain frames to proving smooth transitions between changes. Thus for example, bend curvature and fallout parameters may be specified to change at certain frames. The key framing process execution then transitions during the frames between the specified frame changes. This technique can be used to simulate a variety of conditions which affect the look of the hair, such as wind. Thus, the hairs can be animated by key framing the parameters and executing the combing calculations at each frame during playback.

The combing process may also include a simple hair/surface collision model process in which hairs that intersect with the underlying surface due to the combing process are pushed back up to be above the surface. Hairs may be rotated to intersect the underlying surface due to, for example, by setting the bend parameter to a large value.

The process includes an iterative algorithm that determines hair/surface intersections. For example, the process performs a line segment intersection check of successive control vertices of a curve (e.g., the NURBS curve) defining a control hair with the surface. If a control vertex c goes below the surface, the hair is rotated back towards the surface normal from the previous non-intersecting vertex just enough for c to clear the surface. The amount of rotation is large enough to cause the hair to rotate back up above the surface by a small amount specified by the application. Thus the vertices of the vector affected by the combing are rotated back towards the surface normal so that the vector is above the surface.

In an alternate embodiment, the combing may be animated by turning each control vertex of a control hair into a particle, and applying dynamic effects like gravity and external forces.

Software, such as Maya, available by Alias|Wavefront, a division of Silicon Graphics, Inc., Toronto Canada, may be used to perform this function.

Once the control hairs are identified and processed (e.g., adjusted, combed), the final hairs for each patch are generated from the control hairs, step 223, FIG. 2. As noted above, in one embodiment the control hairs are first adjusted along surface boundaries. In an alternate embodiment, combing may be applied to control hairs alone or in conjunction with application of the surface boundary adjustment process.

Figure 5:
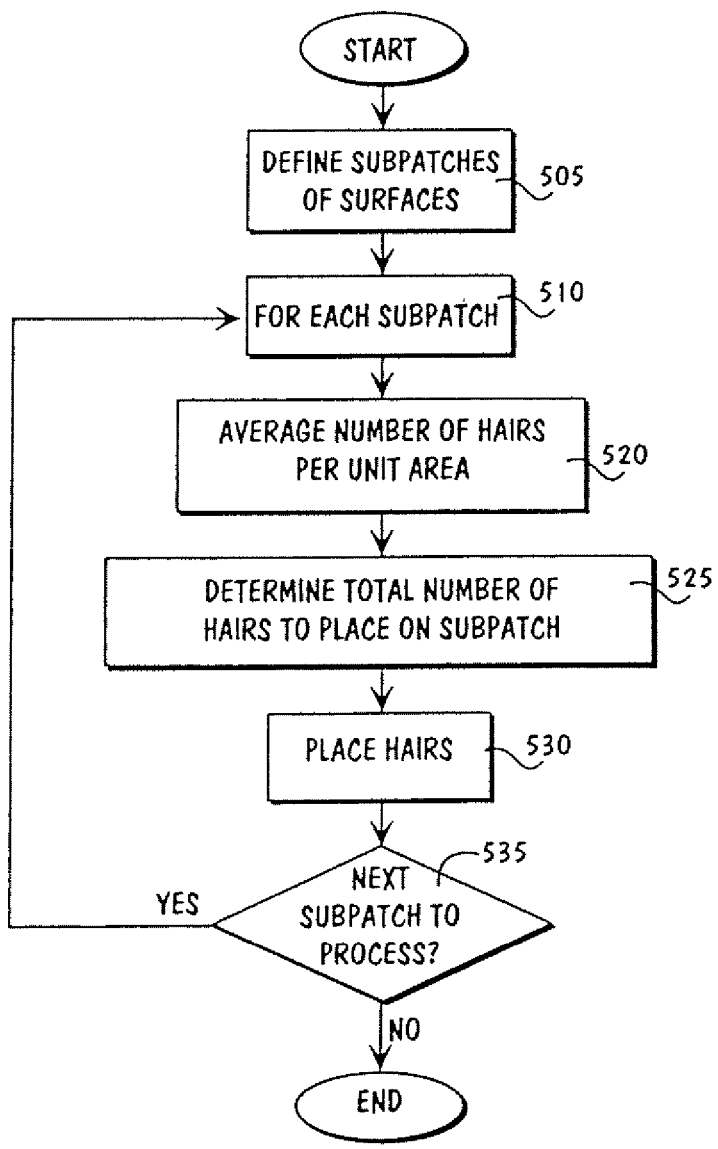
FIG. 5 is a flow chart illustrating one embodiment of a process for placing hairs.

One exemplary process for the placement of hairs on patches is illustrated by the flow chart of FIG. 5. In this embodiment, final hairs are generated from control hairs in two set steps. First, the static hair features are calculated, e.g., the placement (the u, v position) of the final hairs. This step may be performed once. The second set of steps may be performed for each frame in an animation and provide frame dependent hair features.

Figure 6:
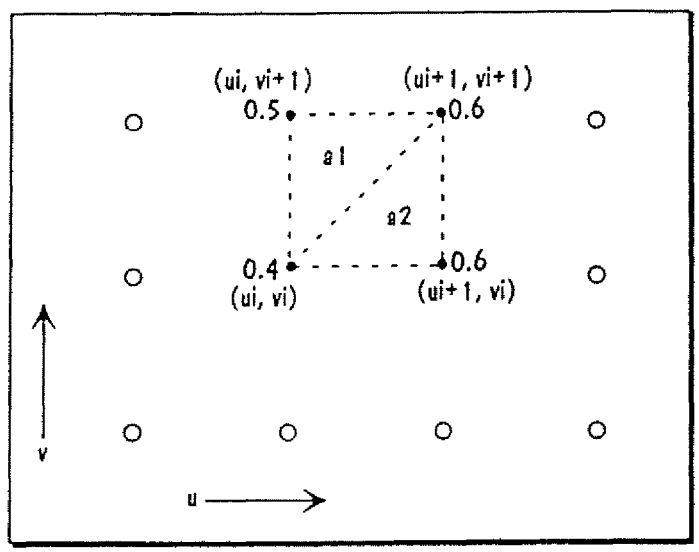
FIG. 6 illustrates one example of subpatches defined on the surface.

At step 505, subpatches are identified on a surface of the object on which the hairs are to be generated. FIG. 6 illustrates one embodiment for placing the final hairs on the surfaces defining the underlying skin. In the present embodiment, the root positions for each final hair are determined in terms of (u, v) parametric values of the surface. They are computed from an overall (global to all surfaces) density input value dmax (number of hairs per square unit area), and a set of normalized local density values (values range from 0 to 1; default value may be 1) per surface patch, arranged at a variable resolution grid of equally spaced points on the surface (for example, 128×128 points).

In one embodiment, the process attempts to make the number of hairs independent of the resolution of this grid and independent of the surface patch size to provide seamless density across surfaces of different scale. For purposes of discussion, it is assumed that the specified input density value (dmax) is 10 hairs/unit square area, and the local density values are arranged at equally spaced points on the surface as shown in FIG. 6 (e.g., 0.4, 0.5, 0.6, 0.6 hairs, respectively). These points define the subpatches of the surface to be processed, step 505, FIG. 5. As these equally spaced points are traversed, step 510, the area in (u, v) space between the neighboring points is approximated by the area defined by two polygons, more particularly, triangles (a1 and a2), and the number of hairs/square unit area for each triangle hair unit is averaged from the values at its vertices step 520. In one embodiment, this is determined according to the following: HairUnit=dmax*Vavg, where dmax represents the specified input density value and Vavg represents the average local density value for each triangle determined from values at its vertices. For the example defined, this results in 10*(0.4+0.5+0.6)/3=5 and 10*(0.4+0.6+0.6)/3=5.333 hairs/square unit area for the top left and bottom right triangle, respectively.

At step 525, the total number of hairs to place on the current subpatch is determined from the actual approximated area of the subpatch (a1 and a2) and the number of hairs per unit area. In one embodiment, the total number of hairs per unit area is determined according to the following: HairTotal=A*HairUnit, where A represents the actual approximated area of the subpatch. For example, if a value of 0.4 applies to area a1 and 0.3 applies to area a2, as assumed for purposes of discussion, 0.4*5+0.3*5.333=3.5999 is the total number of hairs to place in subpatch defined by (ui, vi), (ui, vi+1), (ui+1, vi+1), (ui+1, vi).

At step 530, the final hairs are placed. Since it is preferable not to place fractional hairs, either 3 or 4 hairs are placed depending on whether a uniformly generated random number in [0,1] is bigger or smaller than the fractional part (0.5999).

The 3 or 4 control hairs are randomly placed in u [ui, ui+1] and randomly in v [vi, vi+1]. The process then proceeds back to step 515 to the subpatch defined by the next four equally spaced points.

Figure 7A:
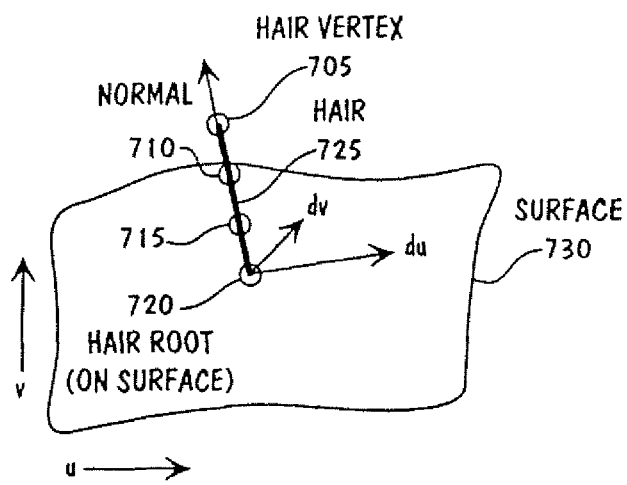
FIG. 7a illustrates an example of control vertices of one control hair.

Each final hair contains a number of control vertices. The root position (first control vertex) of each control hair is specified in terms of a (u,v) value of the underlying surface. The remaining control vertices of each hair are defined in a known local coordinate system with origins specified at the hair root position, and axes in the direction of the surface normal, du, dv. In one embodiment, each hair is oriented along the surface normal and the coordinates of the control vertices are generated by subdividing the length of each hair into n−1 equal parts, where n is the number of control vertices/hair. One example is illustrated in FIG. 7a, where a hair 725 is defined on surface 730 with n=4. The root is vertex 720 and the remaining vertices are 705, 710 and 715.

Once the root position is calculated the enclosing control hairs (in one embodiment three) for each final hair are determined. In one embodiment, a 2-dimensional Delaunay triangulation (know in the art and therefore not further discussed herein) is constructed of the (u,v) positions of the control hairs for each surface patch. This triangulation was chosen because it creates "well-proportioned" triangles, by minimizing the circumcircle and maximizing the minimal angles of the triangles. Once the Delaunay triangulation is constructed, it is determined which triangle each final hair falls into. The indices of the three control hairs which form the particular triangle are assigned to the hair that falls into that triangle.

Figure 7B:
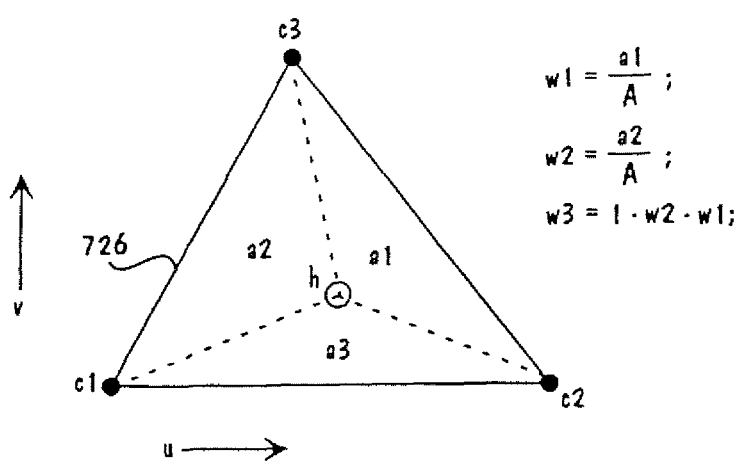
FIG. 7b illustrates an example for calculating control hair weights.

The weights (w1, w2, w3) which each of the three control hairs (c1, c2, c3) has on the final hair (h) are then calculated. This may be done using barycentric coordinates (know in the art and not further discussed here), and is illustrated in FIG. 7b, where "A" represents the area of triangle 726 (c1, c2, c3). These weights are used for interpolating the final hairs from the control hairs as explained below.

Figure 7C:
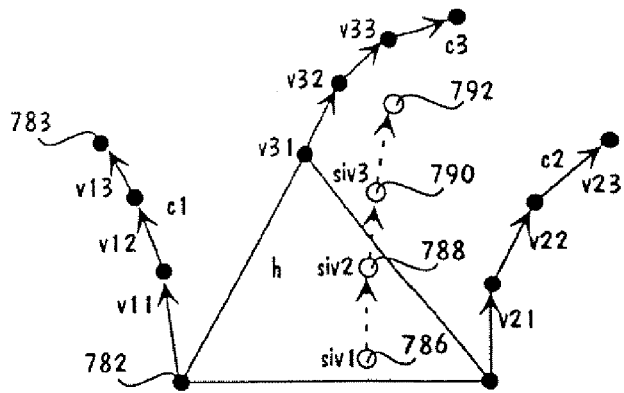
FIG. 7c illustrates an example an interpolation process used to calculate orientations of final hairs in accordance with the teachings of one embodiment of the present invention.
Figure 7D:
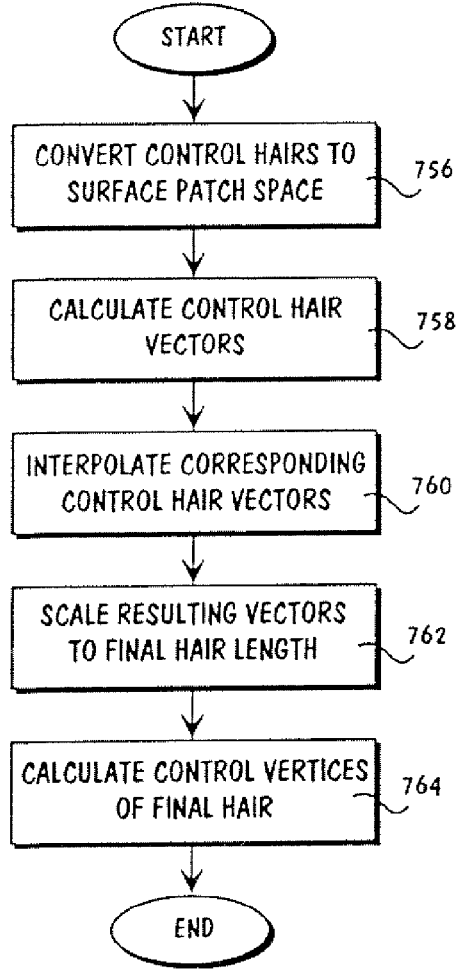
FIG. 7d is a simplified flow diagram of one embodiment for the calculation of the orientation of final hairs.

The above information of each final hair (i.e., the (u, v) position, the 3 enclosing control hairs, and the weights of each control hair) may be generated only once for an object in animation. This information is referred to herein as the static information. In contrast, the calculation of the orientation of each final hair may be done at each frame of an animation. This orientation is determined from the orientation of the control hairs and their corresponding weights by an interpolation process as explained with reference to FIGS. 7c and 7d.

For each final hair (h) at step 756, the corresponding three control hairs (c1, c2, c3) are converted into a surface patch space (in one embodiment, the patch coordinate system) utilized. At step 758, control hair vectors, (e.g., v11, v12, v13), between control vertices are calculated (e.g., 782, 783). A variety of techniques may be used to calculate the control hair vectors; in one embodiment, the vectors are equally distributed between control vertices. The control hair vectors are then normalized (e.g., nv11, nv12, nv13). At step 760 the corresponding control hair vectors of the three control hairs are interpolated and multiplied by the three determined weights that were calculated for the final hair. In one embodiment, for example, one control hair vector is determined according to the following equation:

$$iv1 = nv11*w1 + nv21*w2 + nv31*w3;$$

wherein iv1 represents the interpolated, weighted control hair vector representation of the final hair, nv11, nv21 and nv31 represent normalized control vectors and w1, w2 and w3 represent the corresponding weights for the normalized control vectors. At step 762, the resulting vectors are scaled to a final hair length (siv1, siv2, siv3). Once the scaled vectors are determined, at step 764 the control vertices (786, 788, 790, 792) of the final hair are calculated from the scaled vectors.

As illustrated in FIG. 2, steps 225, 230, 235 and 245 may be optional and may not be necessary to produce a groomed, dry fur coat. Steps 225, and 230 are applied for the generation of wet fur. Clumping of hairs can occur when the fur gets wet due to the surface tension or cohesion of water. The effect is that the tips of neighboring hairs (a bunch of hairs) tend to gravitate towards the same point, creating a kind of cone-shaped "super-hair", or circular clump. As will be described below, step 225 is executed for static area clumping that generates hair clumps in fixed predefined areas. Step 230 is executed for animated area clumping, that is, when clumping areas move on the model, for example, to simulate spouts of water or raindrops hitting the fur and making it increasingly wet. In both cases, parameters which can be animated are provided to achieve various degrees of dry-to-wet fur looks. Step 235 is applied to generate dry fur clumping or breaking.

According to a particular application all or some of the steps 225, 230 and 235 may be executed. In addition, the steps 225, 230 and 235 may be prioritized according to an application such that a hair adjusted in a higher priority step is not adjusted in the other steps. Alternately, the effects may be cumulative or selectively cumulative depending upon a particular application.

At step 225 static area clumping is performed. One embodiment of this process is described with reference to FIG. 8. For purposes of discussion, the center hair of each clump is referred to as the clump-center hair, and all the other member hairs of that clump, which are attracted to this clump center hair, are referred to herein as clump hairs.

In one embodiment there are four clumping input parameters: clump-density, clump-size, clump-percent and clump-rate. Similar to the hair-density parameter, clump-density specifies how many clumps should be generated per square area. The process described herein translates the clump density into an actual number of clumps defined by clump-center hairs, the number of clump center hairs depending on the size of each surface patch. As a result, some of the existing hairs are turned into clump-center hairs.

Clump-size defines the area of a clump. In one embodiment, the clump size is defined in world space, a space that a user typically references with respect to a size of an object. In one embodiment, clump density takes priority over clump size, such that if there are many clumps and most of them overlap, the clump size cannot be maintained, since a clump hair can be a member of only one clump. If both clump density and size are small, many hairs between the clumps will not be clumped.

Figure 8:
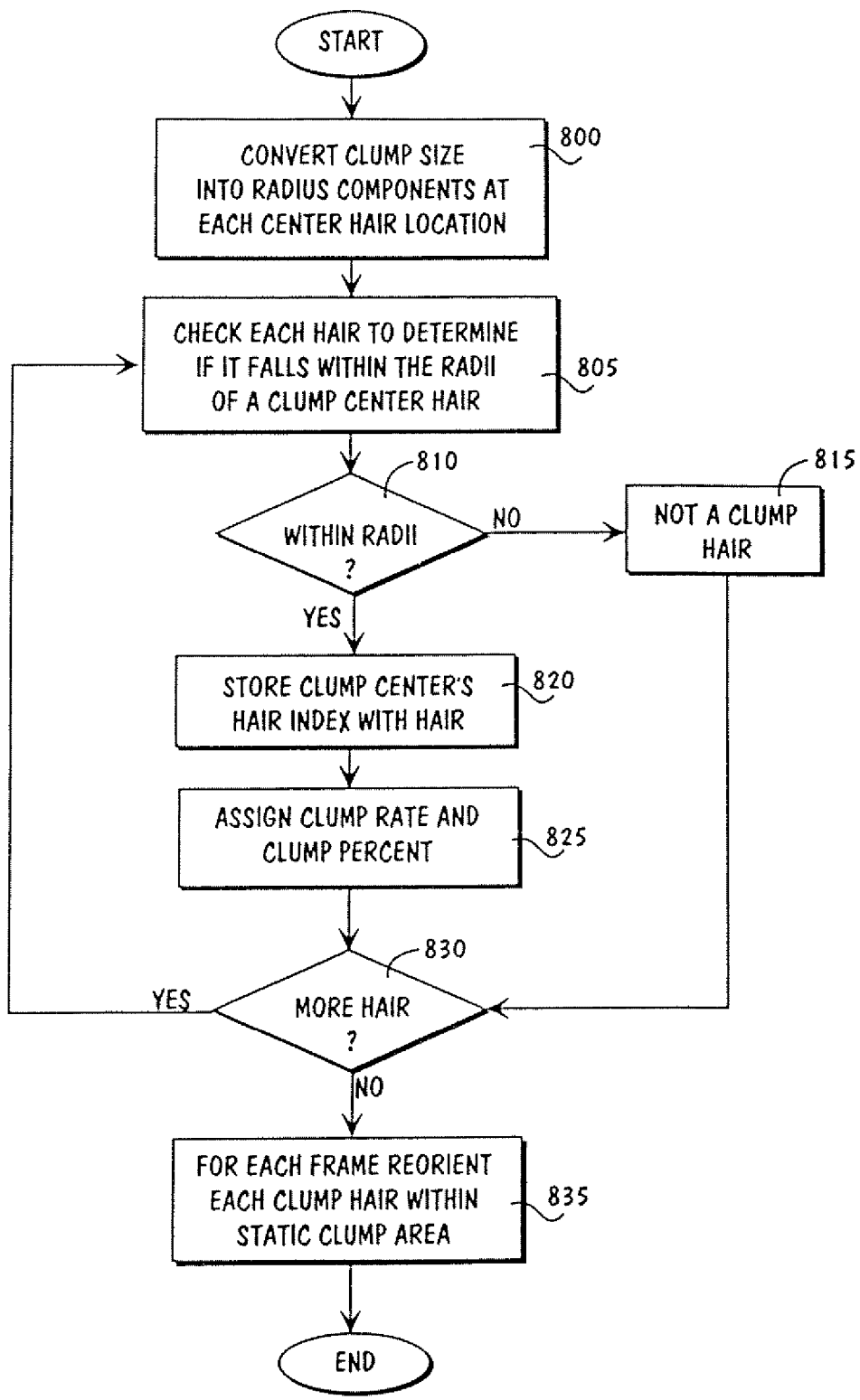
FIG. 8 is a flow chart illustrating one embodiment of a process to perform static clumping.

Referring to FIG. 8, to determine clump membership of each final hair (i.e., what clump each hair belongs to, if any), the clump of the specified clump-size is converted into u-radius and v-radius components in parametric surface space at each clump-center hair location, step 800. Each hair is evaluated at steps 805, 810 to determine whether it falls within the u, v radius components of a corresponding clump-center hair. If the hair is not within the u, v radius components, the hair is not a clump hair, step 815 and the process continues, step 830, with the next hair. If the hair is within the u, v radius components, at step 820 the clump-center hair's index is referenced with the hair. In addition, a clump rate and clump percent is assigned, step 825.

A number of variations are contemplated. A clump-size noise parameter may be introduced to produce random variations in the size of the clumps. Feature (texture) maps for a clump-size can be created and specified by the user, one per surface patch, to provide local control of the radii used at steps 805, 810. In this embodiment, the global clump-size input parameter is multiplied for a particular clump (clump center hair) at (u,v) on a surface patch with the corresponding normalized (s,t) value in the clump-size feature map for that surface. Also, a static clump-area feature map can be provided to limit clumping to specified areas on surface patches rather than the whole model.

In one embodiment a clump-percent and clump-rate value is assigned to each clump hair (step 825). In one embodiment, the values for both range between [0,1], and are used subsequently to reorient clump hairs, step 835, as described below.

Clump-percent specifies the degree of clumping for a clump hair. For example, a value of zero indicates that the hair is not clumped at all, i.e., it is like a "dry" hair. A value of one indicates that the hair is fully attracted to its clump-center hair, i.e., the tip of the hair (its distant control vertex) is in the same location as the tip of the clump-center hair.

Figure 9:
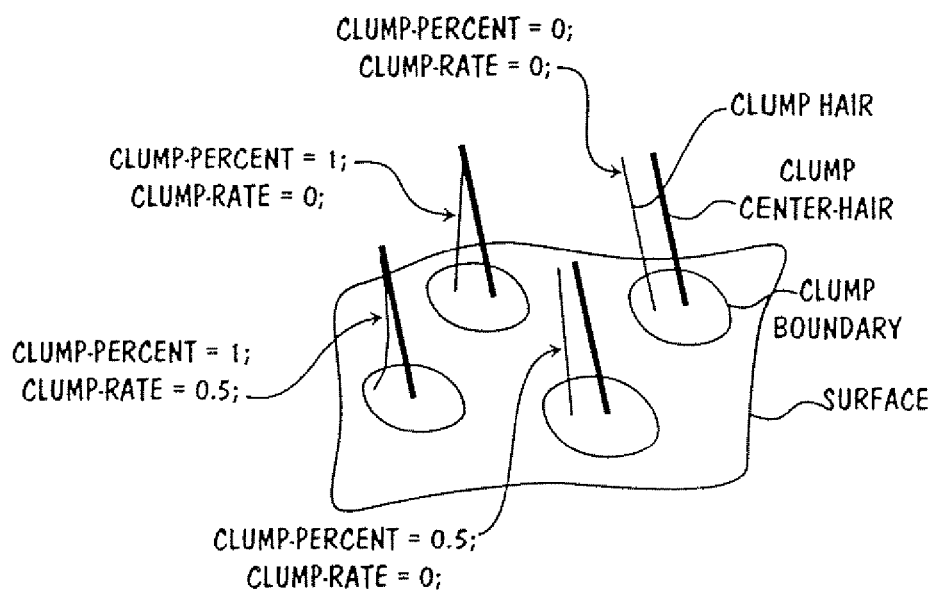
FIG. 9 illustrates examples of different clump-percent and clump-rate values.

Clump-rate defines how tightly a clump hair clumps with its corresponding clump-center hair. For example, a value of zero indicates that the clump hair is linearly increasingly attracted to its clump-center hair, from the root to the tip. A clump-rate value closer to one indicates that the hair's control vertices closer to the root are proportionally more attracted to corresponding clump-center hair vertices than those closer to the tip, which results in tighter clumps. Examples of different values for clump-percent and clump-rate are given in FIG. 9.

At step 835, the control vertices (except the root vertex) of each clump hair are reoriented towards corresponding clump-center hair vertices from the clump hair's dry, combed position determined at steps 200, 210, 215, 220, and 223.

In one embodiment, this process is performed at each frame. In one embodiment, the default value for number of control vertices (CVs) is 3 (4 minus the root vertex), and the index for the current control vertex i ranges from 1-3. In one embodiment, the reorientation is determined as follows: clumpHairCV[i]=clumpHairCV[i]+delta*(clumpCenterHairCV[i]-clumpHairCV[i]) delta=clumpPercent*(fract+clumpRate*(1−fract)); where fract=i/numberOfCVs; clumpHairCV[i] represents a clump hair vertex; clumpCenterHairCV[i] represents a corresponding clump center hair vertex; i represents an index to a current control vertex; numberofCVs represents the number of control vertices of a clump hair; clumpPercent represents clump-percent; and clumpRate represents the clump-rate.

Figure 10A:
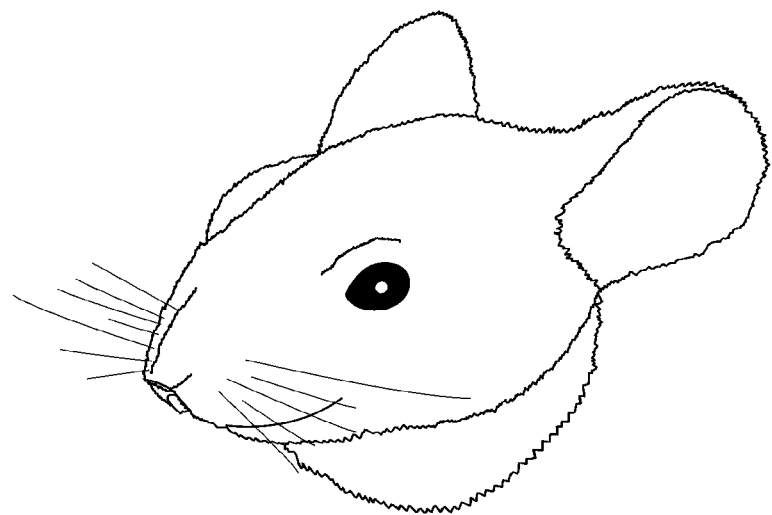
FIG. 10a shows a rendered frame of a combed fur coat and FIGS. 10b, 10c and 10d show snapshots of one embodiment of an animated dry-to-wet fur sequence.
Figure 10B:
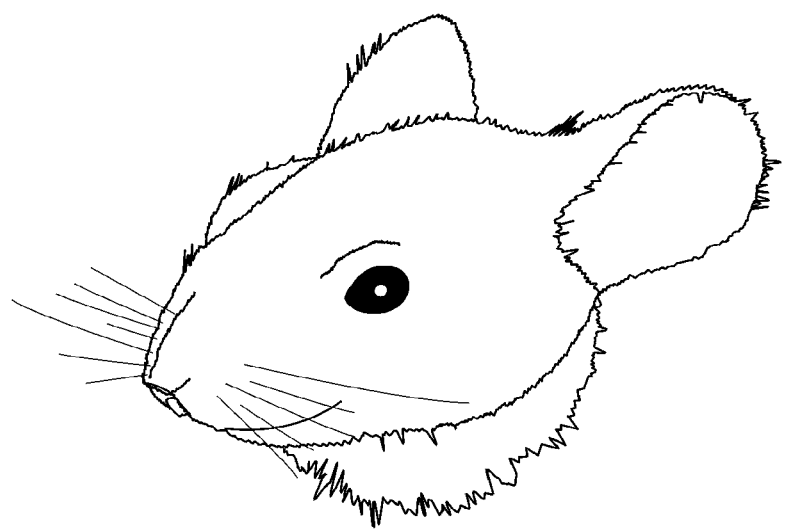
Figure 10C:
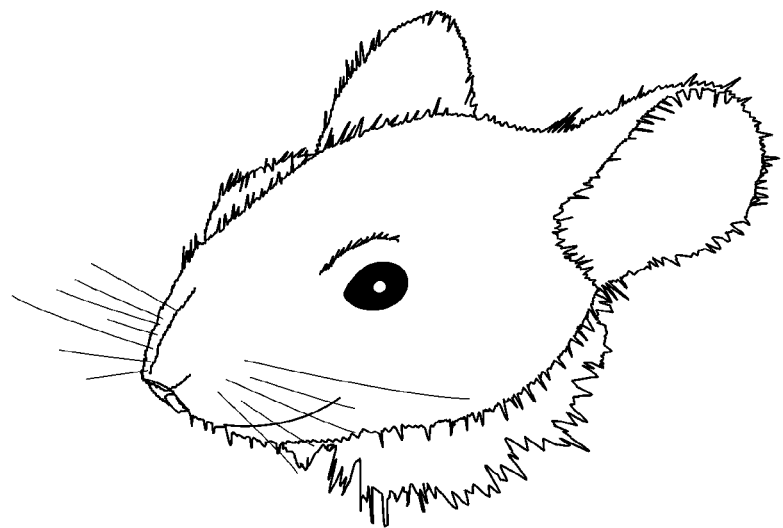
Figure 10D:
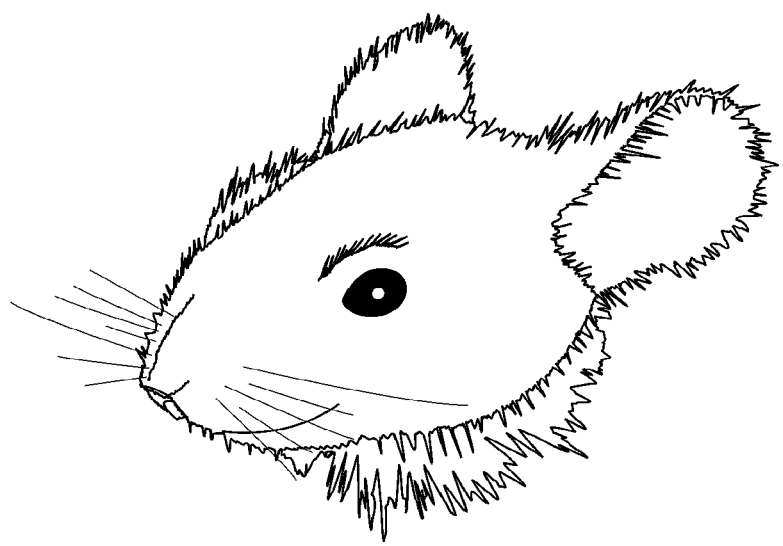

Both clump-percent and clump-rate parameters can be locally controlled via feature maps similar to the feature maps described above with respect to clump-size. Both values can also be animated or changed over time to provide continuous control for dry-to-wet-to-dry fur looks. This is illustrated by FIGS. 10*a*, 10*b*, 10*c* and 10*d* which illustrate four frames from an animated clump-percent and clump-rate sequence. In the image of FIG. 10*a* the clump-percent and clump-rate are both zero and may represent dry, combed hair. In the image of FIG. 10*b*, clump-percent is 0.7 and clump-rate is 0, which results in a slightly wet look. In the image of FIG. 10*c*, clump-percent is 1.0 and clump-rate is 0.3, which results in a wet look. In the image of FIG. 10*d*, clump-percent and clump-rate are both 1.0, which produces a very wet look.

Animated area clumping is desirable to simulate spouts of water or raindrops hitting the fur and making it increasingly wet. At step 230, FIG. 2, animated clumping is performed. In one embodiment, the animated clumping areas are defined in an animation system.

Figure 11:
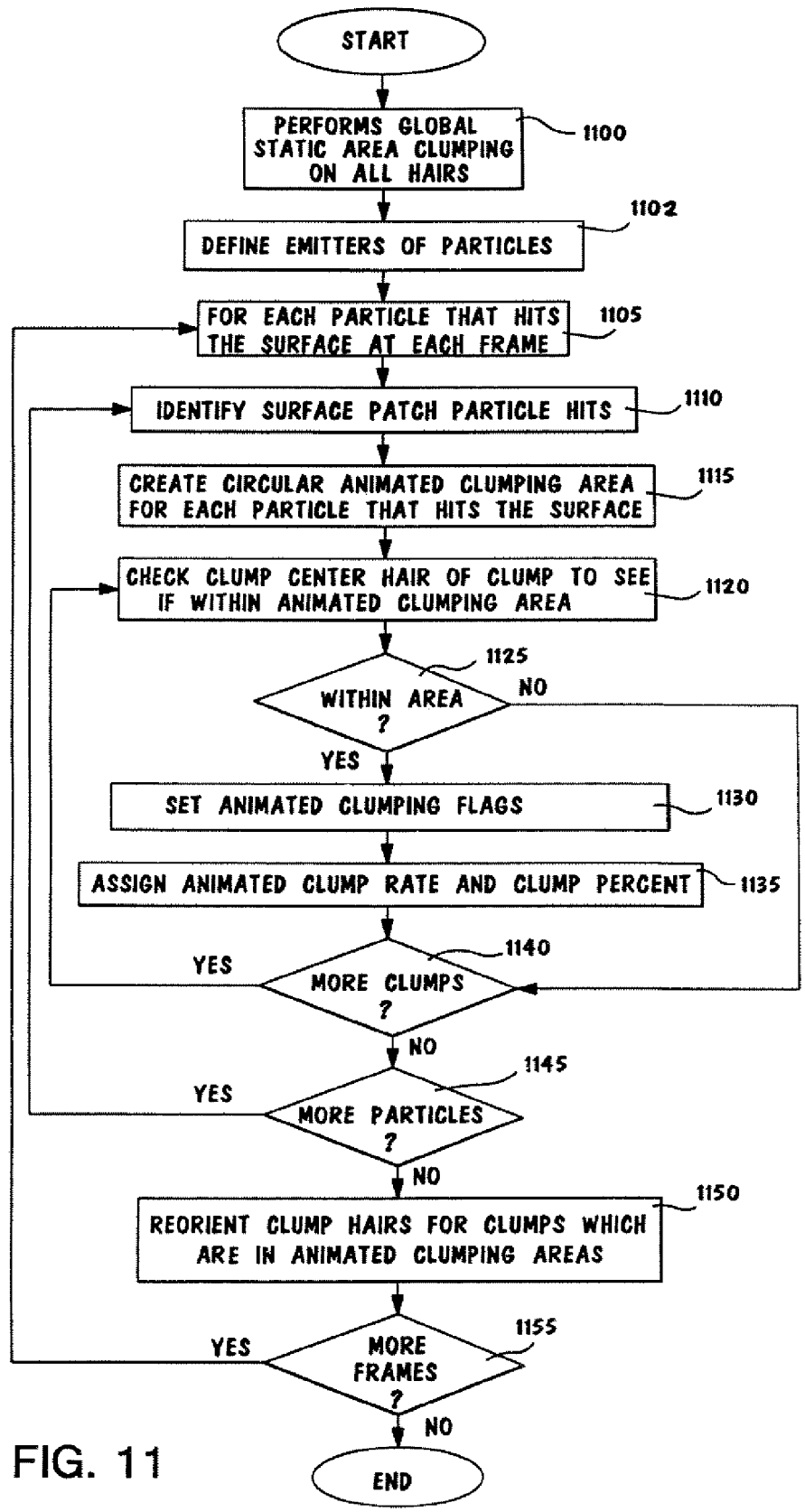
FIG. 11 is a flow chart illustrating one embodiment of a process for animated area clumping.

One embodiment of the process is described with reference to FIG. 11. In one embodiment, clumping areas are defined by particles hitting surface patches. Other embodiments may use alternate techniques for generating animated clumping areas.

At step 1100 a global static area clumping process is performed on all hairs. This step identifies clumping regions and corresponding clump center hairs and clump hairs. As explained below this information is used in the animated clumping process. In one embodiment, the global static area clumping used is that described above for static area clumping.

At step 1102, one or more emitters that generate the particles are defined. The use of emitters to generate particles is known in the art and will not be discussed in detail herein. In one embodiment, the emitters define the rate generated and spread of the particles across a surface.

At step 1105, at each frame for each particle generated that hits the surface, the surface patch the particle hits is identified, step 1110. In one embodiment, particles generated in prior frames are carried through subsequent frames such that the particles are cumulative.

For each particle that hits a surface patch, including those particles generated in prior frames, a circular animated clumping area is created, step 1115, on the patch at that (u,v) location, with clump-percent, clump-rate, and animated clumping area radius determined by a creation expression executed at the frame where the particle hits the surface so that when a particle hits the surface at that time (i.e., at the frame), the clump-percent may be set to zero and the radius may be defined to a specified value perhaps adjusted by a random noise value. Thus, the expression may be defined to provide the desired "wetness" effect.

The radius of the circular clumping area defined is converted into a corresponding u-radius and v-radius similar to the clump size discussed above. Runtime expressions executed at each frame define clump-percent and clump-rate, thus determining how quickly and how much the fur "gets" wet. For example, one runtime expression may be: MIN(FrameNumber*0.1, 1) such that as the frame number increases, the hair appears increasingly wet.

Each clump center hair of a clump (determined at step 1100) is then evaluated to determine if it falls within the animated clumping area, step 1120. To determine whether a clump falls within an animated clumping area, at each frame it is checked as to whether the (u,v) distance between the clump-center hair of the clump and the center of the animated clumping area is within the (u,v) radius parameters of the animated clumping area. For clumps that are located in overlapping animated clumping areas, the values for clump-percent and clump-rate are added resulting in the generation of wetter fur.

If the clump center hair is within the animated clumping area, step 1125, the corresponding clump is flagged with an animated clumping flag such that the clump hairs are subsequently reoriented to reflect the animated clumping effect. Alternately, each clump hair of the clump may have an animated clumping flag which is set if the corresponding clump center hair is determined to be within an animated clumping area. In addition, an animated clump-rate value and an animated clump-percent value are assigned to the clump hairs that are identified to be within an animated clumping area in accordance with a runtime expression. In one embodiment, the values for clump-percent and clump-rate for each clump within an animated clumping area are replaced with the corresponding values for the animated clumping area at each frame. As animated clumping areas may be much bigger than a clump, an animated clumping area may contain several individual clumps. Each clump is evaluated, step 1140, for each particle, step 1145.

It should be noted that animated clumping areas could straddle surface patch boundaries. For example, the center of an animated clumping area may be located on one surface patch, but the area may be located on one or more other patches. Since the animated clumping areas are typically defined and therefore associated with the surface which contains the center of the animated clumping area, i.e., the position where the particle hit, portions of a clumping area straddling neighboring patches may be overlooked. This could lead to discontinuities in clumping of the final fur.

In one embodiment, this potential problem is addressed. Whenever a new particle hits a surface and the (u,v) radii exceed the boundaries of that surface; an additional (u,v) center and (u,v) radii is generated for the animated clumping areas affecting neighboring patches. Thus, for example, if the clumping area covers portions of two neighboring patches, a corresponding (u.v) center and radii are generated for each neighboring patch to provide additional animated clumping areas for evaluation at steps 1120-1140

At step 1150, for each frame, the clump hairs of clumps that are within the animated clumping areas are reoriented. Thus, clump hairs are selectively adjusted if they are within an animated clumping area. In one embodiment, clumping is restricted to the animated clumping areas at each frame, so that final hairs of clumps outside the animated clumping areas are normally produced as "dry" hairs.

At step 1155, if more frames are to be processed, the process continues again at step 1105. Thus the animated clumping process is performed across multiple frames to provide animated effects.

Referring back to FIG. 2, step 235 may be applied to generate the effect of hair breaking or dry fur clumping by breaking up the groomed fur coat along certain lines (fur tracks or break line) on the underlying skin (surfaces). As described below, this process may include two kinds of hair breaking: symmetric and one-sided. In symmetric breaking, hairs on both sides of a fur-track "break" towards that track, whereas in one-sided breaking, hairs on one side of the track break away from the track.

In one embodiment, fur tracks are specified as curves on surfaces in an animation system. Each track has a radius, break-percent and break-rate for symmetric and one-sided breaking, and an additional break-vector for one sided breaking. The final information generated is output into breaking files that are subsequently accessed to reorient the affected hairs.

Figure 12A:
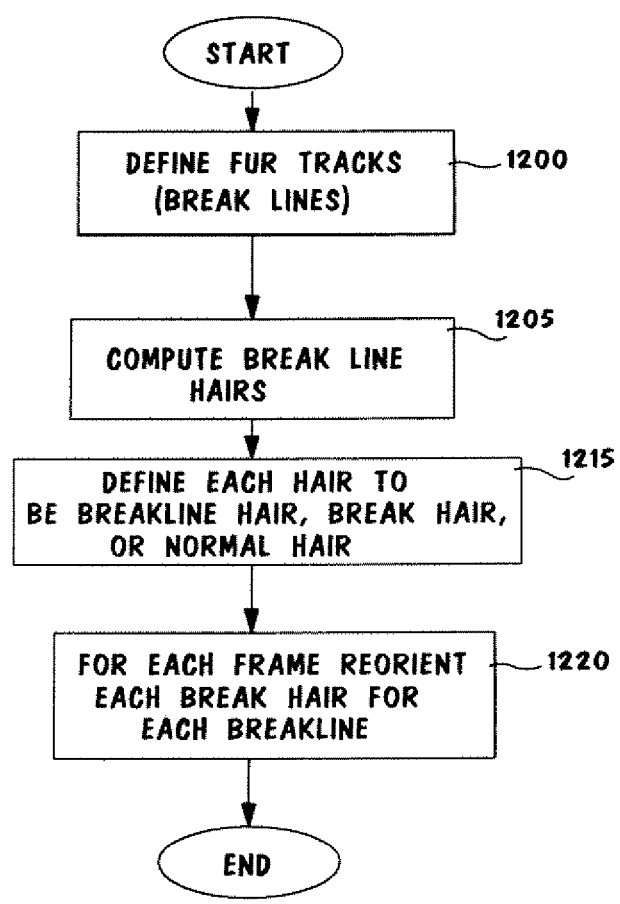
FIG. 12a is a flow chart illustrating one embodiment of a process for hair breaking.

One embodiment of the hair breaking technique is illustrated by FIG. 12a. At step 1200 the fur tracks are defined. The fur tracks may be defined similar to clumps by defining a (u,v) break radii. At step 1205 the break line hairs (hairs which lie on or are very close to the fur-track curve defined by the curve defined for the fur track) are computed. Using the break line hairs and break radii, at steps 1215, 1220, each hair is evaluated to determine whether the hair lies within the (u,v) break radii on both sides of the break line hairs in case of symmetric breaking, or to one side specified by the break vector (the break vector side) in case of one-sided breaking. For each hair within the space specified by the radii, referred to herein as a break hair, the corresponding break line hair (hair on the fur track) is then determined as the one closest to it. The hairs are labeled as break line hairs, break hairs with indices to their corresponding break line hairs, or normal hairs that do not reside within the areas specified by the break.

Figure 12B:
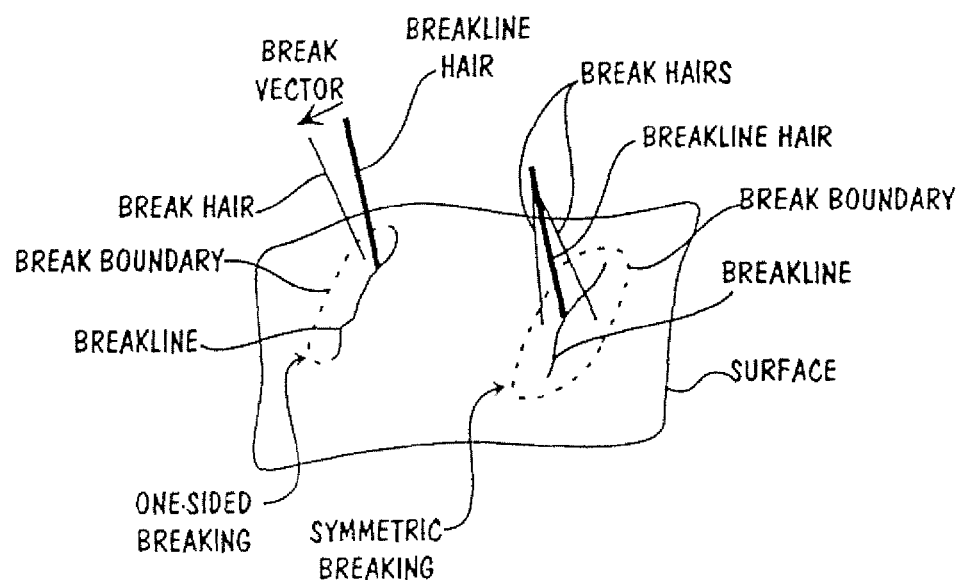
FIG. 12b illustrates examples of symmetric and one-sided breaking of hairs.

It should be noted that for instances of one-sided breaking, each break hair is now reoriented "away" from its corresponding break line hair in the direction of the break-vector, rather than "towards" the break line hair. Examples of symmetric and one-sided breaking are shown in FIG. 12b.

The break hairs are reoriented with respect to their corresponding break line hairs, step 237. For symmetric breaking, this process is analogous to the process performed for clump hairs discussed earlier. However, for break hairs, the break-percent and break-rate values are used in place of the clump-percent and clump-rate used for clump hairs. For one-sided breaking, break hairs are repelled, as opposed to attracted to the break-line hairs according to the break-percent and break-rate parameters.

Figure 12C:
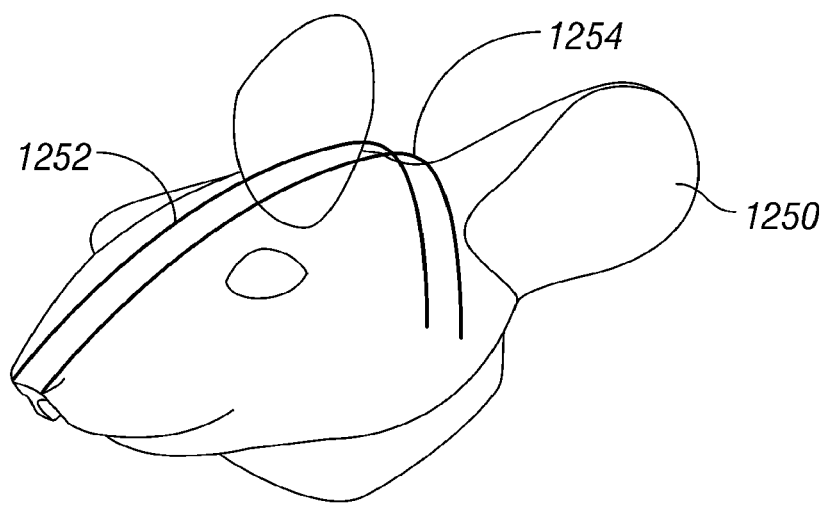
FIGS. 12c, 12d, 12e, and 12f illustrate examples of breaking effects.
Figure 12D:
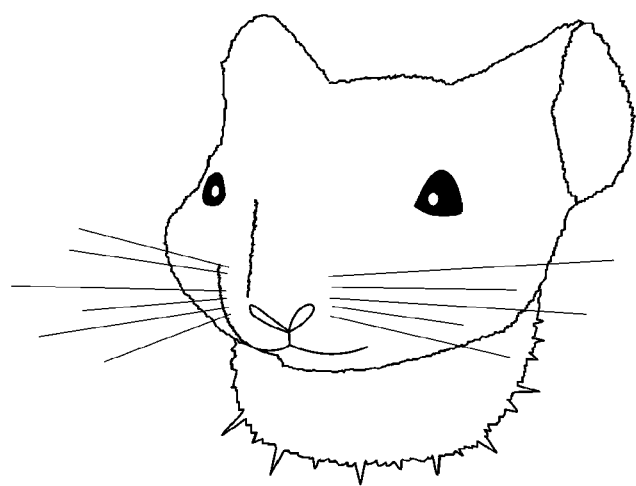
Figure 12E:
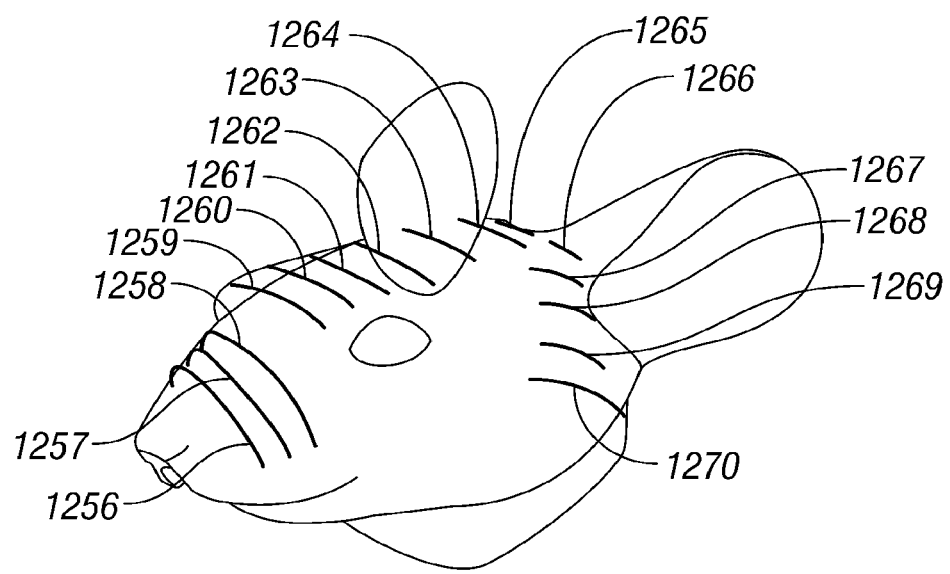
Figure 12F:
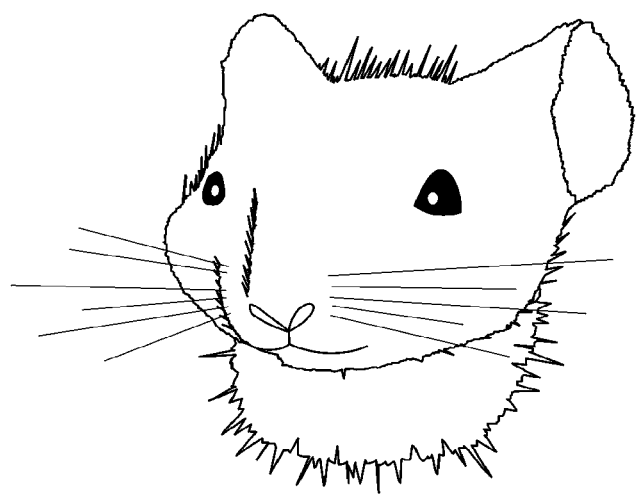

The breaking effect is illustrated by FIGS. 12c, 12d 12e and 12f. FIG. 12c illustrates an object 1250 having break line hairs 1252, 1254. FIG. 12d shows the resultant effect on the object for symmetric breaking. FIGS. 12e and 12f illustrate one-sided breaking along break line hairs 1256-1270.

Figure 13A:
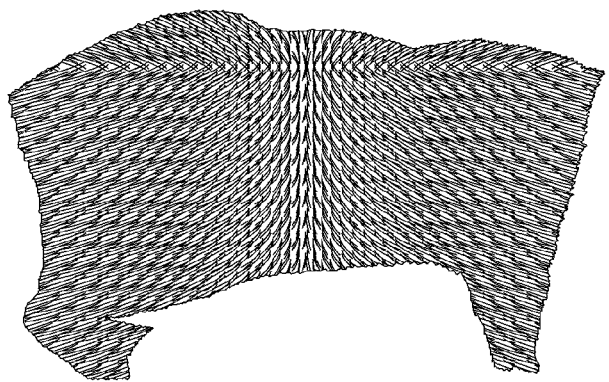
FIGS. 13a, 13b, and 13c illustrate the visual effects of undercoat and overcoat.
Figure 13B:
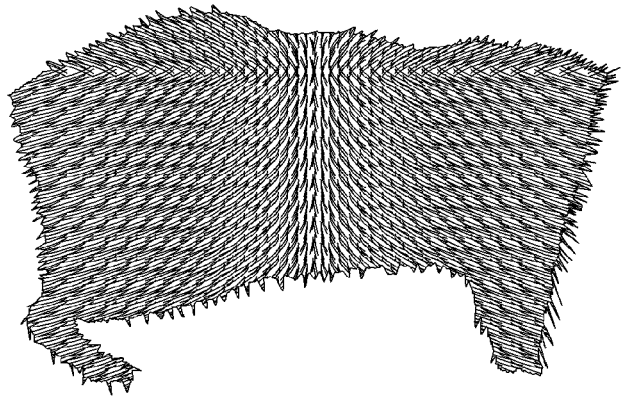
Figure 13C:
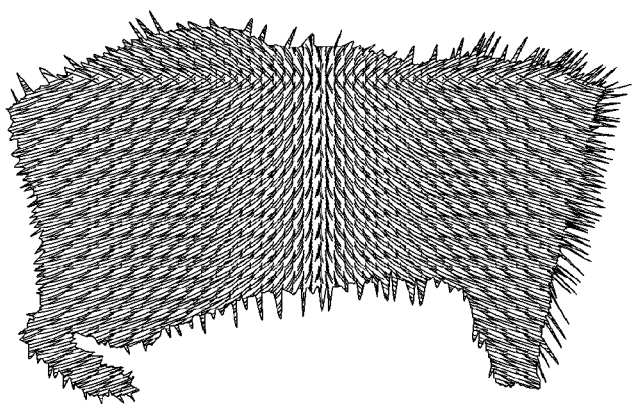

At step 245, FIG. 2, a decision is made as to whether multiple passes of the process are to be performed. The coat of most furred animals is composed of a fuzzier, thinner shorter layer of hairs called undercoat, plus an overcoat of longer and thicker hairs. Step 245 illustrates the capability to perform a two-(or multiple)-pass process, whereby steps 210, 215, 220 and 223 (and optionally 225, 230, and 235) are executed more than once, producing a different set of hairs at each pass. These sets or layers are then processed and combined at render-time (step 250). The effects can be seen by reference to FIGS. 13a, 13b and 13c. FIG. 13a is a representation of an undercoat generated in accordance with the teaching of the present invention. FIG. 13b represents a representation of the overcoat and FIG. 13c represents the combined image consisting of the undercoat and overcoat.

As illustrated by step 250, the clumped hairs represented by their control vertices are rendered into a series of two-dimensional images to create lifelike dry and wet hair looks. In one embodiment, the process functions to project a three-dimensional hair geometry onto a two-dimensional image plane from the perspective of a particular point of view.

In order to render large amounts of hair quickly and efficiently, the geometric model of each hair may be kept simple. As explained above, a hair is represented by a parametric curve having a determined number of control vertices (in one embodiment, the default is four).

In one embodiment, the process employs known rendering technology to produce the hairs described by the corresponding control vertices. In an alternate embodiment customized modules are added to realistically "shade" the hairs. This may be accomplished by assigning an intensity of color at each point along or on a hair, wherein points along a hair may be defined as the pixels which compose the hair.

During the rendering of the hairs, a width is added for each hair to transform it into a narrow ribbon that is always oriented towards the camera or view point. The shading process properly shades these ribbon primitives to more realistically present them as thin hairs.

Figure 14:
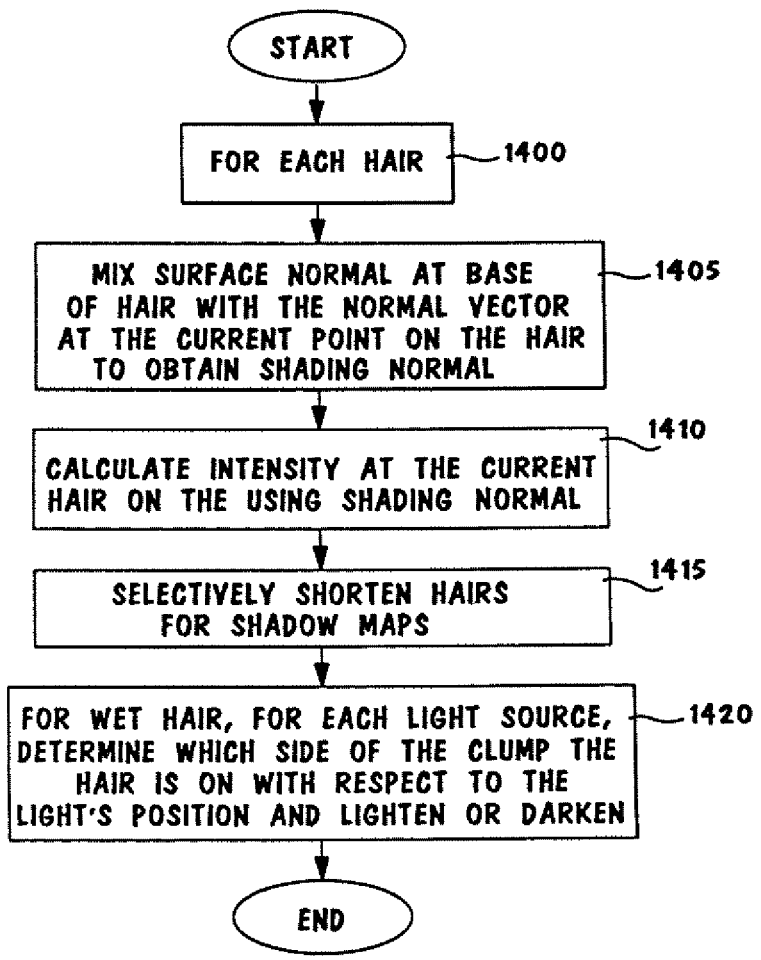
FIG. 14 is a flow chart illustrating one embodiment of a shading process.

One embodiment of the shading process is set forth in the flow chart of FIG. 14. At step 1400, each hair is processed. At step 1405, for each hair, the surface normal at the base of the hair is mixed with the normal vector at the current point on the hair in order to obtain a shading normal at the current point on the hair. In one embodiment, the hairs are rendered as a series of points or pixels on a display. Thus, the current point is one of the pixels representing a hair.

The shading process may be applied at multiple points along the hair. In one embodiment, the amount with which each of these vectors contributes to the mix is based on the angle between the tangent vector at the current point on the hair, and the surface normal vector at the base of the hair. The smaller this angle, the more the surface normal contributes to the shading normal.

At step 1410 the intensity of the hair at the current point on the hair is determined using the shading normal at that point. In one embodiment, a Lambertian model is used to calculate these intensities. Using this approach provides the benefit of allowing the user to light the underlying skin surface and receive predictable results when fur is added. This approach also accounts for shading differences between individual hairs, and differences in shading along the length of each hair.

In order to obtain realistic shadows on the fur coat, shadow maps are used. The use of shadow maps is known in the art and will not be discussed further herein. However, incorporating the hair into the shadow maps may generate several unwanted side effects. One problem is that of dark streaking on brightly lit fur because of the fur self-shadowing. Dark streaks look wrong on brightly lit fur because normally light bounces off the skin and hair to prevent dark shadows on brightly lit fur.

In order to minimize the dark streaking effects, in one embodiment, the hairs for the shadow maps are shortened based on certain criteria, step 1415. For example, the length and density of the hair may dictate the percentage to shorten the hair. By selectively shortening hairs for the shadow maps, the hair self-shadowing effect is minimized while still producing a broken up shadow on the terminator lines for lights falling on the fur.

Back lighting is achieved in a similar fashion using a shadow map for each light located behind the furred object, and again shortening the hair on the basis of density and length in the shadow map render process. In one embodiment, a lighting model for hairs also allows each light to control its diffuse fall-off angles. Thus, lights directly behind the furred object can wrap around the object. Using these lighting controls together with shadow maps reasonable back lighting effects are achieved.

In one embodiment, the shading for clumped hairs is modified. In one embodiment, two aspects of the hair shading may be modified. First, the amount of specular on the fur is increased. Second, clumping is accounted for in the shading model. Geometrically, as explained earlier, fur is modeled in clumps to simulate what actually happens when fur gets wet. In the shading model, for each hair and for each light, the side of the clump the hair is on with respect to the light's position is determined, and the hair is either darkened or brightened based on the side the hair is on. Thus, hairs on the side of a clump facing the light are brighter than hairs on a clump facing away from the light.

ADDITIONAL EMBODIMENTS

Further embodiments of the invention relate to additional features added to the animal fur and human hair pipeline of FIG. 1b. In particular, these additional features to the pipeline are directed to producing a wide variety of stylized and photorealistic fur and hair looks for digital characters.

Figure 15:
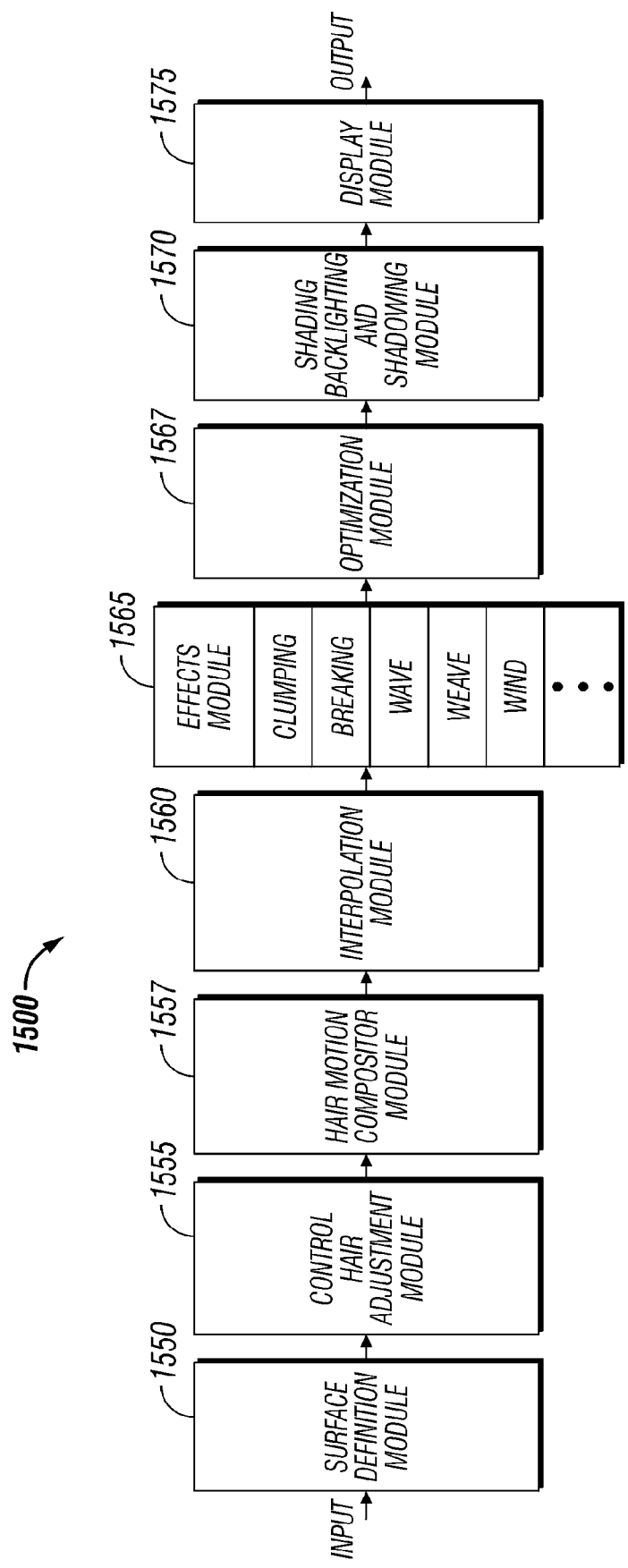
FIG. 15 is a block diagram illustrating an embodiment of a hair/fur pipeline, similar to the pipeline of FIG. 1b, but that includes additional and differing functionality.

Turning now to FIG. 15, FIG. 15 is a block diagram illustrating a hair/fur pipeline 1500, similar to the previously-described pipeline of FIG. 1b, but that includes additional and differing functionality.

As before, input, is received by surface definition module 1550. Surface definition module 1550, as previously described, defines surfaces and control hairs of the object to be rendered. Further, as previously described, control hair adjustment module 1555 adjusts control hairs to provide such functionality as combing and seamless hairs across surface boundaries.

In addition to the previously-described pipeline of FIG. 1b, a hair motion compositor module 1557 has been added to hair/fur pipeline 1500 to provide for editing and combining different hair animations, as will be described in detail hereinafter. Interpolation module 1560, as previously described, may be utilized to interpolate hairs across surfaces using control hairs.

Additionally, an effects module 1565 may be utilized as part of the hair/fur pipeline 1500 to provide various effects to hair and fur such as clumping, breaking, wave effects, weave effects, etc., as will be described in more detail hereinafter. Further, an optimization module 1567 may be utilized with hair/fur pipeline 1500 to provide methodologies to improve render times, as will be described in more detail hereinafter.

Shading, backlighting, and shadowing module 1570 may be utilized in hair/fur pipeline 1500 to provide shading, backlighting, and shadowing effects to hair/fur and display module 1575 may be utilized to render and display the final output of the object with the hair/fur surface, as previously described.

Moreover, as previously described with reference to FIG. 1*a*, it should be appreciated that the hair/fur pipeline 1500 may be implemented with a computer system having a central processing unit (CPU), memory, input/output (I/O), etc., which may be coupled to a storage device such as a disk drive or other device. Further, the computer system may include a keyboard or other user input devices as well as a display that may be used to display user interfaces and the rendering of hair/fur in accordance with the embodiments of the present invention.

In particular, embodiments of the invention are directed to techniques implemented by the previously-described pipeline 1500 of FIG. 15 related to such items as: special combing tools, different final hair interpolation algorithms, and a general application program interface (API) to perform customizable per-hair calculations in addition to rendering each final hair. Further techniques relate to: a method and system for editing and combining different hair animations referred to herein as a Hair Motion Compositor (HMC) and hair optimization strategies to improve render times. In one embodiment, the HMC may be implemented by Hair Motion Compositor module 1557 of hair/fur pipeline 1500 and the optimization strategies may be implemented by optimization module 1567 of hair/fur pipeline 1500.

Digital animals, humans, and imaginary creatures are increasingly being incorporated into movies, both live-action and computer-animated. In order to make them believable, many of these characters need persuasive hair or fur. In a production environment, where quality is paramount, a pipeline to generate hair must not only work, but also needs to be practical, robust, flexible, efficient, and powerful.

Described herein are tools and techniques which facilitate the creation of specific hair and fur looks to satisfy the appearance and expression that a director might choose for a particular show and its characters. Solutions are described which make it possible to generate convincing animal fur, produce believable human hair, and closely match the hair of real actors.

Described herein are improvements to the hair/fur rendering pipeline of FIG. 1*b*, which address and improve three of the most complex and time-consuming areas in the digital hair creation process: look development (combing), hair animation and shots, and rendering large numbers of hairs.

It should be noted that when modeling hair geometrically, problems arise with respect to human hair that are slightly different from those with animal fur. Specially, longer human hair requires much more sophisticated combing and animation tools. For animal fur, the rendering stage needs to be optimized as there are millions of individual hair strands compared to around 100,000 to 150,000 for humans.

As will be described herein, the techniques employed by hair/fur pipeline 1500 relate to producing a wide variety of hairstyles, from short animal fur to long human hair. In particular, hair/fur pipeline 1500 includes features such as: tools for modeling, animating, and rendering hair; allowing a small, arbitrary number of control hairs to define basic comb and animation features; and techniques for interpolating final rendered hair strands from these control hairs.

It should be noted that conventional 3D animation software, such as MAYA available by AUTODESK, may be utilized to provide conventional viewing functionality. Additionally, the RENDERMAN software package available by PIXAR may be utilized to aid in rendering final hair. These software packages are well known to those in the computer graphics arts.

Additional combing and control hair editing tools implemented by the hair/fur pipeline are described hereinafter. For example, in one embodiment, a basic guide-chain attached to a control hair may be used in either a forward or inverse kinematic mode to define a control hair's shape while approximately maintaining its length. It can also apply the same deformation to other selected control hairs either in world or local space. Further, an intuitive cutting tool may be utilized in which a user can sketch a curve in an orthographic view, which is then used to calculate intersections with selected control hairs and cuts them at those points.

In one particular embodiment, a combing tool is disclosed that allows for selected control hairs to be clumped together in a controlled manner.

Figure 16A:
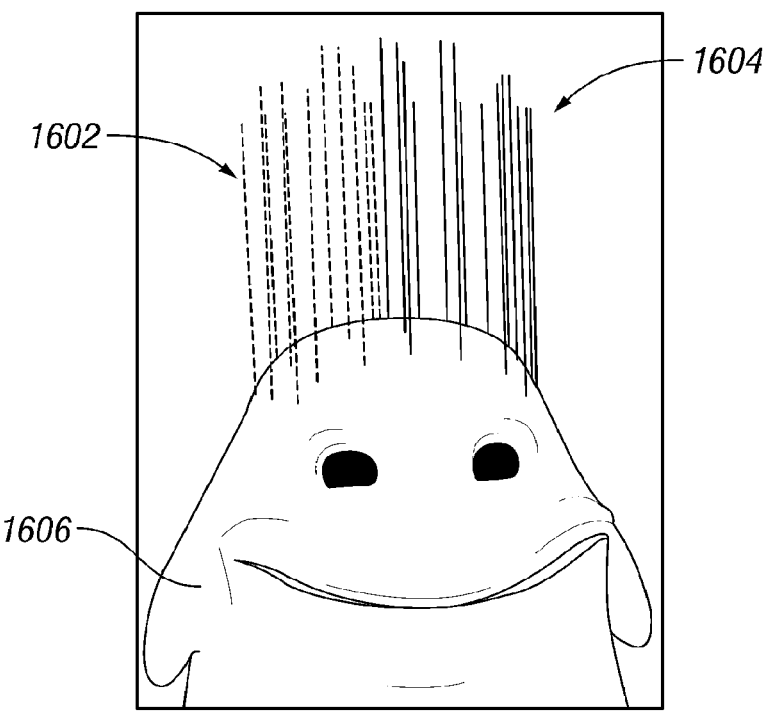
FIGS. 16a and 16b are diagrams that illustrate the clumping of control hairs with possible variations along the control hairs.
Figure 16B:
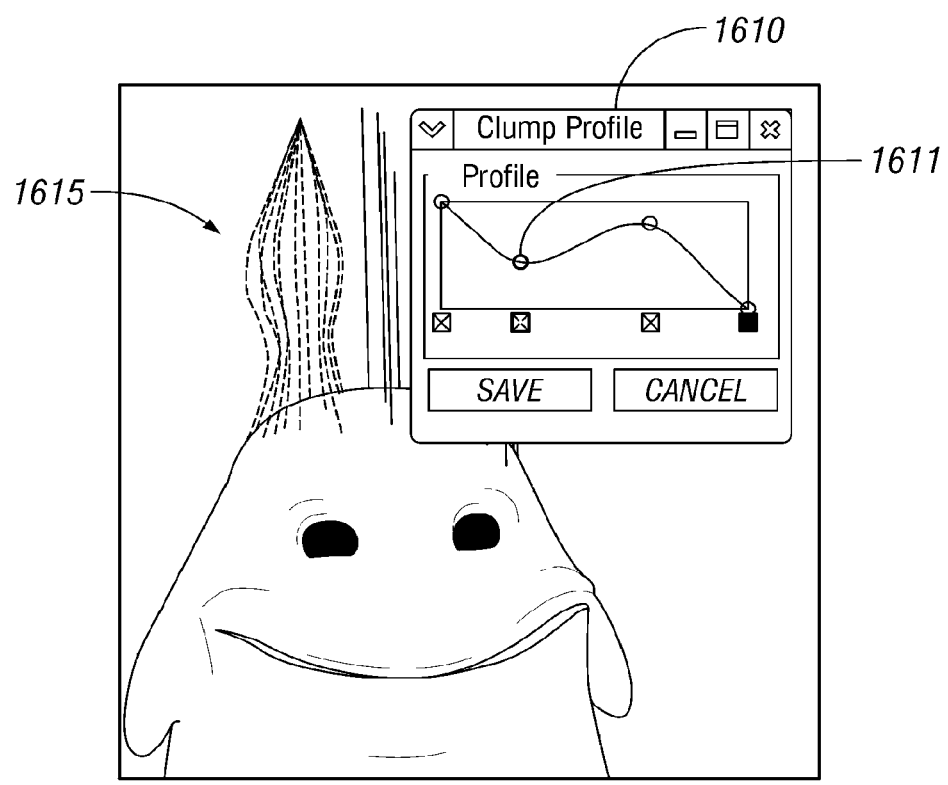

With reference to FIGS. 16*a* and 16*b*, FIGS. 16*a* and 16*b* are diagrams that illustrate the clumping of control hairs with possible variations along the control hairs. As shown in FIG. 16*a*, a first set of control hairs 1602 and a second set of control hairs 1604 are illustrated as extending normally from the head of a creature 1606. A clump profile window 1610 includes a user-definable clump profile curve 1611 implemented with control hair adjustment module 1555 of hair/fur pipeline 1500 that may be applied to the first set of control hairs 1602 so that the control hairs are deformed in such a fashion, as shown by the deformed control hairs 1615, such that they approximate user-definable clump profile 1611 as can be seen in FIG. 16*b*.

Fill-Volume Techniques

In one embodiment, surface definition module 1550 of the hair/fur pipeline 1500 may be used to generate a shape defining a surface and an associated volume. Control hair module 1555 may be used to fill the volume with control hairs and interpolation module 1560 may be used to interpolate final hair strands from the control hairs. These techniques will be described in more detail below.

In particular, a fill-volume tool may be used to quickly fill an enclosed surface with randomly placed control hairs. This may be useful in generating hair to fill "hair volumes" such as volumes defining a ponytail often provided by modelers to describe the rough hair look of a character.

Turning to FIG. 17, FIG. 17 is a flow diagram illustrating a process 1700 to implement a fill-volume function. As shown in FIG. 17, at block 1710, a shape is generated that defines a surface and an associated volume. For example, this may be accomplished utilizing surface definition module 1550 of hair/fur pipeline 1500. Next, the volume is filled with randomly placed control hairs (block 1720). For example, this may be accomplished utilizing control hair adjustment module 1555 of hair/fur pipeline 1500. Lastly, final hair strands are interpolated from the control hair strands (block 1730).

For example, this may be accomplished utilizing interpolation module 1560 of hair/fur pipeline 1500.

Further, an example of this may be seen in FIGS. 18a-c, where braids are simply represented as surfaces by a modeler, and then filled with hair. In particular, FIG. 18a-c show the generation of braid shapes defining surfaces and associated volumes (FIG. 18a), the filling of these volumes with randomly placed control hairs (FIG. 18b), and the interpolation of final hair strands from the control hairs (FIG. 18c).

As shown in FIG. 18a, at first, three braided cylinders 1802, 1804, and 1806 are generated each of which defines a shape and an associated volume. Next, as shown in FIG. 18b, the fill-volume function is utilized to generate control hairs 1810, 1812, and 1816, respectively. Lastly, as can be seen in FIG. 18c, the final braids of hair 1820, 1822, and 1826 are interpolated from the control hairs and are rendered.

Additional control hairs may be automatically interpolated from existing ones and final hair strands may also be automatically interpolated from existing ones utilizing interpolation algorithms similar to those described below. Additionally, the shape of newly inserted control hairs may be blended between selected existing control hairs.

In one embodiment, the hair/fur pipeline 1500 may utilize different algorithms to interpolate final hair strands from control hairs as well as other control hairs from existing control hairs (e.g. utilizing interpolation module 1560) based on different coordinate schemes.

Figure 19A:
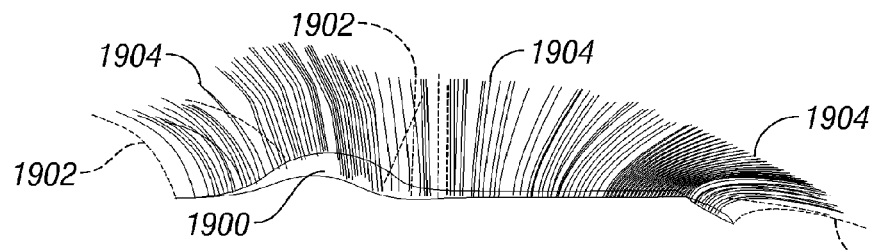
FIGS. 19a-c are diagrams showing side views of a deformed surface with identical control hairs that illustrate different types of interpolation techniques, respectively.
Figure 19B:
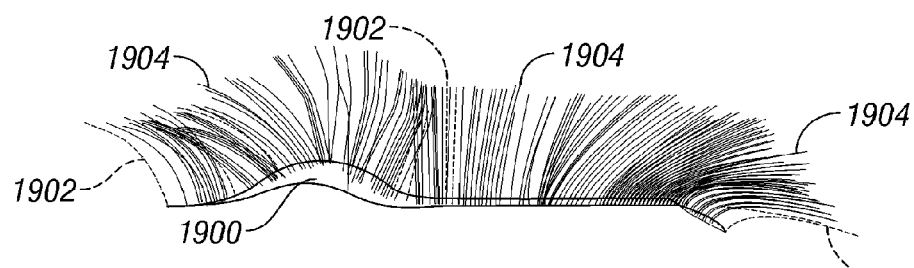
Figure 19C:
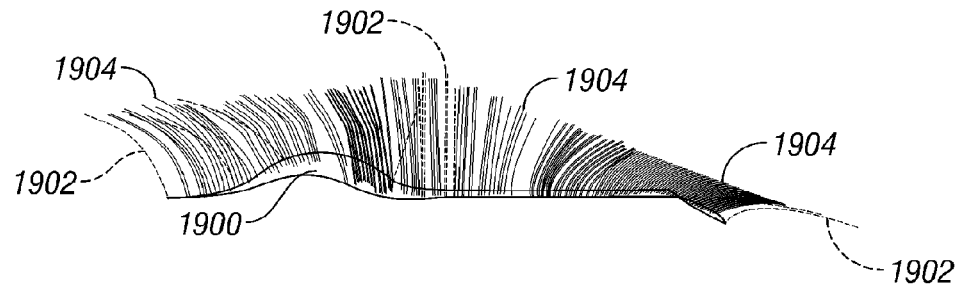

An example of this interpolation methodology may be seen with reference to FIGS. 19a-c. As can be seen in FIGS. 19a-c, side views of a deformed surface 1900 are shown with identical control hairs 1902. By utilizing this interpolation methodology, the number of control hairs may be kept small across different applications.

For example, FIG. 19a shows a first interpolation method for the interpolation of final hair strands 1904 from control hairs 1902 in a "world space" coordinate frame, in which the final hair strands 1904 do not automatically follow surface deformations. This is useful for plants or long hairstyles that should not follow surface (skin) deformations.

FIG. 19b shows a second interpolation method for the interpolation of final hair strands 1904 from control hairs 1902 in a "local space" coordinate frame. In the "local space" scheme, the final hair strands 1904 follow surface deformations automatically. This is more natural for shorter hair or fur.

Lastly, FIG. 19c shows a third interpolation method for the interpolation of final hair strands 1904 from control hairs 1902 in which the final hair strands 1904 remain within the convex hull of influencing control hairs 1902. This scheme may be useful, for instance, for long, un-clumped human hair dropping from the top and sides of the curved scalp. It should be noted that in the local and world space modes, interpolated final hair strands 1904 may appear longer than control hairs 1902 whereas in the convex hull mode they do not.

Further, hierarchical clumping capabilities of final hair strands may be implemented utilizing the hair/fur pipeline 1500 (e.g. utilizing effects module 1565). Final hairs may belong to manual clumps directly placed by a user or to procedurally generated auto and minor clumps. Auto-clump hairs may occur either inside or outside of manual clumps whereas minor clump hairs may only reside in manual or auto clumps. These techniques may be applied for wet hair looks and for customizing the look of tufts of dry hair.

A further characteristic of the hair/fur pipeline 1500 is that a multitude of parameters or effects such as wave, weave, (rotations around the root of the hair), shorten-tip and wind may be implemented, for example, by effects module 1565 of hair/fur pipeline 1500. These effects may be applied directly to final hairs after the interpolation between control hairs.

Figure 20A:
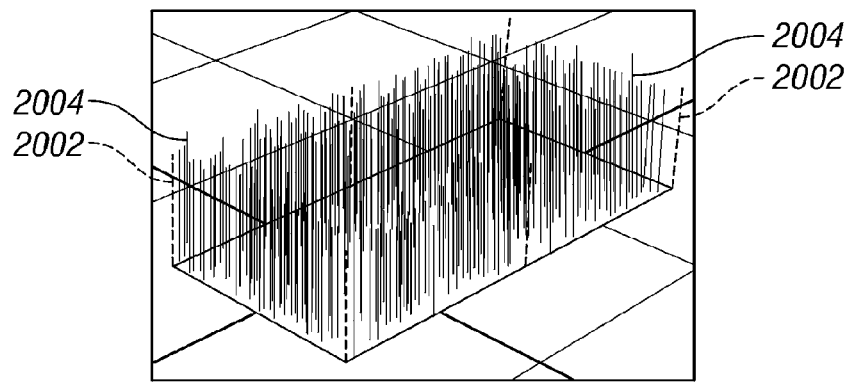
FIGS. 20a-20c are diagrams illustrating wave, weave, and wind effects.
Figure 20B:
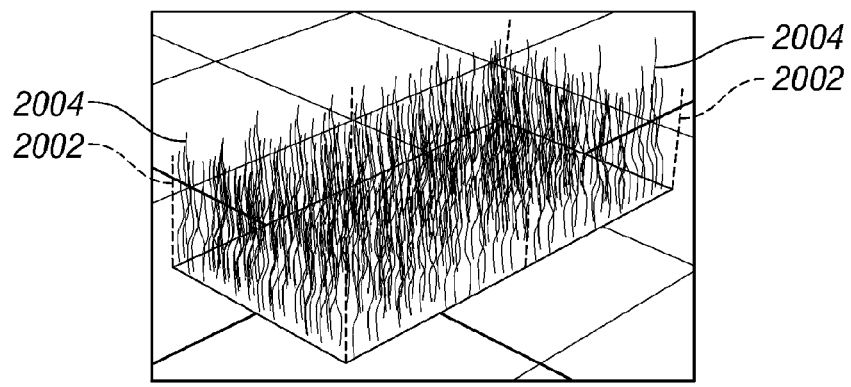
Figure 20C:
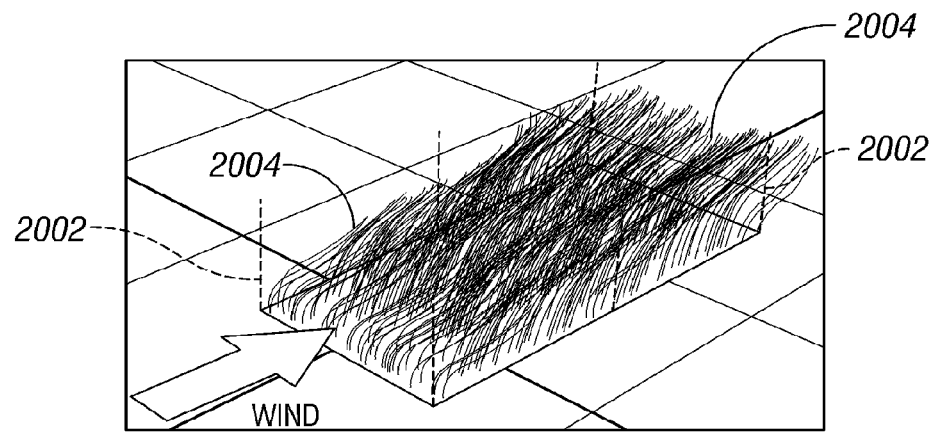

Examples of these wave, weave, and wind effects are shown in FIGS. 20a-c. In each of the cases of FIGS. 20a-c, control hairs 2002 are shown as pointing straight up. For example, FIG. 20a illustrates no effect on the final hairs 2004. FIG. 20b indicates some wave and weave effect being applied to the final hairs 2004. Lastly, FIG. 20c illustrates a wind effect being applied to the final hairs 2004.

Also, effects may be applied selectively to different hair "types" such as manual clump member hairs or un-clumped hairs, before or after clumping. In addition, independent hair parameters or effects can be used in combination with multiple final hair layers with possibly different sets of control hairs. For animal fur, undercoats and overcoats may be generated this way and complex human hair may be broken up into several distinct layers such as base, stray, and fuzz.

Geometric Instancing

Another embodiment of the invention relates to arbitrary geometry instancing. Arbitrary geometry instancing provides a feature that leverages off the hair/fur pipeline's 1500 ability to instantiate, animate, and control the style or look of final rendered hair primitive, as previously described. In this regard, a general application program interface (API) may be provided in conjunction with the hair rendering functions such that an application developer can obtain per hair follicle information from the hair system, and replace the rendering of hair with other operations.

For example, in one embodiment, hair pipeline 1500 may be used to generate a user-selected geometry based upon a hair location for at least one hair with respect to a surface. Surface definition module 1550 may be used to define the surface. Display module 1575 may be used to: process a user-selected geometry and render the user-selected geometry at the hair location on the surface in place of the at least one hair.

In particular, instead of outputting hair follicles of the final rendered primitive, a hook into the hair/fur pipeline 1500, e.g., at display and rendering module 1575, is provided to allow the user to override the rendered geometry and instead of rendering a hair, rendering another geometric shape. Thus, instead of populating, for example, a human head with hair, a human head with thorns may be generated. Or, instead of a field full of hairs, a field full of flowers, grass, or trees may be populated.

Further, it should be noted that instantiating the exact same object (e.g., flowers or trees) does not work well when attempting to design a specific landscape because all the flowers or trees would be identical. Therefore, different kinds of primitives may be modeled and instantiated at render time to replace each final hair.

Instead of completely discarding the final shape of the hair, the hair follicle can be used to represent the axis of deformation around which the instanced geometry may be deformed according to the shape of the hair. This way, all of the advantages of all the various effects (e.g., clumping, breaking, wave, weave, wind, etc.) previously described as to rendering hair may be utilized on rendering the other selected geometry (e.g., flowers, trees, etc.).

Figure 21:
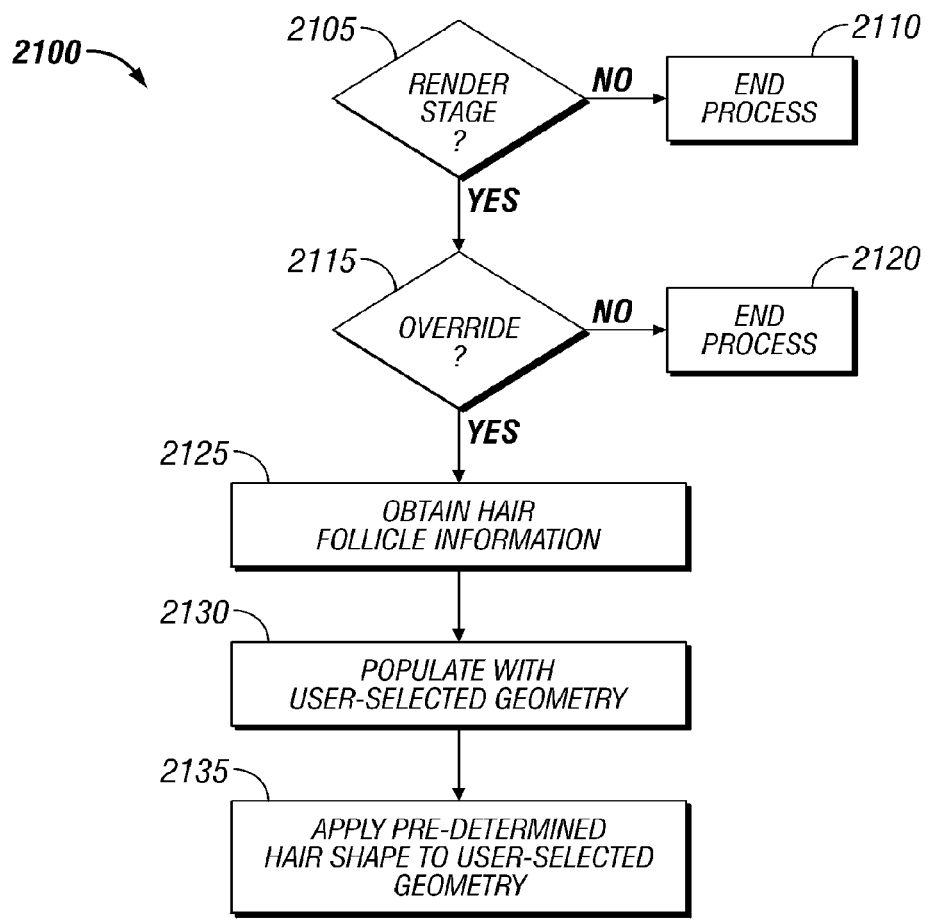
FIG. 21 is a flow diagram illustrating a process to implement geometric instancing, according to one embodiment of the invention.

Turning now to FIG. 21, FIG. 21 is a flow diagram illustrating a process 2100 to implement geometric instancing, according to one embodiment of the invention. At block 2105 it is determined whether or not the hair/fur pipeline 1500 has entered a render stage. If not, the process is ended (block 2110). However, if the render stage has been entered, at block 2115, it is determined whether or not a user has decided to override the hair rendering operation to instead utilize the geometric instancing function. If not, the process is ended at block 2120.

On the other hand, if the user has decided to override the hair rendering process and to utilize the geometric instancing function instead, then at block 2125 the hair follicle information in obtained. Next, at block 2130, based upon the user selected geometry, the hair follicles upon the surface are instead populated with the user-selected geometry 2130 (i.e., instead of hair/fur). Then, at block 2135, the hair shape previously determined for the hairs are applied to deform the user-selected geometry.

Figure 22A:
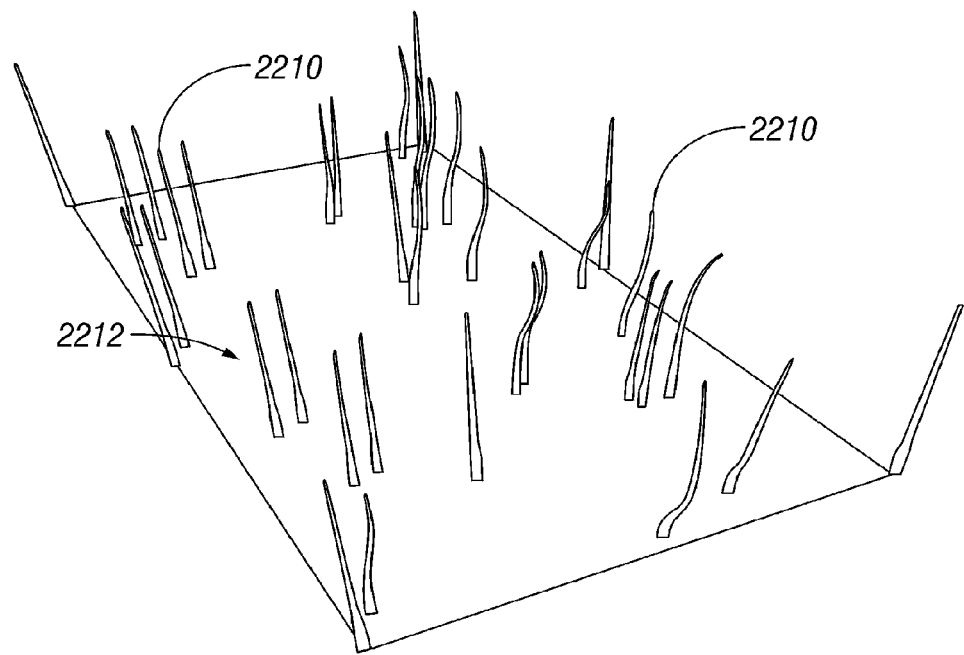
FIGS. 22a and 22b are diagrams illustrating an example of geometric instancing.
Figure 22B:
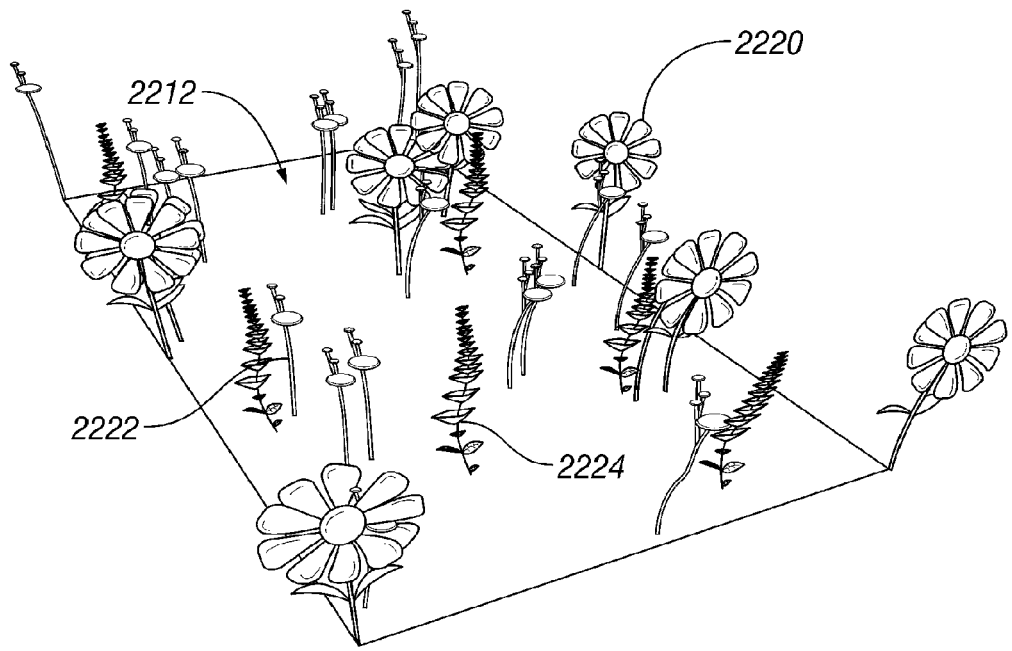

An example of this can be seen in FIGS. 22*a* and 22*b*. As shown in FIG. 22*a*, a plurality of hairs 2210 are shown as being rendered on a surface 2212. Each of the hairs 2210 has hair follicle information (e.g., its relative position on the surface 2212) and associated therewith an axial deformation framework (e.g., defining the shape of the hair) and related control information as to shape features such as curve, bend, rotation, twisting, etc. (as previously-described).

However, with embodiments of the invention, as shown in FIG. 22*b*, a user may decide to render another geometric object (e.g., a flower) instead of a hair. For example, a flower may be randomly selected from a set of three modeled flowers and may be deformed by the shape of the corresponding final hair.

As shown in FIG. 22*b*, a plurality of flowers 2220, 2222, and 2224, are shown as replacing the hairs utilizing the same hair follicle information and the same shape information. It should be appreciated that flowers are only given as an example and that virtually any geometric shape may be used in lieu of a hair shape. Thus, new geometries may be instanced and deformed utilizing the hair/fur pipeline 1500 thereby providing a powerful and a unique way of rendering any type of geometric shape.

Hair Motion Compositor System

When dealing with hair animations and dynamic simulations in a production context, the need to combine different motion results arises quite often. If part of the hair is perfect in one simulation, but the rest of the hair looks better in another, it is easier to pick and choose which parts of each simulation are desirable to be kept than it is to figure out the right settings to get all the hair to move in a desired fashion.

As will be described hereinafter, in one embodiment, a hair motion compositor provides a system and method that allows a user to combine and modify various control hair animations by building a network of nodes and operations. For example, in one embodiment, hair motion compositor module 1557 of hair/fur pipeline 1500 may be utilized to implement the hair motion compositor.

For example, in one embodiment, hair pipeline 1500 utilizes surface definition module 1550 to define a surface and a control hair and hair motion compositor module 1557 combines different control hair curve shapes associated with the control hair and the surface. In particular, the hair motion compositor module 1557 generates a static node defining a static control hair curve shape; generates an animation node defining an animation control hair curve shape; and combines the static control hair curve shape of the static node with the animation control hair curve hair shape of the animation node to produce a resultant control hair curve shape for the control hair.

Nodegraph Basics

In one embodiment, the hair motion compositor (HMC) is a directed acyclic graph of nodes, wherein nodes can represent either animations or operations applied to animation. The connection between the nodes represents the data flow of animated control hair curve shapes.

Simple Nodes

Creating an HMC setup for a character or object typically assumes that there is an existing static comb of control hairs that is used as a basis. A HMC setup typically requires two nodes: a static node (containing the initial, non-animated shape of the control hair curves) and a control node (representing the final result—which is the output of the node graph). Additional nodes representing control hair curve shapes may be inserted into the graph. These additional nodes may be termed animation nodes.

Figure 23:
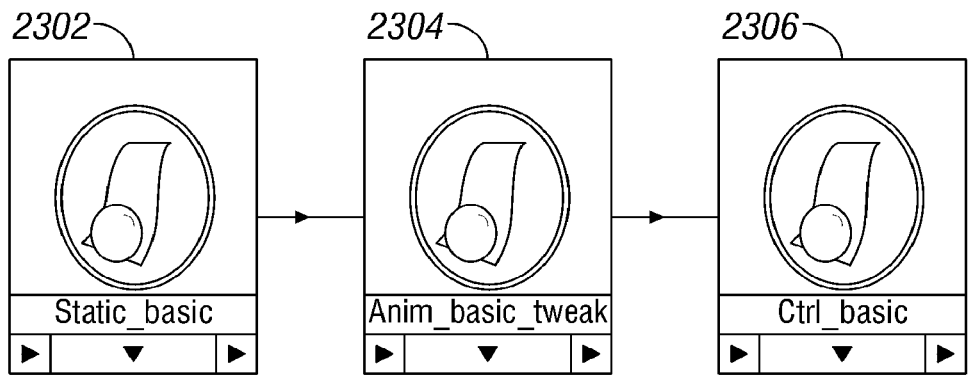
FIG. 23 is a diagram illustrating a simple graph of a static node connected to an animation node and a finished control node to provide a hair motion composting system, according to one embodiment of the invention.

Turning to FIG. 23, FIG. 23 is a diagram illustrating a simple graph of a static node 2302 connected to an animation node 2304 and a finished control node 2306. As can be seen in FIG. 23, the input to the animation node 2304 is the static combed shape from static node 2302. The user can apply tweaks and key frames through an animation set of control hair curves provided by animation control node 2304 to offset the static shape to produce the final combed hair result of control node 2306.

Blend Nodes

Blend nodes may be utilized for composting features. A blend node may be defined as an operation node that takes two inputs and combines them together to form a single output. For example, control hair curves from each input may be blended together rotationally (to maintain curve length) or positionally (for linear blending).

Additionally, a blend factor parameter for the blend node may be used to control how much each of the inputs should be used. For example, a value of 0 designates the total use of input node A and a value of 1 designates the total use of input node B; wherein the blend node provides smooth interpolation of the control hair curve shapes of input nodes A and B for all of the values in between.

Figure 24:
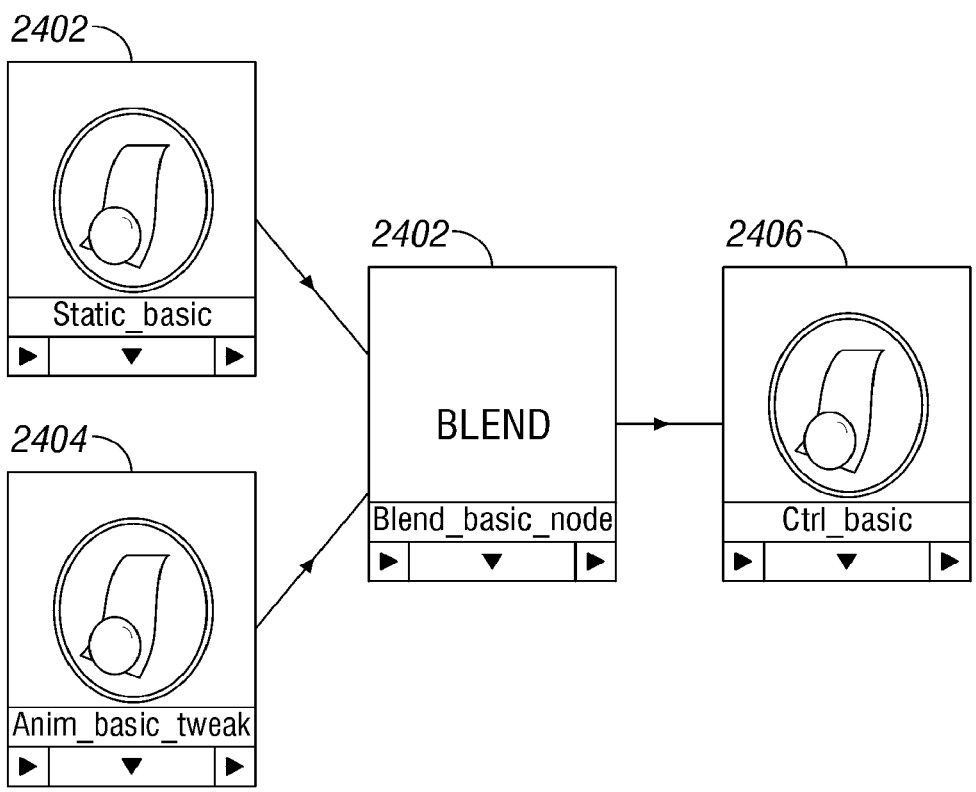
FIG. 24 is a diagram illustrating a process of utilizing a blend node.

Turning now to FIG. 24, FIG. 24 is a diagram illustrating a process of utilizing a blend node 2403. Concurrent reference may also be made FIGS. 25*a* and 25*b*, which illustrate the difference between rotational and positional blending, respectively. In particular, FIG. 24 shows a blend node 2403 blending inputs from static node 2402 and animation node 2404 to obtain a resultant output shape of control node 2406. In this example, blend node has a blend factor of 0.5.

Figure 25A:
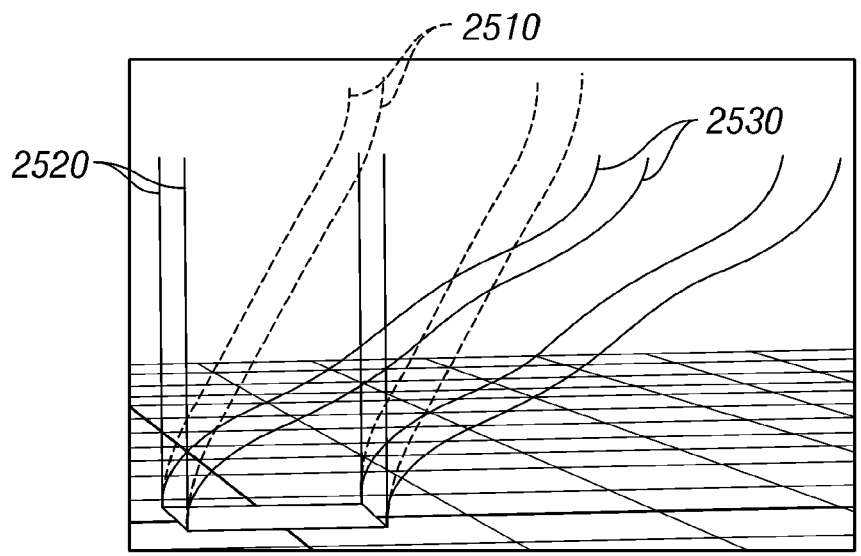
FIGS. 25a and 25b are diagrams illustrating rotational blending and positional blending, respectively.

More particularly, as can be seen in FIG. 25*a*, when rotational blending is selected by blend node 2403 with a blend factor of 0.5, resultant control hairs 2510 are obtained based upon input static control hairs 2520 and animation control hairs 2530. The advantage of rotational blending is that it preserves the lengths of the resulting control hairs.

Figure 25B:
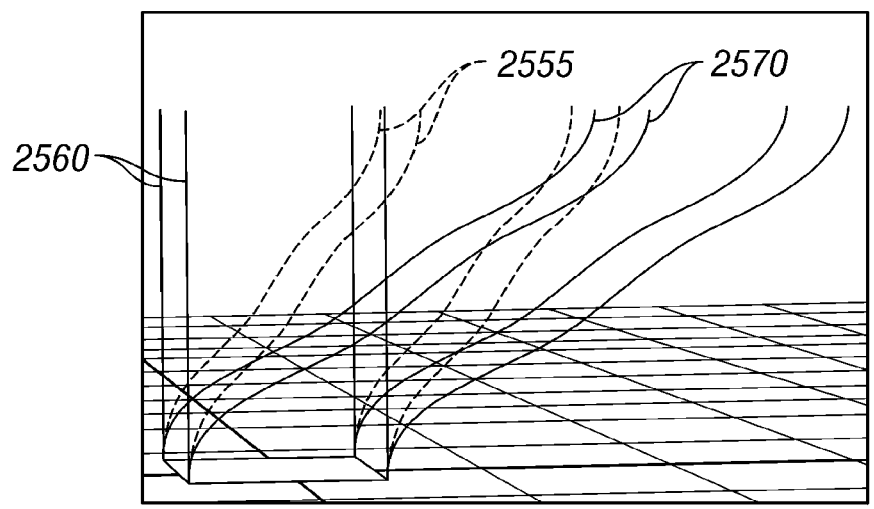

As can be seen in FIG. 25*b*, when positional blending is selected by blend node 2403 with a blend factor of 0.5, resultant control hairs 2555 are obtained based upon input static control hairs 2560 and animation control hairs 2570. The advantage of positional blending is that the resulting control hair shapes are more predictable than with rotational blending.

By default, blend node 2403 may apply the same blend value to all control vertices (CVs) of every input control hair curve. For per-CV control, a user may build a function curve specifying what blend factor value to use at every CV. For example, this may be used to cause the base CV motion to come from a first input, and the tip CV motion to come from a second input. Typically the same blend factor is applied to every control hair curve of the inputs, even when using per-CV function curve.

To specify per-hair blend values, a user may utilize a blend ball that identifies regions in three-dimensional space. A blend ball may be made of two concentric spheres with an inner and outer blend factor value, respectively. If the inner value is 0 and the outer value is 1, all control hair curves within the inner sphere will get their animation from the first input, and all control hair curve outside the outer sphere will get their values from the second input, with a smooth interpolation in between.

Figure 26:
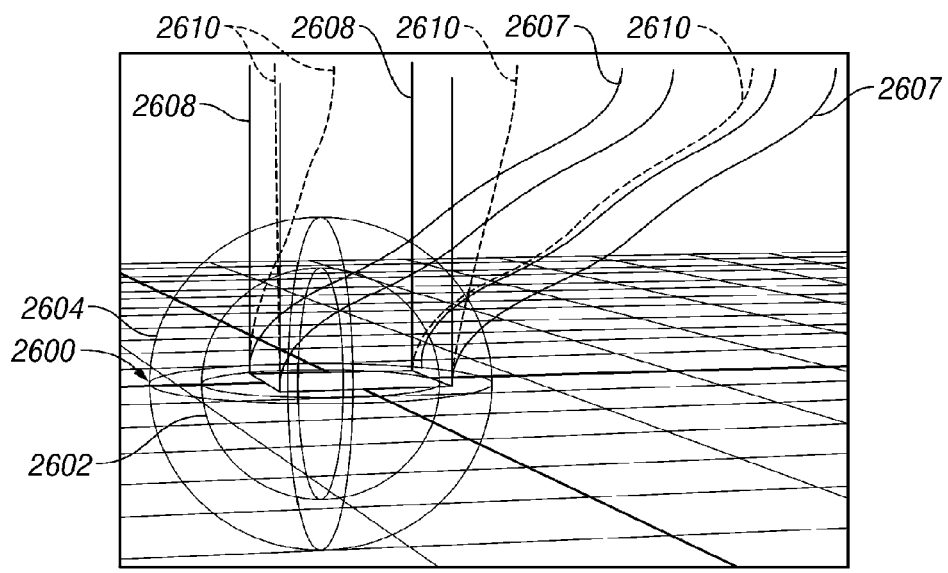
FIG. 26 is a diagram illustrating a blend ball.

An example of this type of blend ball 2600 is illustrated in FIG. 26. In essence, blend ball 2600 is utilized to localize the effect of the blend node. As can be seen in FIG. 26, blend ball 2600 includes an inner sphere 2602 and an outer sphere 2604. Further, FIG. 26 shows the effect of blend ball 2600, via inner sphere 2602 and outer sphere 2606, upon blending animation control hairs 2607 with input static control hairs 2608, and further shows the resultant output control hairs 2610.

Dynamic Solver

It should be appreciated that other than specifying typical simulation settings (stiffness, damping, etc.), that a lot of initial effort goes into specifying a good goal shape that is to be fed as an input to a solver (such as key poses the user may want the control hair curves to "hit"). However, eventually most of the time is spent dealing with the results of one or more simulations.

Since the dynamic solving process itself is often time consuming and outside of direct user control, it is important to minimize the number of simulations that need to be run to achieve the desired result.

For example, in one embodiment, the MAYA hair dynamic solver may be used for hair simulations. However, it should be appreciated that the HMC system previously described is dynamic solver-agnostic. In essence, the solver appears as a single node in the node graph.

Figure 27:
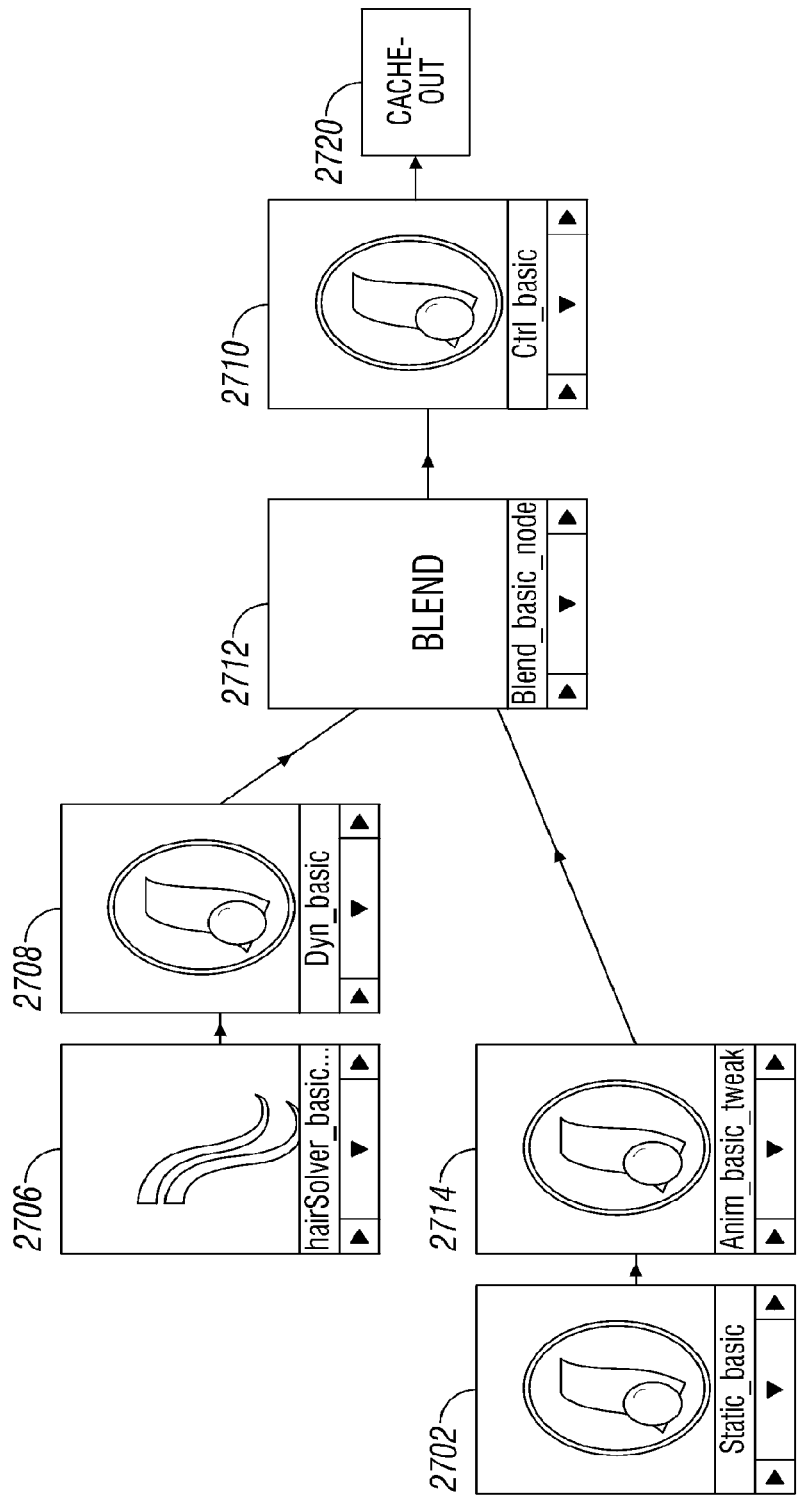
FIG. 27 illustrates a dynamic node graph including a dynamic solver node.

With reference to FIG. 27, FIG. 27 illustrates a dynamic setup including a dynamic solver node (represented by solver node 2706 and dynamic node 2708). The initial static comb node 2702 is connected to the solver 2706 through animation node 2704 to be used as a goal, but the final result is blended (by blend node 2712) between the output of the dynamic simulation node 2708 and the goal. Control node 2710 is the resultant output.

By default, the blend is set to 0 to be 100% dynamic. However, to quickly make the hair stiffer (a common artistic request), the blend can be gradually increased to blend back to the static goal without running new simulations.

Depending on the settings used and the complexity of the scene, dynamic simulations can take a long time, so that they often may be run on a RENDERFARM in order to free up a user's computer for other work. In order to accommodate this, a cache-out node 2720 connected to control node 2710 may be utilized to write to a storage device whenever a node is connected to it. The cache-out file can then subsequently be read back in with a cache-in node, as will be described. It should be appreciated that a cache-out node may be applied to any node of the system. Further, it should be appreciated that the storage device may be a hard disk drive or any other sort of storage device.

Volume Nodes

Very often, especially for computer graphic feature productions, proxy surfaces representing hair are modeled and key framed at certain key-poses by the animation department in order to represent how the hair should move in a given shot.

For example, a ponytail of a character may be approximated by a bulged-out tube volume. In order to accommodate this functionality, a volume node may be utilized that in effect binds control hair curves so that they follow the animation of one or more volumes. Another use of volume nodes may be to offset the result of a dynamic simulation to produce a desired result. In this case, it may be impractical to use a hand-animated volume since it does not automatically follow the dynamic control hairs. Instead, a volume node may be used that provides its own volume which may be built-in on-the-fly as the convex hull of the control hair curves to be deformed. A user may then modify the volume to offset the animation. This is much easier than modifying the control vertices of individual hairs.

Figure 28A:
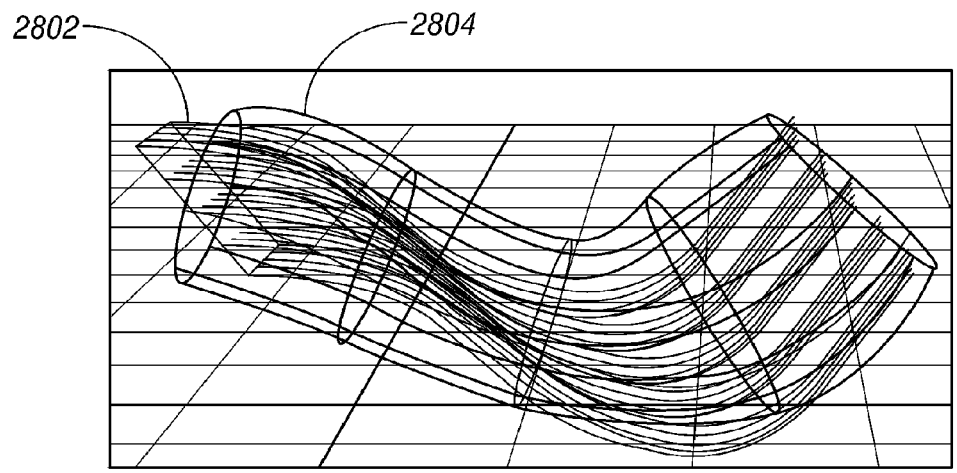
FIGS. 28a and 28b are diagrams illustrating the use of volume node.
Figure 28B:
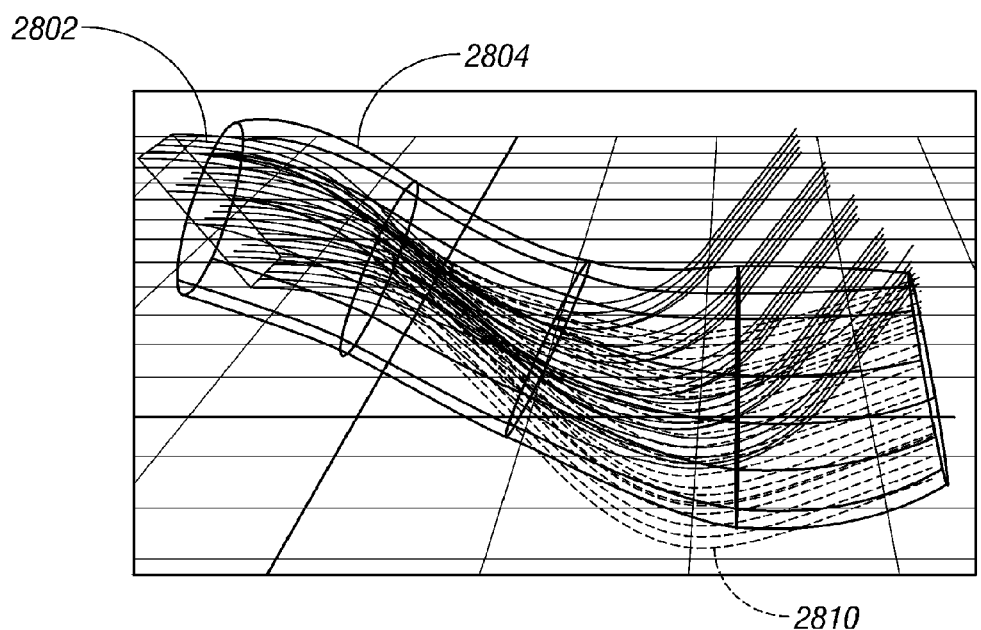

FIG. 28*a* is a diagram that demonstrates an automatically-generated cylindrical volume node 2804 that surrounds control hair curves 2802. FIG. 28*b* is a diagram showing control hair curves 2810 that have been offset after the user has edited the control hair curves with the volume node 2804. As can be seen in FIGS. 28*a* and 28*b*, the control hairs 2802 may be easily modified by the volume node 2804 as shown by modified control hair curves 2810.

Super Hair Nodes

Super hair nodes provide a mechanism similar to the volume nodes by shaping or offsetting hair animation through a simplified proxy geometry. However, the proxy geometry in this case is a curve attached to the surface like all of the other hairs. A super hair node may be utilized to control a plurality of control hairs both at the combing stage to shape static hairs and in a shot to alter animated hairs.

In one embodiment, a super hair node may have two modes of operation: absolute and relative. In absolute mode, a single controller curve is used by the super hair node to dictate the exact shape and animation of the control hairs. A user may choose to only partially apply the effect with a weight parameter whose value varies between 0 and 1. The super hair node also has the option to match the shape of the controller curve in world-space or to have the deformations applied in the local space of each control hair curve.

Figure 29:
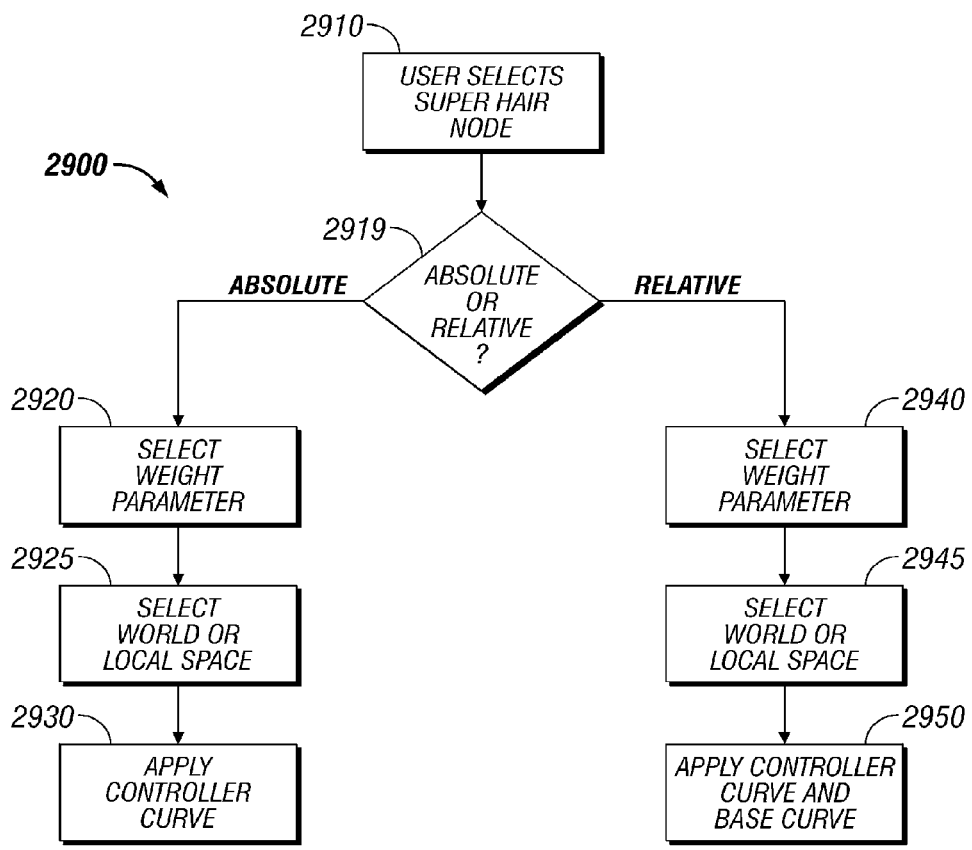
FIG. 29 is a flow diagram illustrating a process super hair node processing is illustrated.

Turning to FIG. 29, FIG. 29 is a flow diagram illustrating a process 2900 of super hair node processing. At block 2910 a user selects a super hair node. At block 2915, a user selects whether or not to utilize either an absolute or a relative mode. If absolute mode is selected, at block 2920, a weight parameter may be selected and at block 2925 world or local space may be selected. At block 2930 the controller curve is applied to the control hairs.

On the other hand, if during process 2900, relative mode is selected, a user likewise selects a weight parameter (block 2940) and selects world or local space (blocks 2945). In the relative mode, however, both the controller curve and the base curve are applied (block 2950) to the control hairs.

In the relative mode, both a controller curve and a base curve are used, and only the difference between the two is applied to the control hair curves. This method is typically used when modifying control hairs that already have some incoming animation. It should be noted that the super hair node has no effect if the controller and base curve match exactly. When creating a super hair node, the controller and base curves are created straight up by default. For offsetting animated hairs, both curves can optionally take on the average shape of the control hairs. Tweaking the controller curve from there is then much more intuitive.

Figure 30A:
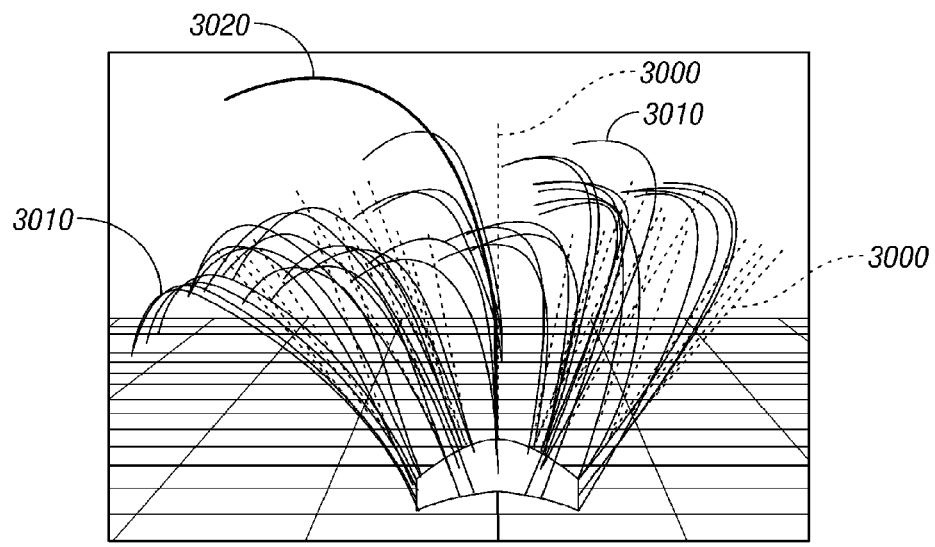
FIGS. 30a and 30b are diagrams illustrating super hair operations in local-space and world space, respectively.
Figure 30B:
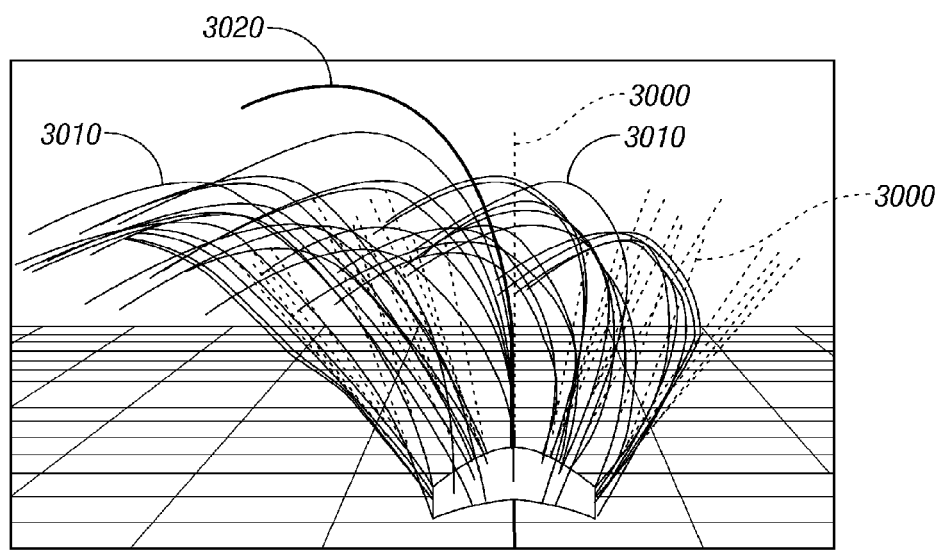

Turning briefly to FIGS. 30*a* and 30*b*, super hair operations in local-space and world space, respectively, are illustrated. As can be seen in FIGS. 30*a* and 30*b*, the initial control curve shapes 3000 extend straight along the normal from the surface, and the resulting control hairs 3010 are shaped in order to match the controller curve 3020.

In both modes, absolute and relative, the effect of the super hair is applied uniformly to all the driven hairs. For localized control, a region of influence can be defined around the controller curve.

Figure 31:
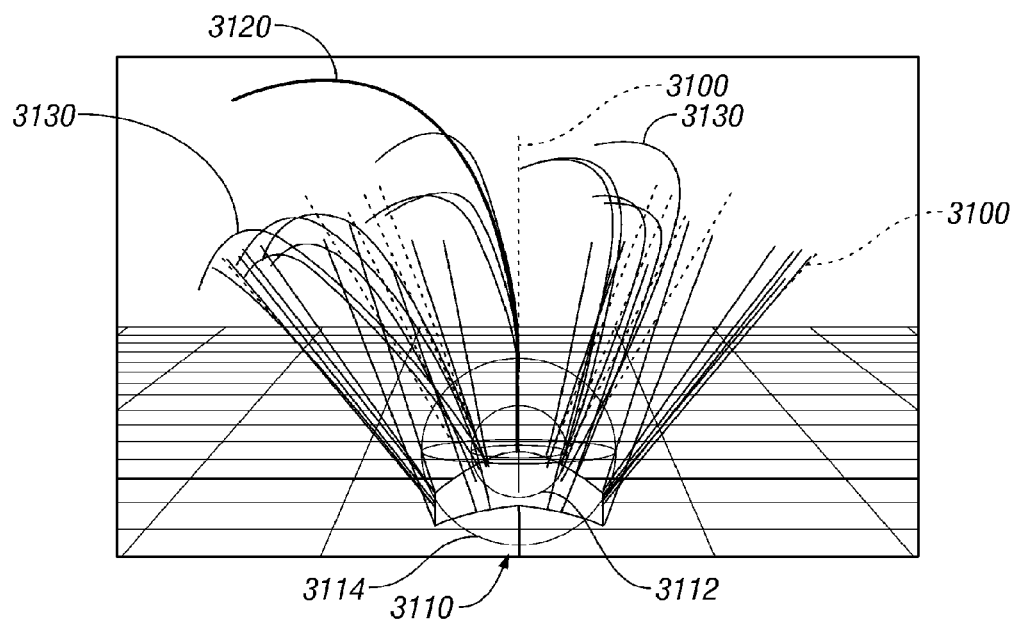
FIG. 31 is a diagram illustrating a blend ball having both an inner sphere and an outer sphere.

Blend balls including inner and outer spheres (as previously-described) may be used to define where and by how much a super hair has an effect, as shown in FIG. 31. In particular, FIG. 31 is a diagram illustrating a blend ball 3110 having both an inner sphere 3112, and an outer sphere 3114 and the blend balls 3110 effect upon the controller curve 3120 and control hairs 3130.

Both an inner and outer weight are associated with each corresponding sphere 3112 and 3114 and the effect of the super hair 3120 and control hairs 3130 is interpolated in-between. As a practical application of the region of influence, the super hair 3120 can be used to fake collision such as a hand rubbing over a part of fur by having the controller curve slide on the surface to follow the hand motion and squash the hairs down as it moves.

Exemplary Uses of Hair Motion Composting

Discussed below are some examples of the power and versatility of the hair motion compositor (HMC).

Improving a Single Simulation Result

Visual effects productions tend to be heavily art-directed for both live action and computer graphic features. One of the most frequent components from an initial hair shot review is to make a dynamic simulation match the artistically approved look more closely. This may entail either making the simulation stiffer, to remove extra or erratic motion, or making it match the key framed goal animation in a better fashion.

Oftentimes, the simulation may produce physically-realistic results, but not necessarily the desired look. Rather than relying on a physically accurate solver by trying to fine-tune dynamic parameters and launching new simulations over and over again, it is often easier to "composite-in" some of the static or goal animation using the blend node functionality previously described with reference to FIGS. 24, 25, 26, 27, and 31. As has been discussed, the blend factor can be set or animated to preserve as much of the dynamic simulation that is found to be visually pleasing.

Blending Between Multiple Simulation Results

As previously described, simulation results rarely provide the perfect desired look "out of the box". With varying sets of input parameters, one simulation might give a good starting motion, but another might provide a nicer end look, and a third might be more expressive at certain key moments. Finding a unified set of parameters that would provide a combination of all three is often impossible.

Figure 32:
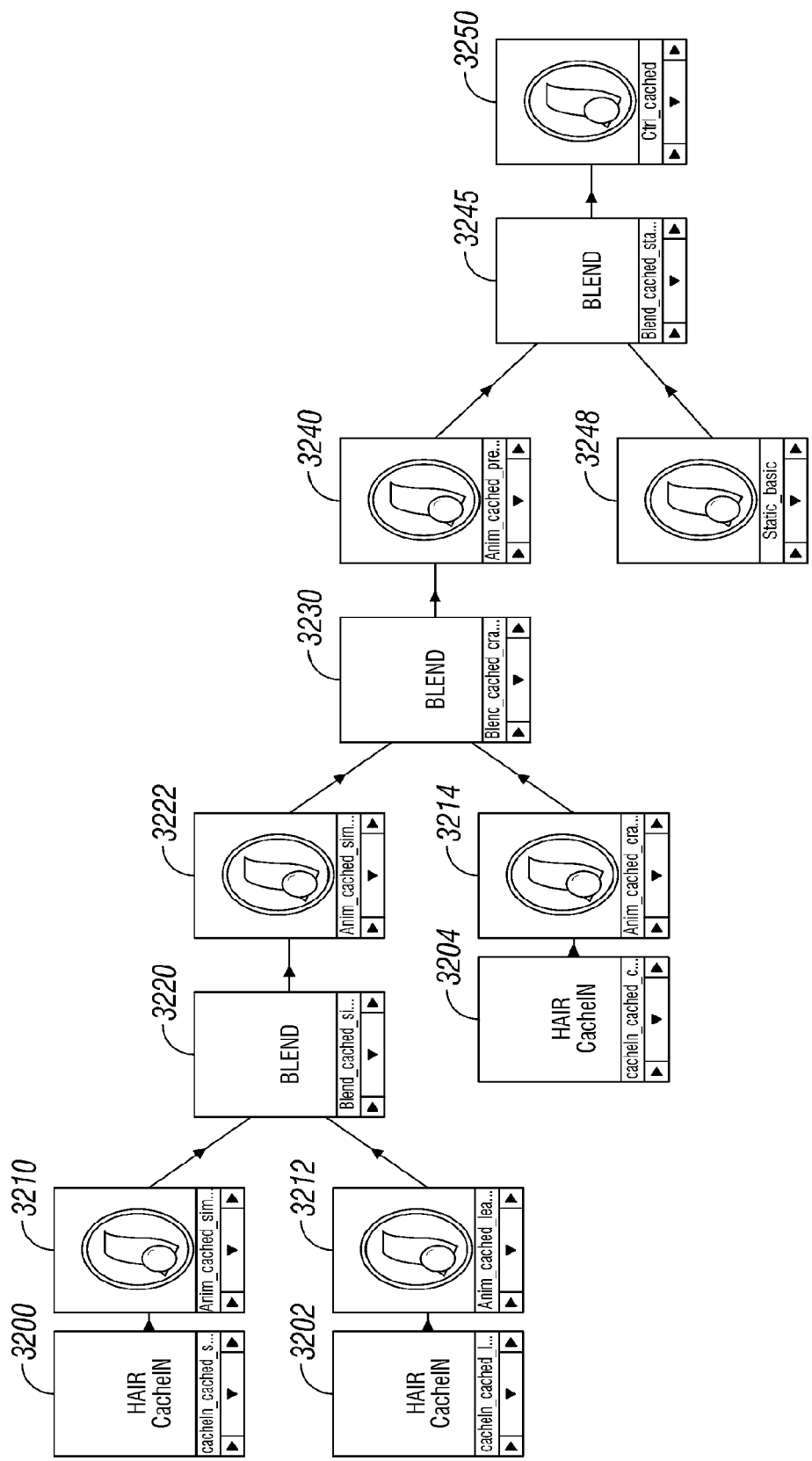
FIG. 32 is a diagram illustrating a cascading node graph to blend between various simulation caches.

However, with the features of the hair motion compositor (HMC), as previously described, a cascading graph may be easily set up to blend between various simulation caches as illustrated in FIG. 32.

As can be seen in FIG. 32, three hair caches 3200, 3202, and 3204, are each respectively processed through animation nodes 3210, 3212, and 3214. Hair caches 3200 and 3202 are further combined through blend node 3220 and further through animation node 3222 and further blended with hair cache 3204 at blend node 3230.

This blended output is then processed though animation node 3240 and blended at blend node 3245 with a static node 3248 and a final process output is rendered at control node 3250. It should be appreciated that the blend values can be key-framed to pick up various parts of each cache that are most pleasing.

Blending can also be used for non-dynamic cache files. For characters with short fur, it may be practical to have two static combs: one "normal" and one "collided" with the hairs closely pushed down towards the surface. Then, instead of simulating all the interactions with the fur in a shot such as hands or props rubbing against it, the hair can simply be blended to the pre-collided comb in those areas, using blend balls that follow the collision objects.

In addition to its blending power, the hair motion compositor (HMC) system may be utilized to correct problems in particular shots. For example, this often occurs in one of two situations that often cause bad results: animation issues which make static combed goal hairs penetrate the characters skin, and minor simulation errors such as missed collisions. In these cases, the general motion of the hair is perfectly acceptable, and all that is required to correct the problems may be accomplished by the use of volume offset nodes or super hair nodes, previously discussed. This is much faster than re-running a simulation until it is satisfactory.

Optimization Techniques

As previously discussed with reference to FIG. 15, embodiments of the invention further relate to optimization techniques that may be implemented by optimization module 1567 of hair/fur pipeline 1500. In particular, three particular optimization techniques that improve the usability and rendering speed of hair/fur pipeline 1500 are disclosed herein.

The first optimization technique relates to fine-grain control over the culling of final hair follicles dependent upon screen-space metrics. Referred to herein as view-dependent screen-space optimization techniques. A second optimization technique disclosed herein relates to the hair/fur pipeline's 1500 ability to selectively generate and render visible hair follicles based upon hair sub-patches. Referred to herein as hair sub-patch optimization techniques. Further, a third optimization technique implemented by the hair/fur pipeline 1500 relates to hair caching in order to decrease render times and improve turnaround time for lighting work. Referred to herein as hair caching techniques.

View-Dependent Screen-Space Optimization

As is well known, rendering a fully-furred creature at maximum hair density often takes a long time, utilizes a great deal of computing power, and utilizes a significant amount of memory. Although it is possible to manually adjust hair density in order to optimize hair density on a per-shot basis, this is a tedious and error-prone process.

According to one embodiment of the invention, view-dependent screen-space optimization techniques implemented by the optimization module 1567 of the hair/fur pipeline 1500 may be implemented by utilizing continuous metrics measured in screen-space that give both fine-grain control over the setting of hair parameters—such as hair density and hair width parameters at render time. Further, the behavior of optimization parameters may be customized by user-defined function curves.

In one embodiment, surface definition module 1550 may be used to define a surface and optimization module 1567 may be used to determine whether a hair is to be rendered upon the surface. In particular optimization module 1567 may be used to: determine a size metric for the hair; apply a first density curve to the size metric determined for the hair to generate a density multiplier value; and based upon the density multiplier value, determine whether the hair should be rendered.

The continuous metrics and customizability of optimization parameters enables a great deal of flexibility in this method and does not suffer from constraints associated with discrete selection of pre-determined values. In one embodiment of the present invention, the optimization parameters, as will be discussed hereinafter, relate to hair density and hair width parameters. However, it should be appreciated that other types of hair-related parameters may also be optimized.

In this embodiment, hair screen-space optimization deals with determining the amount to reduce the number of rendered hairs based upon the size of each individual hair on the screen (screen-space size metric) and on the speed at which the hair travels onscreen (screen-space speed metric).

Both metrics are calculated per hair and are then passed back to a user specified function curve that specifies whether or not a hair should be rendered. By using a custom function curve, a character's hair can be customized on a per shot basis and thus a great deal of flexibility is given to the artist to determine how much hair to cull from a character.

Figure 33:
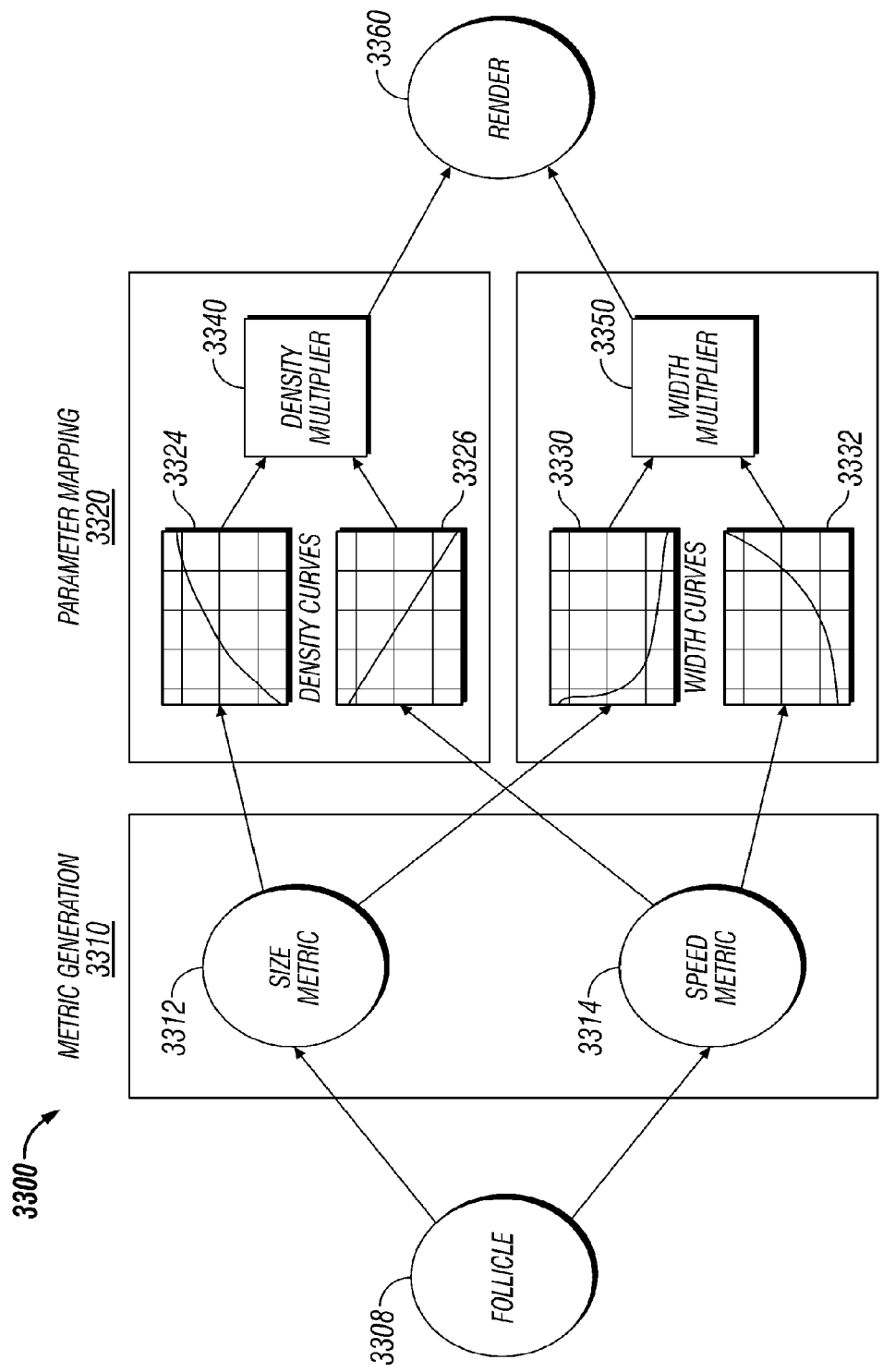
FIG. 33 is a diagram illustrating techniques to implement view-dependent screen-space optimization.

With reference to FIG. 33, FIG. 33 is a diagram illustrating techniques to implement view-dependent screen-space optimization. As can be seen in FIG. 33, view-dependent screen-space optimization 3300 is split into two stages. The first stage is a metric generation stage 3310 and the second stage is a metric-to-parameter mapping stage 3320. In particular, each hair follicle 3308 is fed into the metric generation stage 3310.

Figure 34:
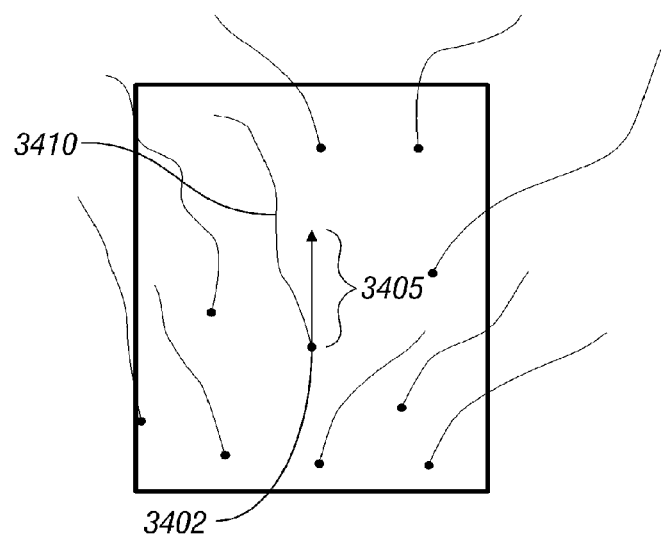
FIG. 34 is a diagram illustrating a hair follicle root position and a hair that is transformed to a normalized device coordinate (NDC) system.

In particular, each hair follicle 3308 is fed into the metric generation stage 3310, and with additional reference to FIG. 34, each hair follicle root position 3402 for each hair 3410 is transformed into a normalized device coordinate (NDC) frame in the metric generation stage 3310 to generate a proxy hair 3405 that replaces the original hair.

More particularly, in the metric generation stage 3310, the NDC root position 3402 of each hair is used to measure different metrics that provide additional information to decide how to control per-hair parameters at render time.

In this embodiment, two different metrics are utilized in the metric generation stage 3310—a size metric 3312 and a speed metric 3314. However, it should be appreciated that a wide variety of other different metrics may also be utilized. The screen-space size metric 3312 is utilized to calculate the length of a proxy hair 3405 in NDC space. A proxy hair 3405 is a unit length hair that is grown straight up from the hair follicle root position 3402. A proxy hair 3405 is utilized instead of an original final hair 3410 because it is easier to work with computationally than a final hair. This is because hair interpolation and effect operations associated with final hairs are very computationally intensive to perform especially if the hair is eventually culled. Another reason is that all hairs that are equal distance from the camera, but differing in length, should be treated identically. By doing so, looks with large hair-length variations are preserved, whereas ignoring proxy hairs in such a case may lead to bald spots or a different look once optimization is applied.

Figure 35:
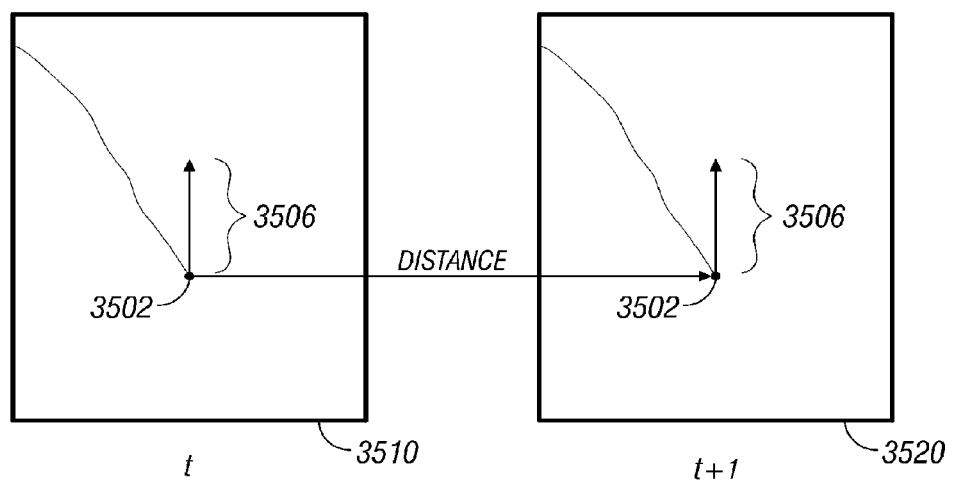
FIG. 35 is a diagram illustrating the distance traveled by the root of a proxy hair from a first frame to a second frame in NDC space.

Screen-space speed metric 3314 calculates the distance traveled by the root of a hair follicle from the current frame to the next frame in NDC space. Referring briefly to FIG. 35, FIG. 35 is a diagram illustrating the distance traveled by the root 3502 of a proxy hair 3506 from a first frame 3510 at time t to a second frame 3520 at time t+1 in NDC space. This metric has been chosen because heavily motion-blurred objects often do not require full hair density to achieve the same look.

With reference back to FIG. 33, after the size metric 3312 and the speed metric 3314 are determined at the metric generation stage 3310, these values are passed to the metric-to-parameter mapping stage 3320. For each parameter, an operator applies the corresponding function curves to each metric value. In this example, density curves 3324 and 3326 are applied to the size metric 3312 and speed metric 3314 (e.g., density vs. size and speed), respectively, and width curves 3330 and 3332 are applied to size metric 3312 and speed metric 3314 (e.g., width vs. size and speed), respectively. Each of the respective results are then multiplied to derive the final parameter multiplier value. In this example, a density multiplier value 3340 and a width multiplier value 3350 are determined that can be passed onto rendering functionality 3360.

It should be noted that in the case of the density multiplier, that the user-defined function curves 3324 and 3326 are constrained to map metric values in the range from [0,1]. The final result, the density multiplier value 3340, which also correspondingly varies between [0,1], is then used to determine whether or not a final hair is rendered at render block 3360. In one example, this may be done by generating a random number in the range [0,1]; if this number is lower than the final result, then the hair is drawn. Otherwise, it is culled.

For the width multiplier, the user-defined function curves 3330 and 3332 are constrained to any non-negative real number and thus the final result is also a non-negative real number. This final result, width multiplier 3350, is then multiplied with the current hair's width parameter and passed on to render block 3360.

It should be noted that because the hair count is no longer static, as an object (e.g., a character with hair) moves from the foreground to the background, that popping may occur. In order to alleviate this behavior, empirical testing has been done that shows that fading-out hair follicles in conjunction with these optimization techniques minimizes this effect. In view of this, each hair follicle may be forced to first pass through a visibility determination and if it is determined to be non-visible, the hair's opacity may be reduced by linearly reducing the hair's opacity value.

It should be appreciated that by utilizing the above-defined techniques that the number of hairs generated or rendered may be reduced by the density multiplier value and the width of the remaining hairs may be increased by the width multiplier value. Therefore, by utilizing the speed and size metrics and the four function curves, these optimization techniques determine whether to cull a hair and by how much to scale its width.

In particular, utilizing these techniques for a fully furred creature can result in significant processing and memory savings. This is because if a creature is not close up on the screen or is moving quickly across the screen, these techniques allow for the rendering of less than all of the hair that the creature had originally been designed with, without much of a visual difference, but render times and memory requirements are improved significantly.

With reference to FIG. 36, FIG. 36 shows a table 3600 that presents a side-by-side comparison of non-optimized values in terms of hair count, time, and memory versus optimized values in terms of hair count, time, and memory using the screen-space size metric at various frames. Render time ("time") is listed in minutes and seconds and memory usage ("mem") is given in Megabytes. In this test, illustrated in table 3600, a furry character was moved from a close-up position at frame 10 to far away from a camera at frame 100. The function curves used in this example were aggressive because the actual hair count goes from 78% of the original hair count at frame 10 to 1% at frame 100. As can be seen in table 3600, both render times and memory usage improve significantly.

It should be noted that the view-dependent screen-space optimization techniques are flexible in the sense that the function curves can easily be adjusted to fine tune the optimization so that the character looks good at any distance and the memory and render time savings are as high as possible.

With reference to FIG. 37, FIG. 37 is a table 3700 (similar to table 3600) illustrating another comparison utilizing the screen-space speed method. In this example, the character is shot moving across the screen very quickly and is rendered with motion blur. Frames were chosen where screen-space velocity is high. It should be noted that the hair count for the character is reduced to 19%. This technique shows dramatic savings as can be seen in table 3700 in both render time and memory for fast moving shots.

Further, tests have been performed with both size and speed metrics being utilized in conjunction with one another. In particular, with reference to FIG. 38, FIG. 38 is a table 3800 (similar to the other tables 3600 and 3700) that illustrates non-optimized and optimized hair count, time, and memory values. In this example, a character was rendered with motion blur moving from far back at frame 101 to a much closer frame at frame 270. As can be seen in the values of table 3800 both metrics work well with each other and save on rendering time and memory and further have been shown not to sacrifice visual quality.

Hair Sub-Patch Optimization

Another optimization technique implemented by the optimization module 1567 of hair/fur pipeline 1500 relates to hair sub-patch optimization. In general, this optimization is useful in rendering large amounts of hair based upon the fact that not all of the hair is visible to the camera at all times. Instead of generating all of the hairs and allowing display module 1575 to perform visibility culling during rendering, hair pipeline 1500 utilizing optimization module 1567 can save rendering time by not generating the non-visible primitives to begin with. In particular, aspects of these techniques may be implemented by the optimization module 1567 in conjunction with display module 1575.

In one embodiment, surface definition module 1550 may be used to define a surface and optimization module 1567 may be used to: create a bounding box for a set of hairs; determine whether the bounding box is visible; and if the bounding box is visible, hair associated with the visible bounding box is rendered upon the surface.

In general a bounding box may be created for the initial set of hairs to be rendered and may then be tested for visibility before rendering. If the bounding box is visible, the hair primitives are spatially divided into four sub-groups and a new bounding box is created for each sub-group and each sub-group is again tested for visibility. If a bounding box is determined to be not visible, then no further subdivision is performed on that hair group, nor is it rendered. After recursively sub-dividing all the visible hair groups, a predetermined number of times, the hair primitives of each group are then sent to display module 1575 for rendering at that point.

Figure 39:
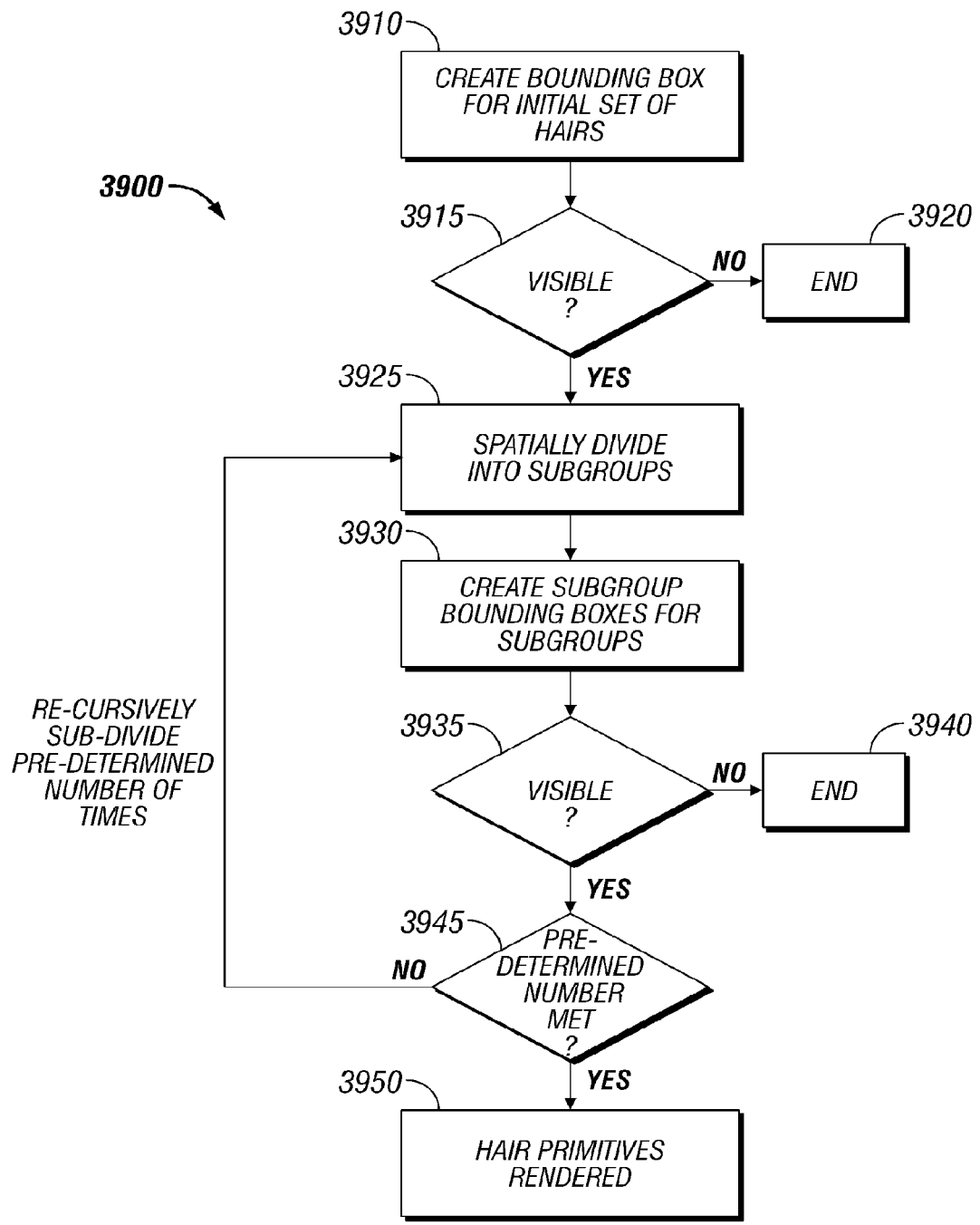
FIG. 39 is a flow diagram illustrating a process to implement hair sub-patch optimization.

With reference to FIG. 39, FIG. 39 is a flow diagram illustrating a process 3900 to implement hair sub-patch optimization. As can be seen in FIG. 39, at block 3910 a bounding box is created for an initial set of hairs. Next, at block 3915, it is determined whether the bounding box for the initial set of hairs is visible. If not, process 3900 ends (block 3920). For example, the sub-groups may be spatially divided in approximately equal relation. However, if the bounding box or a portion of the bounding box is visible for the initial set of hairs, then the bounding box is spatially divided into sub-groups (block 3925). For example, the sub-groups may be spatially divided in approximately equal relation. Further, a bounding box is created for each sub-group (block 3930).

Figure 40:
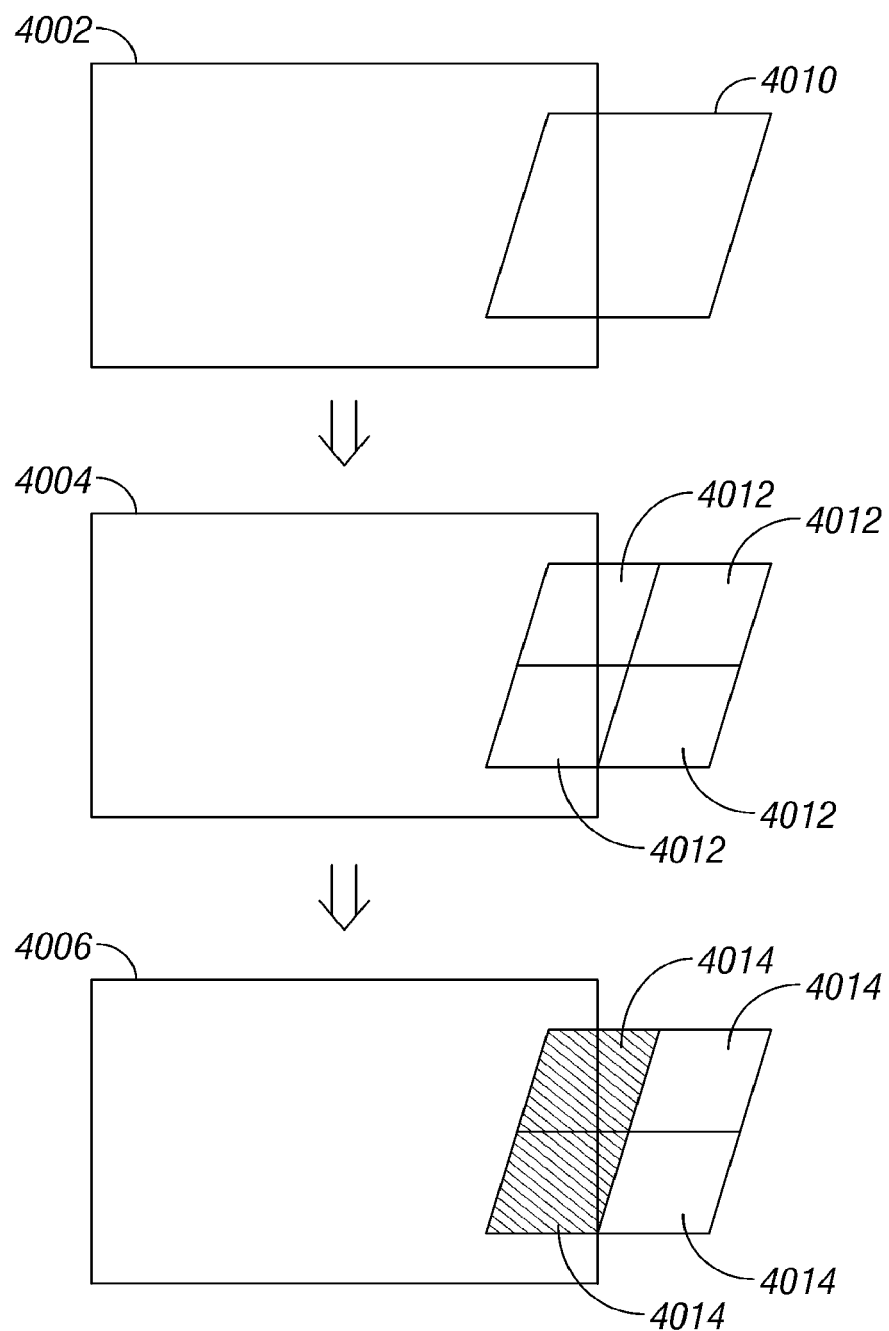
FIG. 40 is a diagram illustrating a simplified example of the use of hair sub-patch optimization.

Reference can also be made to FIG. 40 which is a diagram illustrating a simplified example of hair sub-patch optimization. As can be seen in FIG. 40, a first frame 4002 is shown with a bounding box 4010 for an initial set of hairs to the right side of the frame. As can be seen, the bounding box 4010 for the initial set of hairs is visible such that it is visible and, as shown in frame 4004, bounding box 4010 is then spatially divided into sub-groups or sub-group bounding boxes 4012.

Returning to process 3900 of FIG. 39, at block 3935 it is determined whether these sub-group bounding boxes are visible. If not, at block 3940 the process ends. However, if these sub-group bounding boxes are visible then it is determined whether a predetermined number of subdivisions have been met (block 3945). If not, the sub-group is further divided and is recursively subdivided a predetermined number of times. Assuming that the predetermined number has been met, then at block 3950, the hair primitives of the sub-group bounding boxes are rendered.

Particularly, with reference to FIG. 40, as can be seen at frame 3 4006, the two leftmost sub-group bounding boxes 4014 are determined to be visible (and are identified with hatch-marks) whereas the two rightmost boxes are not visible. Accordingly, the hair associated with the two leftmost visible sub-group bounding boxes 4014 are sent on for rendering whereas the hair associated with the two rightmost non-visible sub-group bounding boxes are discarded. It should be appreciated that this can be recursively implemented a pre-determined number of times.

Further, because of the flexibility of the hair/fur pipeline 1500 as previously discussed with reference to the geometric instancing embodiment, environmental modelers may utilize aspects of the hair sub-patch optimization to extend it to other computer graphic uses such as to render large grassy landscapes. By utilizing embodiments of the hair sub-patch optimization embodiment, from shot to shot, only a small fraction of the entire landscape may need to be rendered resulting in substantial processing and memory savings. However, it should be appreciated that by utilizing the previously-described geometric instancing embodiments that any user-selected or randomly-generated geometric object may be rendered instead of hair with or without associated hair parameters (bend, rotation, wind, etc.) and the axial deformation parameters associated with the hair.

For example, to define a landscape, the process may be initiated with a single bounding box that encompasses a patch defining the entire landscape. This patch then may be subdivided into four disjoint quadrants with smaller bounding boxes, as previously described. For bounding boxes that get culled, no further processing is done, but for bounding boxes that continue to be processed, further subdivision will occur until a user-defined stopping criterion is reached.

Additional stopping criterion may be utilized as well, such as subdivision depth and parametric limits relating to the parametric length of the sub-patches dimensions and parametric texture space.

Figure 41:
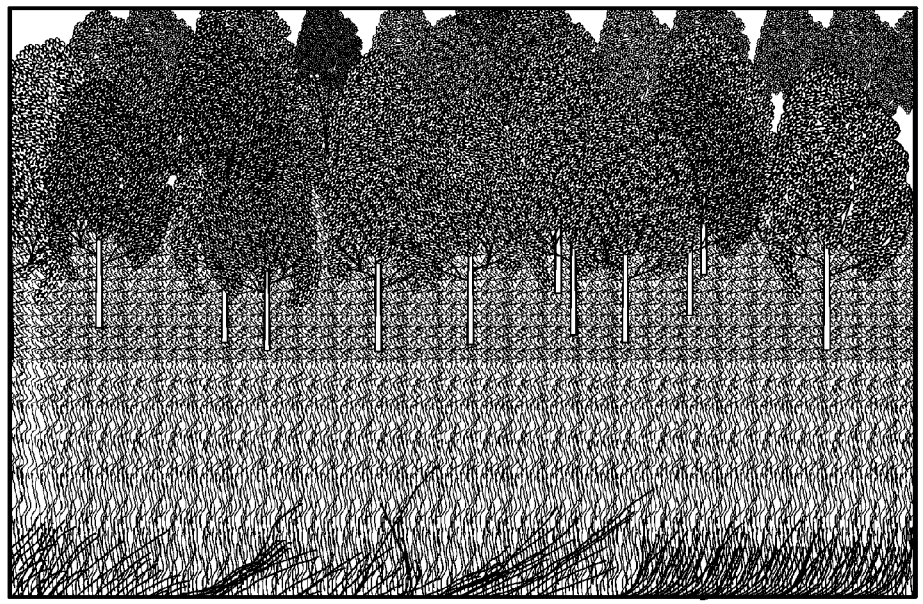
FIG. 41 is a diagram showing a grassy landscape that was modeled, in which, the hairs were geometrically instanced with grass and/or trees, and that utilizes sub-patch optimization techniques.

Utilizing the previously described hair sub-patch optimization techniques discussed with reference to FIGS. 39 and 40 as applied to a landscape, a single large grassy landscape was modeled with 25 million hairs in which the hairs were geometrically instanced with grass and/or trees. But as shown in the frame of FIG. 41, only a few hundred blades of grass were actually generated and rendered utilizing the hair sub-patch optimization techniques. Without this optimization, to render all the grass would have resulted in a far greater amount of processing and memory usage being required.

Hair Caching Optimization

During the lighting phase, a lighting expert typically works on a shot that has been approved by both the animation and layout departments. What is typically left to do is to determine the number and placement of lights and to create the type of lighting conditions needed to achieve the desired look.

In particular, during the lighting phase, all the elements of the scene have been finalized including all of the hair parameters. Because of this, it is possible to cache out and re-use hair geometry and hair parameters in order to obtain significant processing and memory savings. In one embodiment, optimization module 1567 in conjunction with shading and backlighting module 1570 may be utilized to implement techniques according to the hair caching embodiment as described herein.

In order to accomplish this, a cache hair state file may be created and/or validated and the state of the hair parameters, as they are to be rendered, can be saved. For example, these hair parameters may be saved as an unordered list of hair parameters within the cache hair state file.

In one embodiment, lighting module 1570 may be used to produce lighting effects in a lighting phase for a shot and optimization module 1567 may be used to: determine if a cache hair state file including hair parameters exists; and determine if the cache hair state file includes matching hair parameters to be used in the shot, and if so, the hair parameter values from the cache hair state file are used in the lighting phase.

Figure 42:
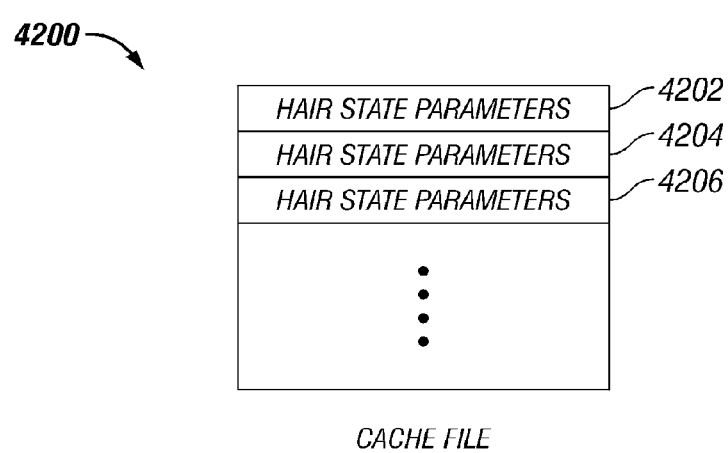
FIG. 42 is a diagram illustrating an example of a cache state file.

Turning to FIG. 42, an example of a cache hair state file 4200 that includes a list of hair state parameters 4202, 4204, 4206, etc., is illustrated. If the cache hair state file 4200 does not exist or contains different parameter values than the state of the current render, then the new set of values may be saved into the cache hair state file 4200 (i.e., as hair state parameters 4202, 4204, 4206, etc.). This new or updated cache hair state file 4200 can then be utilized. However, if the cache hair state file 4200 already matches the state of current render, then the original cache hair state file 4200 may be used.

Figures 43, 44:
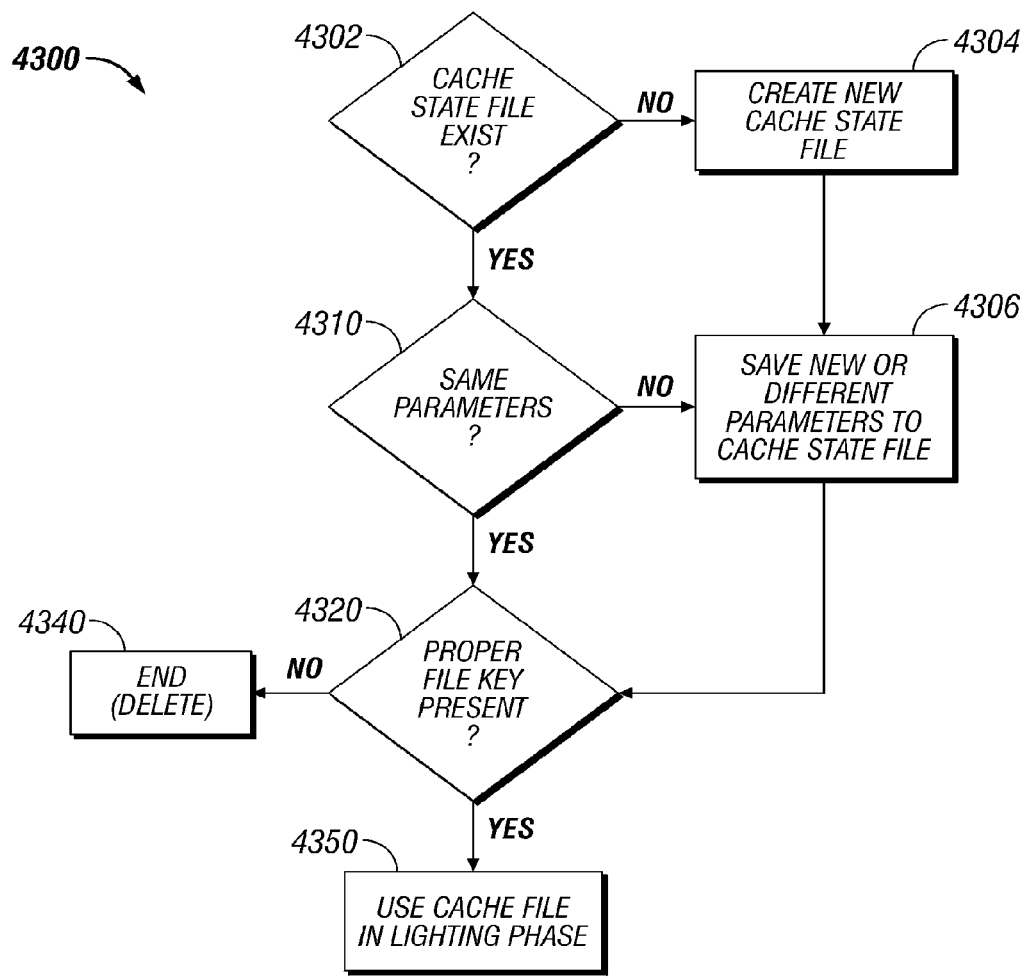
FIG. 43 is a flow diagram illustrating a process to implement hair-caching.
FIG. 44 is a table showing time-savings that can accomplished using hair-caching to render a fully-furred character.

Turning to FIG. 43, FIG. 43 is a flow diagram illustrating a process 4300 to implement hair caching. At block 4302 it is determined whether a cache hair state file 4200 exists. If not, a new cache hair state file 4200 is created (block 4304). Then, at block 4306 the new cache hair state file 4200 is saved.

However, if a cache state file does exist, then at block 4310 it is determined whether or not the hair cache state file 4200 includes the same parameters to be utilized for rendering. If so, the process moves to block 4320 as will be described. Otherwise, at block 4306, the different hair state parameters are saved to the cache hair state file 4200.

With either a new cache hair state file, a cache hair state file with the same parameters, or a cache hair state file with different parameters, the process moves on to block 4320, where it is determined whether or not a proper file key is present. Each render and cache validation process is locked with an exclusive file lock prior to cache validation, cache generation and cache rendering. Accordingly, a proper key needs to be present for the cache hair state file to be used in the lighting phase. This is because multiple processes are often used to generate a final rendered frame while a lighter is working on a shot.

If the proper file key is not present, then the process ends at block 4340 and the cache hair state file 4200 is deleted. However, if the cache hair state file 4200 was properly unlocked, then the cache file may be utilized in the lighting phase at block 4350.

In one embodiment, the physical cache hair state file may be represented as a RENDERMAN file. This may be done without a loss of generality since it simply encodes data points and parameters needed to generate hair geometry. In addition, compressed RENDERMAN files may be used as a space saving technique to represent cache files.

Thus, the previously described process 4300 determines whether or not the cache hair state file 4200 is valid or invalid. The cache hair state file is generally determined to be invalid if it does not exist or the primitives found inside the cache file do not match the hair primitives that are to be rendered. In particular, to determine the latter condition, each cache hair state file may be required to contain the hair render settings that were used to generate it in the first place.

Thus, a cache hair state file is deemed valid if the render settings match. On the other hand, if the cache hair state file is found to be invalid, then the correct hair parameters are fed and stored to cache hair state file, as previously described.

Typically, in the first pass, the cache is invalid and thus needs to be generated (cache generation and use). Savings can be found here due to serialization that allows for immediate the use a cache once another processor has generated it. This alone cuts down rendering times by approximately 69%. Further savings may be realized when different processes are utilizing the same cache file. It should be noted that lighters typically keep re-rendering many times and the actual time savings are often multiplied.

Turning now to FIG. 44, FIG. 44 shows a table in which the time-savings a lighter can accomplish by using the previously-described techniques to render a fully-furred character is illustrated. As can be seen in FIG. 44, time to render without cache, time to generate and use cache for rendering, and time to render with the existing cache are shown. As can be seen significant time-savings are realized.

In this description, numerous specific details are set forth. However, it is understood that embodiments of the invention may be practiced without these specific details. In other instances, well-known circuits, structures, software processes, and techniques have not been shown in order not to obscure the understanding of this description.

Components of the various embodiments of the invention may be implemented in hardware, software, firmware, microcode, or any combination thereof. When implemented in software, firmware, or microcode, the elements of the embodiment of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the machine accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operation described in the following. The term "data" here refers to any type of information that is encoded for machine-readable purposes. Therefore, it may include program, code, data, file, etc.

More particularly, all or part of the embodiments of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A computer system for generating hair comprising:
   a processor;
   a memory including a hair pipeline comprising:
   a lighting module to produce lighting effects in a lighting phase for a shot,
      wherein the lighting module utilizes a set of hair parameters that is stored inside a cache hair state file, and
      wherein the set of hair parameters of the cache hair state file is utilized by the lightning module only if the cache hair state file is deemed to be a valid cache hair state file;
   an optimization module to:
      determine if the cache hair state file exists,
         wherein, if the cache hair state file does not exist, automatically deem the non-existent cache hair state file to be an invalid cache hair state file, automatically create a new cache hair state file, and automatically deem the new cache hair state file as a valid cache hair state file, the new cache hair state file including a new set of hair parameters that match a set of hair primitives to be rendered and to be used in the shot, and
         wherein, if the cache hair state file does exist, automatically determine if the set of hair parameters match the set of hair primitives to be rendered and to be used in the shot, and if so, automatically deem the cache hair state file to be a valid cache hair state file,
         wherein, if the set of hair parameters does not match the set of hair primitives to be rendered and to be used in the shot, automatically deem the cache hair state file to be an invalid cache hair state file, automatically delete the set of hair parameters that does not match the set of hair primitives from the invalid cache hair state file, automatically store a new set of hair parameters that matches the set of hair primitives inside the invalid cache hair state file, and automatically deem the invalid cache hair state file that is storing the new set of hair parameters to be a valid cache hair state file; and
   a display device module to display hair with the lighting effects for the lighting phase of the shot on a display device.

2. The computer system of claim 1, wherein, the optimization module further determines if a proper file key is present.

3. The computer system of claim 2, wherein, if a proper file key is present, the proper file key unlocks the cache hair state file such that the hair parameters are utilized for the lighting phase.

4. The computer system of claim 2, wherein, if a proper file key is not present, the cache hair state file is deleted.

5. The computer system of claim 1, wherein, if the cache hair state file does exist, the cache state file is automatically deemed to be a valid cache state file only if the optimization module determines that a first group of hair render settings that was used to create the cache hair state file matches a second group of hair render settings that is stored in the cache state file.

6. A method implemented by a computer system having a memory and a processor for generating hair during a lighting phase for a shot comprising:
   determining if a cache hair state file exists,
      wherein the cache hair state file comprises a set of hair parameters,
      wherein, if the cache hair state file does not exist, automatically deeming the non-existent cache hair state file to be an invalid cache hair state file, automatically creating a new cache hair state file, and automatically deeming the new cache hair state file as a valid cache hair state file,
         wherein the new cache hair state file includes a new set of hair parameters that matches a set of hair primitives to be rendered and to be used in the shot, and,
      wherein, if the cache hair state file does exist, automatically determining if the set of hair parameters matches the set of hair primitives to be rendered and to be used in the shot, and if the set of hair parameters matches, automatically deeming the cache hair state file to be a valid cache hair state file,
         wherein, if the set of hair parameters does not match the set of hair primitives to be rendered and to be used in the shot, automatically deeming the cache hair state file to be an invalid cache hair state file, automatically deleting the set of hair primitives that does not match the set of hair primitives from the invalid cache hair state file, automatically storing a new set of hair parameters that matches the set of hair primitives inside the invalid cache hair state file, and automatically deeming the invalid cache hair state file that is storing the new list of hair parameters to be a valid cache hair state file;
   utilizing the hair parameters from the cache hair state file in the lighting phase, wherein only the set of hair parameters that is stored inside the valid cache hair state file is utilized in the lighting phase; and
   displaying hair with the lighting effects for the lighting phase of the shot on a display device, wherein the steps of determining, utilizing, and displaying are performed by the computer system.

7. The method of claim 6, further comprising determining if a proper file key is present.

8. The method of claim 7, wherein, if the proper file key is present, further comprising unlocking the cache hair state file such that the hair parameters are utilized for the lighting phase.

9. The method of claim 7, wherein, if the proper file key is not present, further comprising deleting the cache hair state file.

10. The method of claim 6, wherein, if the cache hair state file does exist, the cache state file is automatically deemed to be a valid cache state file only if a first group of hair render settings that was used to create the cache hair state file matches a second group of hair render settings that is stored in the cache state file.

11. A non-transitory computer-readable storage medium containing executable instructions tangible stored thereon which, when executed by a computer system, cause the computer system to perform a method for generating hair during a lighting phase for a shot comprising:

determining if a cache hair state file exists,
- wherein the cache hair state file comprises a set of hair parameters,
- wherein, if the cache hair state file does not exist, automatically deeming the non-existent cache hair state file to be an invalid cache hair state file, automatically creating a new cache hair state file, and automatically deeming the new cache hair state file to be a valid cache hair state file,
- wherein the new cache hair state file includes a new set of hair parameters that matches a set of hair primitives to be rendered and to be used in the shot, and
- wherein, if the cache hair state file does exist, automatically determining if the set of hair parameters matches the set of hair primitives to be rendered and to be used in the shot, and if the set of hair parameters matches, automatically deeming the cache hair state file to be a valid cache hair state file,
- wherein, if the set of hair parameters does not match the set of hair primitives to be rendered and to be used in the shot, automatically deeming the cache hair state file to be an invalid cache hair state file, automatically deleting the set of hair primitives that does not match the set of hair primitives from the invalid cache hair state file, automatically storing a new set of hair parameters that matches the set of hair primitives inside the invalid cache hair state file, and automatically deeming the invalid cache hair state file that is storing the new list of hair parameters to be a valid cache hair state file;

utilizing the hair parameters from the cache hair state file in the lighting phase, wherein only the set of hair parameters that is stored inside the valid cache hair state file is utilized in the lighting phase; and displaying hair with the lighting effects for the lighting phase of the shot on a display device.

12. The computer-readable storage medium of claim 11, further comprising determining if a proper file key is present.

13. The computer-readable storage medium of claim 12, wherein, if the proper file key is present, further comprising unlocking the cache hair state file such that the hair parameters are utilized for the lighting phase.

14. The computer-readable storage medium of claim 12, wherein, if the proper file key is not present, further comprising deleting the cache hair state file.

15. The computer-readable storage medium of claim 11, wherein, if the cache hair state file does exist, the cache state file is automatically deemed to be a valid cache state file only if a first group of hair render settings that was used to create the cache hair state file matches a second group of hair render settings that is stored in the cache state file.

* * * * *